US007124691B2

(12) United States Patent
Donnelly et al.

(10) Patent No.: US 7,124,691 B2
(45) Date of Patent: Oct. 24, 2006

(54) METHOD FOR MONITORING AND CONTROLLING LOCOMOTIVES

(75) Inventors: Frank Wegner Donnelly, North Vancouver (CA); Brian Gulayets Iwan, Burnaby (CA); John David Watson, Evergreen, CO (US); David Herman Swan, Lawrencetown (CA)

(73) Assignee: Railpower Technologies Corp., North Vancouver (CA)

( * ) Notice: Subject to any disclaimer, the term of this patent is extended or adjusted under 35 U.S.C. 154(b) by 156 days.

(21) Appl. No.: 10/650,011

(22) Filed: Aug. 26, 2003

(65) Prior Publication Data

US 2005/0045058 A1    Mar. 3, 2005

(51) Int. Cl.
 *B61C 17/00*   (2006.01)
(52) U.S. Cl. ................................... 105/26.05
(58) Field of Classification Search ............. 105/26.05, 105/27, 39, 49, 50, 231, 62.1, 76; 318/375, 318/376, 377, 378
See application file for complete search history.

(56) References Cited

U.S. PATENT DOCUMENTS

| 384,580 | A | 6/1888 | Julien |
| 1,199,752 | A | 10/1916 | Baker |
| 1,377,087 | A | 5/1921 | Manns |
| 1,535,175 | A | 4/1925 | Mancha |
| 2,403,933 | A | 4/1946 | Lillquist |
| 2,472,924 | A | 6/1949 | Schwendner |
| 2,510,753 | A | 6/1950 | Multhaup |
| 3,169,733 | A | 2/1965 | Barrett, Jr. |
| 3,443,115 | A | 5/1969 | Timmerman, Jr. |
| 3,569,810 | A | 3/1971 | Thiele ........................ 318/341 |
| 3,596,154 | A | 7/1971 | Gurwicz et al. ............ 318/252 |
| 3,668,418 | A | 6/1972 | Godard ........................ 307/66 |

(Continued)

FOREIGN PATENT DOCUMENTS

CA    1283472    10/1987

(Continued)

OTHER PUBLICATIONS

U.S. Appl. No. 10/649,286, filed Aug. 26, 2003, Donnelly et al.

(Continued)

*Primary Examiner*—S. Joseph Morano
*Assistant Examiner*—Robert J. McCarry, Jr.
(74) *Attorney, Agent, or Firm*—Sheridan Ross P.C.

(57) ABSTRACT

The present invention is directed to a locomotive comprising energy storage units, such as batteries, a prime energy source, such as a diesel engine, and an energy conversion device, such as a generator. The locomotive comprises one or more of the following features: a separate chopper circuit for each traction motor; energy storage units that can be switched from parallel to series electrical connections, an fluid-activated anti-lock brake system, a controller operable to control separately and independently each axle/traction motor, and a controller operable to control automatically a speed of the locomotive. The present invention includes an integrated system for monitoring, controlling and optimizing an electrically powered locomotive using a combination of sensors and software to provide feedback that optimizes power train efficiency and individual drive axle performance for a locomotive that utilizes one of several possible electrical energy storage systems to provide the tractive power. The net result is a locomotive that has an integrated system of control over all aspects of the locomotive power train including control over individual drive axles, especially during acceleration, braking and non-synchronous wheel slip.

56 Claims, 35 Drawing Sheets

U.S. PATENT DOCUMENTS

| | | | |
|---|---|---|---|
| 3,728,598 A | 4/1973 | Hermansson et al. | |
| 3,737,745 A | 6/1973 | Chevaugeon et al. | |
| 3,792,327 A | 2/1974 | Waldorf | 318/139 |
| 3,832,625 A | 8/1974 | Gyugyi | |
| 3,898,937 A | 8/1975 | Johnson | 105/61 |
| 3,930,189 A | 12/1975 | Smith | |
| 3,970,160 A | 7/1976 | Nowick | 180/65 |
| 3,997,822 A | 12/1976 | Logston et al. | |
| 4,090,577 A | 5/1978 | Moore | 180/44 |
| 4,096,423 A | 6/1978 | Bailey et al. | |
| 4,107,402 A | 8/1978 | Dougherty et al. | |
| 4,152,758 A | 5/1979 | Bailey et al. | |
| 4,199,037 A | 4/1980 | White | 180/65 |
| 4,204,143 A | 5/1980 | Coleman | 318/341 |
| 4,217,527 A | 8/1980 | Bourke et al. | 318/139 |
| 4,309,645 A | 1/1982 | De Villeneuve | 318/341 |
| 4,369,397 A | 1/1983 | Read | 318/54 |
| 4,417,194 A | 11/1983 | Curtiss et al. | |
| 4,423,362 A | 12/1983 | Konrad et al. | 318/139 |
| 4,471,276 A | 9/1984 | Cudlitz | 318/341 |
| 4,471,421 A | 9/1984 | Brown et al. | 363/54 |
| 4,495,449 A | 1/1985 | Black et al. | 318/60 |
| 4,523,134 A | 6/1985 | Kinoshita et al. | 318/313 |
| 4,644,232 A | 2/1987 | Nojiri et al. | 318/66 |
| 4,900,944 A | 2/1990 | Donnelly | 290/3 |
| 4,961,151 A | 10/1990 | Early et al. | 364/492 |
| 5,129,328 A | 7/1992 | Donnelly | 105/61.5 |
| 5,212,431 A | 5/1993 | Origuchi et al. | 318/139 |
| 5,264,764 A | 11/1993 | Kuang | 318/139 |
| 5,281,900 A | 1/1994 | Park | 318/139 |
| 5,317,669 A | 5/1994 | Anderson et al. | 388/829 |
| 5,332,630 A | 7/1994 | Hsu | 429/20 |
| 5,359,228 A | 10/1994 | Yoshida | 290/17 |
| 5,436,548 A | 7/1995 | Thomas | 320/2 |
| 5,453,672 A | 9/1995 | Avitan | 318/493 |
| 5,480,220 A | 1/1996 | Kumar | |
| 5,510,203 A | 4/1996 | Hamada et al. | |
| 5,510,693 A | 4/1996 | Theobald | 320/24 |
| 5,511,749 A | 4/1996 | Horst et al. | 246/187 A |
| 5,528,148 A | 6/1996 | Rogers | 324/426 |
| 5,564,795 A * | 10/1996 | Engle | 303/9 |
| 5,568,023 A | 10/1996 | Grayer et al. | 318/139 |
| 5,580,677 A | 12/1996 | Morishita et al. | |
| 5,585,706 A | 12/1996 | Avitan | 318/493 |
| 5,589,743 A | 12/1996 | King | 318/139 |
| 5,610,499 A | 3/1997 | Rogers | 322/25 |
| 5,629,567 A | 5/1997 | Kumar | 290/3 |
| 5,629,601 A | 5/1997 | Feldstein | 320/6 |
| 5,631,532 A | 5/1997 | Azuma et al. | 320/5 |
| 5,659,240 A | 8/1997 | King | 320/134 |
| 5,685,507 A | 11/1997 | Horst et al. | 246/187 A |
| 5,696,438 A | 12/1997 | Hamilton | 322/12 |
| 5,698,955 A | 12/1997 | Nii | 318/139 |
| 5,751,137 A | 5/1998 | Kiuchi et al. | 322/24 |
| 5,765,656 A | 6/1998 | Weaver | 180/65.3 |
| 5,820,172 A | 10/1998 | Brigham et al. | 290/40 |
| 5,856,037 A | 1/1999 | Casale et al. | |
| 5,898,282 A | 4/1999 | Drozdz et al. | 318/139 |
| 5,939,861 A | 8/1999 | Joko et al. | 320/122 |
| 5,964,309 A | 10/1999 | Kimura et al. | 180/65.8 |
| 5,992,950 A | 11/1999 | Kumar et al. | 303/151 |
| 5,998,880 A * | 12/1999 | Kumar | 290/40 B |
| 6,012,011 A | 1/2000 | Johnson | 701/82 |
| 6,021,251 A | 2/2000 | Hammer et al. | 388/801 |
| 6,023,137 A | 2/2000 | Kumar et al. | 318/254 |
| 6,025,086 A | 2/2000 | Ching | |
| 6,104,148 A | 8/2000 | Kumar et al. | |
| 6,175,272 B1 | 1/2001 | Takita | 330/10 |
| 6,211,646 B1 | 4/2001 | Kouzu et al. | |
| 6,218,807 B1 | 4/2001 | Sakaue et al. | |
| 6,308,639 B1 | 10/2001 | Donnelly et al. | 105/50 |
| 6,331,365 B1 | 12/2001 | King | 429/9 |
| 6,367,891 B1 | 4/2002 | Smith et al. | |
| 6,417,646 B1 | 7/2002 | Huykman et al. | |
| 6,441,581 B1 | 8/2002 | King et al. | 320/101 |
| 6,449,536 B1 | 9/2002 | Brousseau et al. | 701/19 |
| 6,456,674 B1 | 9/2002 | Horst et al. | 375/347 |
| D464,622 S | 10/2002 | Donnelly | D13/120 |
| 6,470,245 B1 | 10/2002 | Proulx | 701/19 |
| 6,537,694 B1 | 3/2003 | Sugiura et al. | |
| 6,591,758 B1 | 7/2003 | Kumar | 105/35 |
| 6,612,245 B1 * | 9/2003 | Kumar et al. | 105/26.05 |
| 6,615,118 B1 | 9/2003 | Kumar | 701/19 |
| 6,627,345 B1 | 9/2003 | Zemlok et al. | |
| 6,634,303 B1 | 10/2003 | Madsen et al. | |
| 6,653,002 B1 | 11/2003 | Parise | |
| 6,658,331 B1 | 12/2003 | Horst et al. | 701/19 |
| 6,678,972 B1 | 1/2004 | Naruse et al. | |
| 6,691,005 B1 | 2/2004 | Proulx | 701/19 |
| 6,697,716 B1 | 2/2004 | Horst | 701/19 |
| 6,737,822 B1 | 5/2004 | King | 318/375 |
| 6,812,656 B1 | 11/2004 | Donnelly et al. | |
| 6,879,054 B1 | 4/2005 | Gosselin | |
| 6,909,200 B1 | 6/2005 | Bouchon | |
| 6,973,880 B1 | 12/2005 | Kumar | |
| 2003/0150352 A1 | 8/2003 | Kumar | 105/35 |
| 2003/0151387 A1 | 8/2003 | Kumar | 320/104 |
| 2003/0160586 A1 | 8/2003 | Donnelly et al. | |
| 2003/0233959 A1 | 12/2003 | Kumar | 105/26.05 |

FOREIGN PATENT DOCUMENTS

| | | |
|---|---|---|
| CA | 2411132 | 11/2002 |
| EP | 0 348 938 | 1/1990 |
| GB | 873 167 | 3/1960 |
| GB | 1129709 | 11/1966 |
| GB | 1 312 699 | 10/1970 |
| GB | 2 005 205 A | 9/1977 |
| WO | WO 03/072388 | 9/2003 |
| WO | WO 04/042890 | 5/2004 |

OTHER PUBLICATIONS

Thompson; "Electric Tmsportation"; *International Textbook Co., Scranton, Pa*; 1940, First Edition, pp. 254-262.

Mendler; "The Technological Opportunities of Hybrid Electric Vehicles"; *Society of Automotive Engineers, Inc.*; 1996; pp. 1-16.

Mercer; "Innovative Use of Horsepower—Hybrid Bus Powered by Gas Turbine"; *Diesel Progress*; Dec. 1997; pp. 56-57.

Berg; "Concept Truck Addresses Future Clean Air Demands With Hybrid Turbine-Electric Powertrain"; *Emissions Alternatives Fuels*; (date unknown); pp. 55-57.

FMTV—with HybriDrive Propulsion System, pp. 1-3.

Nene; "Advanced Propulsion Systems for Urban Rail Vehicles: Chapter 2: DC Drives with a Chopper Controller"; *Prentice-Hall, Inc.*; 1985; pp. 18-45.

Declaration of Frank Donnelly Under 37 CFR § 1.98 dated Apr. 8, 2004.

Kostic et al., "An Analytic Solution of the Choppers Ripple Currents," Proceedings of the 1993 IEEE/ASME Joint Railroad Conference, Apr. 1993, pp. 103-107.

Moghbell, Hassan et al., Chopper Design for NICTD Locomotives, Proceedings of the 1993 IEEE/ASME Joint Railroad Conference, Apr. 1993, pp. 67-75.

M.J. Hapeman et al., "Diesel Electric Locomotive Propulsion Systems—A Look Into the Future," IEEE Technical Papers Presented at the 1985 Joint ASME/IEEE Railroad Conference, New York City, NY (Apr. 16-18, 1985), pp. 108-115.

Band, C.E. et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), pp. 277-288.

Declaration of Ronald Balley under 37 CFR § 1.98 dated Dec. 3, 2004 U.S. Appl. No. 10/650,011, 3 pages.

Joseph Szymborski et al., "Examination of VRLA Battery Cells sampled form the Metlakatla Battery Energy Storage System". 15 pages.

"Locomotive Energy Storage Systems," Advanced Railway Technology, Inc. (Dec. 1985), 22 pages.

"Diesel Locomotives" by Kalmbach Publishing Company, 1980, 3 pages.

"Motor Control Electronics Handbook" edited by Richard Valentine, McGraw Hill (1998), ISBN 0-07-066810-8, pp. 161-221.

"Progress in Overcoming the Failure Modes Peculiar to VRLA Batteries", A. Copper, P.T. Moseley, Journal of Power Sources 113 (2003) 200-208.

"Research Results from the Advanced Lead-Acid Battery Consortium Point the Way to Longer Life and Higher Specific Energy for Lead/Acid Electic-vehicle Batteries", P.T. Moseley, Journal of Power Sources 73 (1998) 122-126.

"Improving the Valve-Regulated Lead Acid Battery", P.T. Moseley, Journal of Power Sources 88 (2000) 71-77.

"Keeping Up the Pressure-Strategies to Maintain Plate-Group Pressure and Extend the Cycle Life of VRLA Batteries", M.J. Weighall, Journal of Power Sources 95 (2001) 209-217.

"VRLA Traction", First International Symposium on the Use of VRLA Batteries in Traction Application, Honolulu, Jun. 2005, 147 pages.

U.S. Appl. No. 60/600,330, filed Aug. 9, 2004, Donnelly.
U.S. Appl. No. 60/607,194, filed Sep. 3, 2004, Donnelly.
U.S. Appl. No. 60/616,173, filed Oct. 4, 2004, Donnelly.
U.S. Appl. No. 60/618,631, filed Oct. 13, 2004, Donnelly.
U.S. Appl. No. 60/618,632, filed Oct. 13, 2004, Donnelly.
U.S. Appl. No. 60/674,837, filed Apr. 25, 2005, Donnelly.

"Lead-Acid Battery State of Charge vs. Voltage", Richard Perez, Home Power #36, Aug./Sep. 1993.

"Thermal Evaluation of the Honda Insight Battery Pack" M.D. Zolot et. al. National Renewable Energy Laboratory, Presented at the 36th Intersociety Energy Conversion Engineering Conference, Savannah Georgia, Jul. 29 to Aug. 2, 2001.

"Development of a New Battery System for Hybrid Vehicle", Tomokazu Yamauchi et al, Toyota, presented at the EVS 17 in Montreal, Oct. 2000.

"Supercapacitive Energy Storage for Diesel-Electric Locomotives", Destraz, Barrade and Rufer, Swiss Federal Institute of Technology, paper presented at SPEEDAM 2004, Jun. 16, Capri, Italy.

Press Release: "French Railway Company Voies Ferees Legeres et Industielles (VFLI) Puts Its Trust in Deutch Engines", Jun. 2003.

"LNG as a Fuel for Railroads: Assessment of Technology Status and Economics", Pera and Moyer, Acurex Corporation, 1993, Gas Research Institute contact No. 5091-292-2153.

"Comparative Economic Assessment of a Natural Gas Fueled Locomotive with On-Board CNG Storage to Diesel and LNG Variants", Donnelly et al, IEEE/ASME Joint Railroad Conference, Baltimore, Apr. 1995.

"Linear/Switchmode Voltage Regulator Handbook" Motorola, Inc. 1982.

"The Control of Switched Reluctance Drives and their Use for Flywheel Energy Storage", Brabandere et al.

"Performance and Control of the Switched Reluctance Motor", Dahdah et al, University of Western Sydney, Australia.

Design of Switched Reluctance Motors and Development of a Universal Controller for Switched Reluctance and Permanent Magnet Brushless DC Motor', Phd Dissertation, Virginia Polytechnic Institute and State University, Prahveen Vijayraghavan, Blacksburg, VA, Nov. 2001.

"Li-lon Battery-Powered Buck-Boost Regulator Minimizes Portable Product Size", Chen, IIC-China/ESC—China Conference Proceedings, 2002.

PCT International Preliminary Examination Report dated May 25, 2005, 4 pages.

* cited by examiner

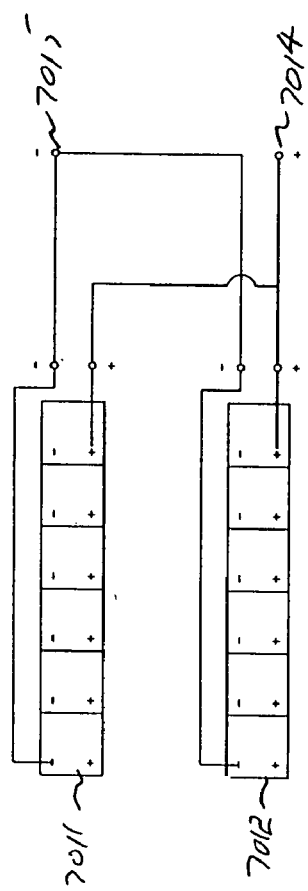
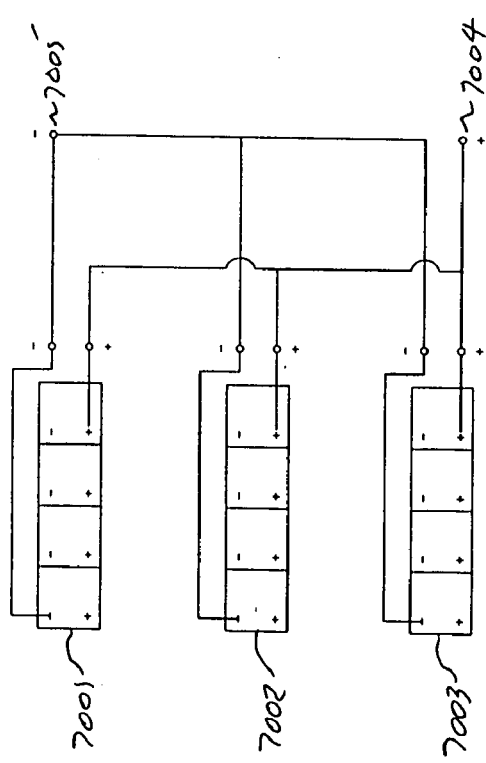
FIG. 7

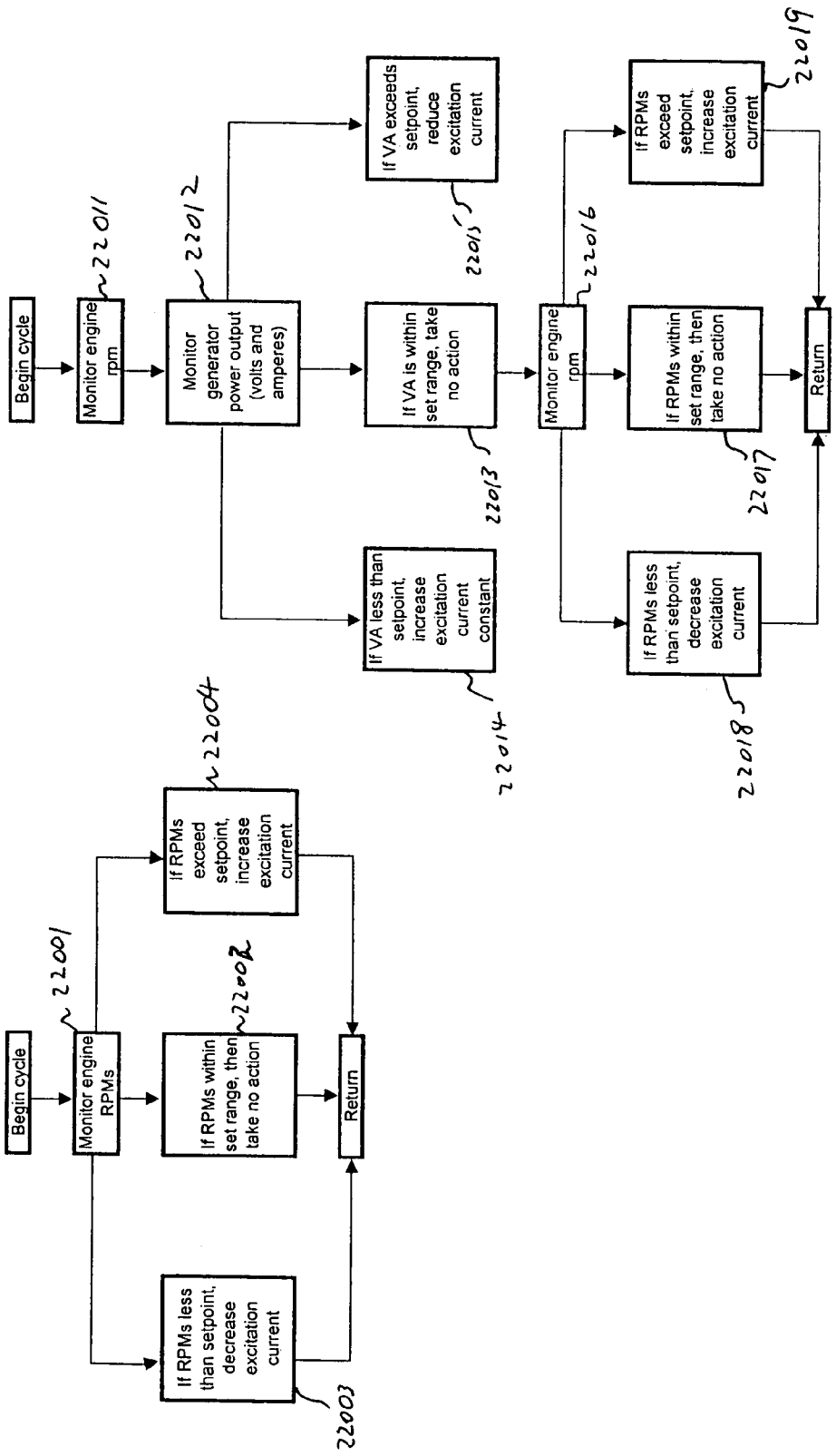
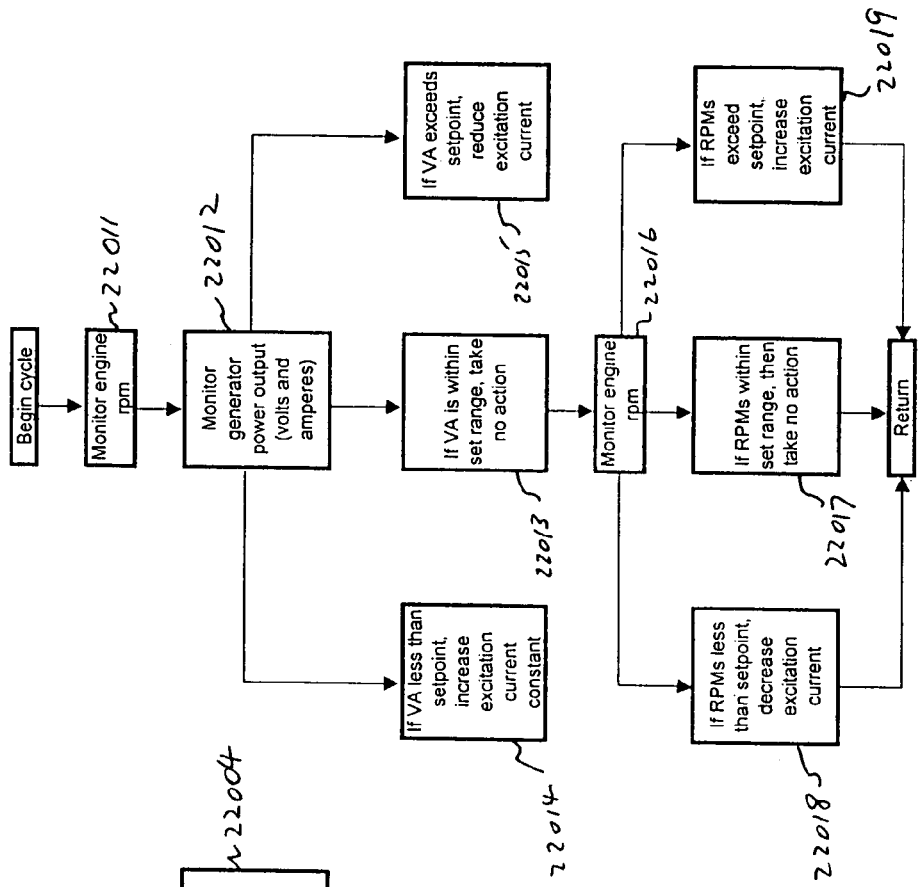
FIG. 22b
FIG. 22a
FIG. 22

| 32001 | | |
|---|---|---|
| I30=0 NO FCS | I40=0 BOPEN | I50=0 TM1FWD |
| I32=0 ID | I42=0 TM1CO | I51=0 TM2FWD |
| I33=0 OV | I43=0 TM2CO | I52=0 TM3FWD |
| 0 SANDMAN | I44=0 TM3CO | I53=0 TM4FWD |
| I35=0 NO ESS | I45=0 TM4CO | 54=0 TM1OPEN |
| I36=0 GF | I46=0 TM1RVR | 55=0 TM2OPEN |
| I37=0 CV | I47=0 TM2RVR | 56=0 TM3OPEN |
| I38=0 FO | I48=0 TM3RVR | 57=0 TM4OPEN |
| I39=0 RE | I49=0 TM4RVR | 0 CAPSHORT |
| I310=0 ER | 410=0 CISTOP | I59 = 0 |
| I311=0 ERS | I411 = 0 | I510 = 0 |
| I312=0 EV | I412 = 0 | I511 = 0 |
| I313=0 FUEL | I413 = 0 | I512 = 0 |
| I314=0 ISRUN | 0 CAPSCHRGO | I513 = 0 |
| I315=0 AV | I415 = 0 | I514 = 0 |

32002 — 32003 — 32004

Main (32012) — Tools (32013) — Output (32014) — PWM Reset (32011)

| | | | | 3301/2 | 3301/3 | 3301/1 | | | | |
|---|---|---|---|---|---|---|---|---|---|---|

(3301)

| 0:1/0 = 0 FWDTM1 | 0:1/8 = 0 | 0:2/0 = 0 FWDTM2 | 0:2/8 = 0 | Tools | Input | Outputs Enabled | 0:8/0 = 0 XI | 0:8/1 = 0 CRRCT1 | 0:8/2 = 0 CRRCT2 | 0:8/3 = 0 CRRCT3 | 0:8/4 = 0 CRRCT4 |
| 0:1/1 = 0 RVRTM3 | 0:1/9 = 0 | 0:2/1 = 0 RVRTM4 | 0:2/9 = 0 | | | | | | | |
| 0:1/2 = 0 COTM1 | 0:1/10 = 0 RSMV | 0:2/2 = 0 COTM2 | 0:2/10 = 0 FSMV | | | | | | | |
| 0:1/3 = 0 COTM3 | 0:1/11 = 0 WS | 0:2/3 = 0 COTM4 | 0:2/11 = 0 CI | | | | | | | |
| 0:1/4 = 0 CLOSEB | 0:1/12 = 0 ERGG | 0:2/4 = 0 COILB | 0:2/12 = 0 GEN | | | | | | | |
| 0:1/5 = 0 CLOSEGTR | 0:1/13 = 0 AB | 0:2/5 = 0 FIELDARM | 0:2/13 = 0 CHRGCAPS | | | | | | | |
| 0:1/6 = 0 CLOSETM1 | 0:1/14 = 0 SA | 0:2/6 = 0 CLOSETM2 | 0:2/14 = 0 CBPUMP | | | | | | | |
| 0:1/7 = 0 CLOSETM3 | 0:1/15 = 0 BLEEDAIR | 0:2/7 = 0 CLOSETM4 | 0:8/5 = 0 | | | | | | | |

FIG. 35 ered by
METHOD FOR MONITORING AND CONTROLLING LOCOMOTIVES

CROSS REFERENCE TO RELATED APPLICATION

Cross-reference is made to U.S. application Ser. No. 10/649,286, filed Aug. 26, 2003, entitled "A Method for Monitoring and Controlling Traction Motors in Locomotives," to Donnelly et al., which contains related subject matter and is incorporated herein by this reference.

FIELD OF INVENTION

The present invention relates generally to a method and system for optimizing the performance and maintenance profile of a locomotive by exercising control over various aspects of the drive train including control over individual drive axles.

BACKGROUND OF THE INVENTION

Existing railroad locomotives are typically powered by diesel electric engines in which a diesel motor drives an electric generator to produce electric power to drive electric motors which in turn drive the drive wheels of the locomotive. The present inventor has disclosed the use of a gas turbine engine fueled by compressed natural gas in substitution for the traditional diesel engine in his U.S. Pat. No. 5,129,328 issued Jul. 14, 1992, and as a booster unit for the diesel engine in his U.S. Pat. No. 4,900,944 issued Feb. 13, 1990, both of which are incorporated herein by reference.

The use of energy storage batteries in combination with a generator is known for automobiles, buses and other road and highway vehicles. Such hybrid engines for vehicles are advantageous due to their increased fuel efficiency and reduced pollution. In those applications, it is important to minimize the weight of the batteries to maintain fuel efficiency. Electric batteries have been used to store electric power to drive electric locomotives as, for example, disclosed by Manns in U.S. Pat. No. 1,377,087 issued May 3, 1921 which is incorporated herein by reference. In Manns, three standard diesel engines are used to drive generators to charge the storage batteries. Such a system has not achieved commercial acceptance over existing diesel electric locomotives due to the added cost and complexity of providing multiple diesel engines in addition to the storage batteries.

The present inventor has also disclosed the use of a battery powered locomotive which has a ratio of energy storage capacity to charging power in the range of 6 to 40 hours in his U.S. Pat. No. 6,308,639 issued Oct. 30, 2001 which is also incorporated herein by reference.

The present inventor has also disclosed the use of individual chopper circuits associated with individual drive axles in his copending U.S. patent application Ser. No. 10,083,587 filed on Feb. 26, 2002.

There remains a need for a fuel-efficient locomotive which uses a combination of a small fuel-powered generator, a substantial energy storage capacity, and control systems that regulates and maintains the power train at maximum fuel efficiency and minimizes maintenance. Such control systems would also allow greater command over individual drive axles to help alleviate undesirable conditions such as non-synchronous wheel slippage and wheel locking.

SUMMARY OF THE INVENTION

These and other needs are addressed by the various embodiments and configurations of the present invention. The present invention is directed generally to an integrated method for monitoring, controlling, and/or optimizing an electrically powered locomotive.

In a first embodiment, each axle assembly, which is typically an axle, a traction motor, and two wheels, is monitored and controlled independently using one or more sensors and a control feedback loop. The locomotive typically includes a plurality of axle assemblies, a primary energy source, an energy storage unit, and an energy conversion device to convert the energy output by the primary energy source into a form suitable for storage in the energy storage unit.

For example, in one configuration an individual chopper circuit is provided for each traction motor. Each chopper circuit typically includes a drive switch, a free-wheeling bypass, which further includes a free-wheeling gate, and a filter to absorb voltage transients and smooth motor current ripples during switching. During any selected time interval, each chopper circuit is either in the driven or free-wheeling mode. In the driven mode, the drive switch is conducting and a power pulse is provided to the traction motor. In the free-wheeling mode, the drive switch is non-conducting and the power pulse circulates through the free-wheeling bypass circuit. By time sequencing the power pulses to individual traction motors, the current draw on the energy storage system can be minimized over a significant portion of the operating range since instantaneous current requirements from individual motors are not additive. This independence of individual current requirements can have the positive effect of reducing both the impedance seen by the energy storage unit and the internal resistive losses sustained in the energy storage unit. The flexibility of individually controlling power to the traction motors can be an efficient and effective approach to correcting non-synchronous wheel slip. The simplified circuit affords a straightforward means of smoothly removing and then restoring power to a slipping wheel while maintaining the pre-slip level of power to the wheels not experiencing slip. This can have the advantage of significantly reducing the power requirements and tread wear typically experienced with incidents of non-synchronous wheel slip.

In yet another example, the revolutions per minute of each axle are monitored to detect wheel slip during locomotive acceleration or wheel lock during braking. As will be appreciated, wheel lock can occur when brakes are applied and are either slow or unable to release upon command. When the revolutions per minute exceed a selected threshold, the controller assumes that the wheels on the axle are slipping and controls power to the respective traction motor as set forth above. When the revolutions per minute are at or near zero when the brakes have been applied or after brakes have been released, the controller assumes, if other motion detectors such as, for example, a doppler radar system indicates locomotive movement, that the brakes are locked and selectively applies a pressurized fluid, such as air, to a fluid-activated brake release. The pressurized fluid is forced through ports in the brake shoe (or pad in the case of disc brakes) and against the braking surface to forcibly release the brake shoe or pad from the braking surface.

In yet another embodiment, a controller controls an excitation circuit to the energy conversion device to control the load on the primary energy source. There are two methodologies for controlling the excitation circuit. First, when a first predetermined set point is exceeded by a first monitored parameter, the excitation current is increased and, when a second predetermined set point is exceeded by the first monitored parameter, the excitation current is decreased. The first monitored parameter is revolutions per minute of a mechanical component of the prime energy source. Second, when the first predetermined set point is exceeded by a second monitored parameter, the excitation current is decreased and, when the second predetermined set point is exceeded by the second monitored parameter, the excitation current is increased. The second monitored parameter is the output power of the energy conversion device. In this manner, the primary energy source, when operating, can be reliably maintained at or near a peak fuel efficiency, maximum torque, maximum power or any other desired engine operating condition.

In yet another embodiment, a controller is configured to provide reliable speed control for the locomotive. The velocity of the locomotive may be controlled by two primary techniques. In a first technique, a substantially constant power is maintained across each of the plurality of traction motors. As will be appreciated, the power is related to the specified velocity. In a second technique, the revolutions per minute of each of the plurality of axles are maintained at a rate related to the specified velocity. In these technique, the individual monitoring of the power and/or revolutions per minute of each axle assembly can permit different powers pulses to be applied across each traction motor. Such selective power pulse application can take into account operational differences among the axle assemblies, such as differently sized wheels, traction motors of differing efficiencies, and the like.

In another embodiment, the energy storage unit of the locomotive is configured as a bank of capacitors which store at least most of the electrical energy. A pulse forming network can be provided to convert the output of the capacitors to a form acceptable to the traction motors. This embodiment would be preferred if a bank of capacitors have a higher energy density than a battery pack of comparable storage capacity.

In a preferred embodiment, a controller unit and system of sensors is used to monitor, synchronize and optimize the operation of the locomotive drive train as well as the individual drive axles especially during acceleration and braking. The controller also provides the locomotive operator with information through a system of performance data and warnings that allow the operator to manually override various functions in an emergency. The information and warnings may be provided by conventional means such as warning lights and bells and the like, or by these conventional means supplemented by and by a computer console that can access a variety of control and informational screens.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 7 shows a schematic of a battery pack with some of the racks connected in a parallel and some in series and reconfigurable for adding more output power.

FIG. 22 shows a flow diagram for the logic for a fuel-efficient charging control for the charging apparatus of a battery-powered locomotive.

FIG. 32 shows an example of a digital input monitor screen.

FIG. 33 shows an example of an output monitor screen.

FIG. 35 shows an example of a derate and shutdown screen.

DETAILED DESCRIPTION OF THE DRAWINGS

The present invention discloses an integrated method for monitoring, controlling and optimizing an electrically powered locomotive using a combination of sensors and software to provide feedback that optimizes power train efficiency and individual drive axle performance for a locomotive that utilizes one of several possible electrical energy storage systems to provide the tractive power. A drive axle is comprised of a DC traction motor, an axle and two wheels. The locomotive includes at least two drive axles and can typically include as many as 8 drive axles. In addition to utilizing an electrical energy storage system and individual chopper circuits for each of a subset of drive axles (which typically is an individual chopper circuit for each drive axle), the present invention incorporates a comprehensive logic and software system to monitor, control and optimize the flow of power in the locomotive. This system includes a method of load control for the prime energy source; a method of releasing locked wheels; and a method of accurately controlling the speed of the locomotive in the low speed range. The net result is a locomotive that has an integrated system of control over all aspects of the locomotive power train including control over individual drive axles, especially during acceleration and braking.

Figure 1:
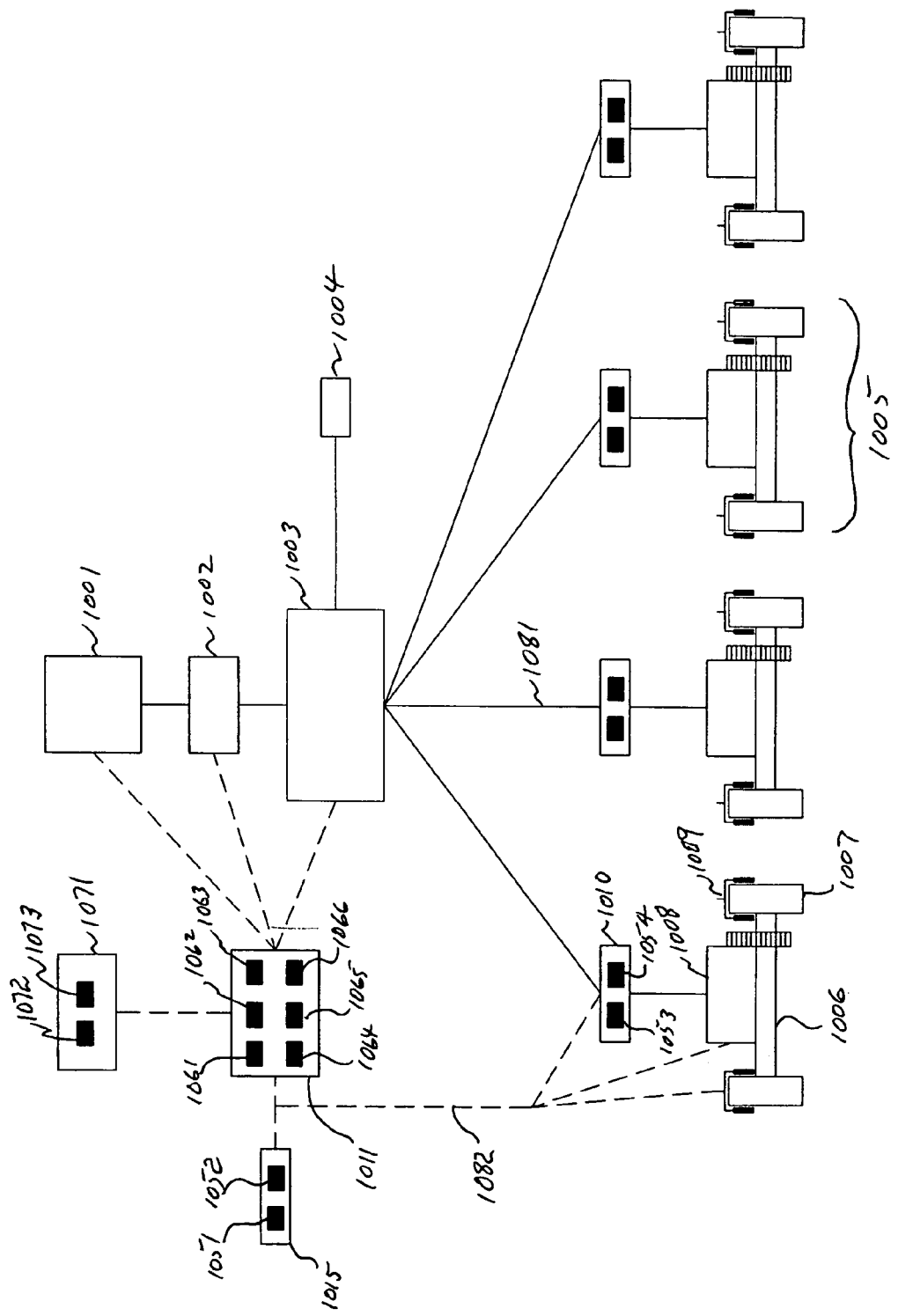
FIG. 1 shows the principal elements of the preferred embodiment.

The locomotive power train generally includes the following principal elements as shown in FIG. 1. A prime energy source 1001 provides the basic energy to the system. The prime energy source 1001 drives an apparatus or device 1002 for converting mechanical energy of the prime energy source to a direct current ("DC") output charging source. A prime energy storage unit or device 1003 stores electrical energy delivered by the conversion apparatus 1002 and provides most of the power for the traction motors. The locomotive may also include a number of auxiliary systems represented here as a single element 1004. These include, for example, auxiliary compressors (not shown), auxiliary power supplies (not shown) of various voltages, heating and cooling systems (not shown), and lighting and auxiliary control equipment (not shown). In the present invention, power is supplied to these auxiliary systems 1004, as required, by the main energy storage system 1003 since the charging source 1002 may or may not be operating.

The locomotive may have a plurality of axle assemblies 1005, each of which is comprised of an axle 1006, wheels 1007, a traction motor 1008 and an air-brake 1009. The air-brake 1009 may be a conventional disc or tread type rail braking system or it may be a conventional braking system that includes an air-activated brake release system used in wheel-lock situations, such as described in FIG. 18. In the present invention, each axle assembly 1005 with a traction motor 1008 has a chopper circuit 1010 associated with it. Each chopper circuit 1010 derives its power from the energy storage device 1003 and allocates and configures the power flow from the energy storage unit 1003 to at least two of, and typically each of, the DC traction motors 1008.

In the present invention, a locomotive master chopper control system 1015 and individual axle chopper circuits 1010 provide a method of controlling power provided from the energy storage unit 1003 to the direct current traction motors 1008. This method generally includes the steps of: a) determining the power requirement for each motor 1008 at each of a number of discrete, successive time intervals; b) determining the necessary effective power pulse width, amplitude and spacing to achieve the desired power for each motor 1008 during a selected time interval; c) sequentially pulsing power to at least some of the motors 1008 during the selected or a subsequent time interval for a duration (or length of time) necessary to achieve the power requirement at each time interval.

The individual chopper circuits 1010 receive timing and power instructions from the locomotive master chopper control system 1015 which includes a master clock 1051 (an integrated circuit that generates a series of pulses) and pulse sequencer 1052 (an integrated circuit that sequences the pulses into uniform periods for purposes of the pulse width regions for each motor). Each chopper circuit 1010 includes at least its own: pulse width modulator 1053 (provides 'clipped' triangular waveforms that result in the creation of a series of pulses, which is used essentially to toggle the power switch devices on and off according to the pulses); and drive switch 1054 (insulated gate bipolar transistors, abbreviated as IGBTs, that are switching devices capable of sequentially 'pulsing' the power source to the different motors at a very fast rate). A latching circuit (not shown), can also be provided that is set so that after the IGBT has failed to fully saturate or a fault current has been detected, it will interrupt the drive to the IGBT. This forces the IGBT off and prevents the IGBT from operating into a short circuit. The latching circuit can be provided by an electronic circuit board or by software logic associated with logic unit 1011 described below.

All of the principal elements of the locomotive are monitored, co-ordinated and controlled by a such as, for example, a Programmable Logic Circuit ("PLC"), a microcontroller, or an industrial computer. The logic unit 1011 includes: a ramping function 1061 (logic to ramp requested throttle level at a rate that is reasonable for the locomotive); a power dispatch logic 1062 (central logic that evaluates any pertinent derate conditions, any wheel slip, as well as the requested throttle level, to determine the appropriate power level to be sent to the pulse width modulation module 1053); an detection scaling function 1063 (logic for determining non-optimal performance, such as wheel slip. Power reduction to individual motors can be put in place in the case of differential wheel slip and overall power is reduced in the case of synchronous wheel slip); a derate evaluation logic 1064 (logic to reduce the power demand below that requested by the operator for protection of equipment. This could include reducing power in case equipment is at risk of overheating or currents climb close to equipment design limits); a brake control logic 1065 (control of the air brake system including individual axle wheel lock release); and a generator 1002 load control logic 1066 (control of the generator 1002 excitation field to maintain the prime energy source 1001 at approximately peak fuel efficiency or other desired condition). The logic unit 1011 receives the information from an operator input device 1071 which includes a throttle setting 1072 and a speed setting 1073. The throttle 1072 is typically a throttle notch between idle and eight positions but also could be an electronic device, such as an infinitely variable control or a touch screen. The speed setting 1073 is typically a rheostat motor voltage control but also could be an electronic device, such as an infinitely variable control or a touch screen. The logic unit 1011 also receives the input information on the status of various components of the system from several sensing devices described below in FIG. 2. As discussed above, the logic device 1011 processes all the input information and sends out instructions to co-ordinate the operation of: the prime energy source; the DC conversion apparatus; the charging and discharging of the energy storage unit; the DC traction motor electrical controllers; the DC traction motors; and the braking system on the individual axle assemblies 1005. The continuous lines 1081 connecting various elements represent physical connections and the dashed lines 1082 connecting various elements represent simplified electrical control and informational linkages. It should be noted that the control and informational linkages shown apply to all the axle assemblies 1005, even though the connections are shown only to the first assembly.

The prime energy source can be any suitable power or energy source such as for example a reciprocating diesel engine, a gas turbine engine, a small diesel reciprocating engine, a microturbine, a fuel cell. Alternately, prime energy can be provided by an external source such as overhead electrical trolley wires or directly plugging into a utility grid. The prime energy source 1001 is preferably a high-efficiency reciprocating diesel engine with a preferred power rating approximately in the range of about 25 to 250 kW. With reference to the energy storage unit 1003, the preferred range of the ratio of energy storage capacity to charging power of the generator is in the range of about 6 hours to 40 hours. When charging is required, it is more preferable for the prime energy source 1001 to be operated at or near its peak fuel efficiency rating which is preferably in the range of approximately 12 to 16 kwh per gallon of fuel for a small diesel engine. It may also be preferable for the prime energy source 1001 to be operated at or near its peak torque or power rating under certain circumstances and these operating regimes would require different set points. Otherwise, when the energy of the energy storage unit 1003 is at its full rated storage capacity (as determined, for example, by an upper voltage set point in the case of a battery pack), the prime energy source 1001 is preferably turned off. The prime energy source 1001 may also be turned off when, for example, the locomotive is operating in a confined space, such, as for example, a locomotive maintenance shed.

The conversion apparatus 1002 typically converts mechanical energy form the prime energy source 1001 to direct current (DC) electrical energy and the conversion is preferably effected by an alternator which outputs rectified DC power to an energy storage device 1003. The alternator is preferably driven by the prime energy source. The charging generator 1002 is preferably an alternator that operates in the approximate the range of about 50 to 75 Hertz. The alternator is driven by the prime energy source and may contain a means for converting alternating ("AC") electrical power to direct current ("DC") electrical power. The alternator power output is preferably controlled by varying the excitation current to the alternator field coils.

The control of the power output of the DC charging system 1002 to the energy storage unit 1003 can be accomplished, for example, by varying the excitation current provided to the alternator 1002 to maintain an at least substantially constant power output to the energy storage unit 1003, while appearing as an approximately constant load to the prime energy source 1001. There are typically at least two techniques of controlling the output of the charging generator 1002 to effect load control for the diesel engine. In a first technique, the RPMs of the diesel engine are monitored such as, for example, by a tachometer and the RPMs are maintained within a range which is defined by upper and lower RPM set points. This range is selected for maximum fuel efficiency of the prime energy source. If the RPMs fall below the selected range (indicating a heavy load on the engine), then the excitation current to the alternator can be reduced to reduce the power output of the alternator until the engine RPMs are restored to within the desired range. If the RPMs rise above the selected range (indicating a light load on the engine), then the excitation current to the alternator can be increased to increase the power output of the alternator until the engine RPMs are restored to within the desired range. In a second technique, the DC output power of the alternator is monitored as determined by the product of the measured output volts and amperes. If the output power falls below the lower set point of the selected output power range, then the excitation current to the alternator can be increased to restore the power output to within the desired range. If the output power rises above the upper set point of the selected range (presenting a heavy load to the engine), then the excitation current to the alternator can be decreased to reduce the power output to within the desired range. In this technique, the RPMs of the engine can also be monitored to ensure that the RPMs stay within the range selected for maximum fuel efficiency. If they fall outside the selected range, then the excitation current to the alternator can be further modified to bring the engine RPMs back into the desired range.

In the event that prime energy is provided by an external source such as overhead trolley wires or plugging into a utility grid, the charging system 1002 would be replaced by a voltage step-up or step-down apparatus and, if required, a converter from AC to DC power so as to provide the proper driving voltage to charge the energy storage unit 1003.

The electrical controller 1010 for each DC traction motor 1008 is preferably a chopper circuit such as disclosed in copending U.S. patent application Ser. No. 10,083,587, which is incorporated herein by this reference. The chopper circuit and control system, as applied in the present invention, are discussed more fully in FIGS. 8 and 9.

The energy storage unit 1003 may be any other suitable electrical storage device, such as for example an energy storage capacitor bank, a flywheel generator system of which a homopolar generator is an example. The energy storage unit is typically composed of a plurality of subunits, such as batteries and/or storage capacitors. The energy storage unit 1003 is preferably an electrical energy storage battery pack. The electrical generator 1002 provides DC power to the energy storage unit 1003 at an at least substantially constant power, with the output voltage being higher than the maximum voltage of the battery pack. The battery pack typically has a maximum voltage, usually input as an upper set point to avoid gas generation or other damage to the battery cells and a minimum voltage usually input as a lower set point to avoid seriously diminishing the recharge capacity of the battery plates. The upper and lower set points define the operational range of the battery voltage. The charging generator is preferably always in operation when the battery voltage is below the lower set point. The charging generator is usually in operation when the battery voltage is below the upper set point. An exception might be when the locomotive is operating in, for example, a confined space, where emissions from the prime energy source would be undesirable. The charging generator is most preferably not in operation when the battery voltage is above the upper set point.

Figure 9:
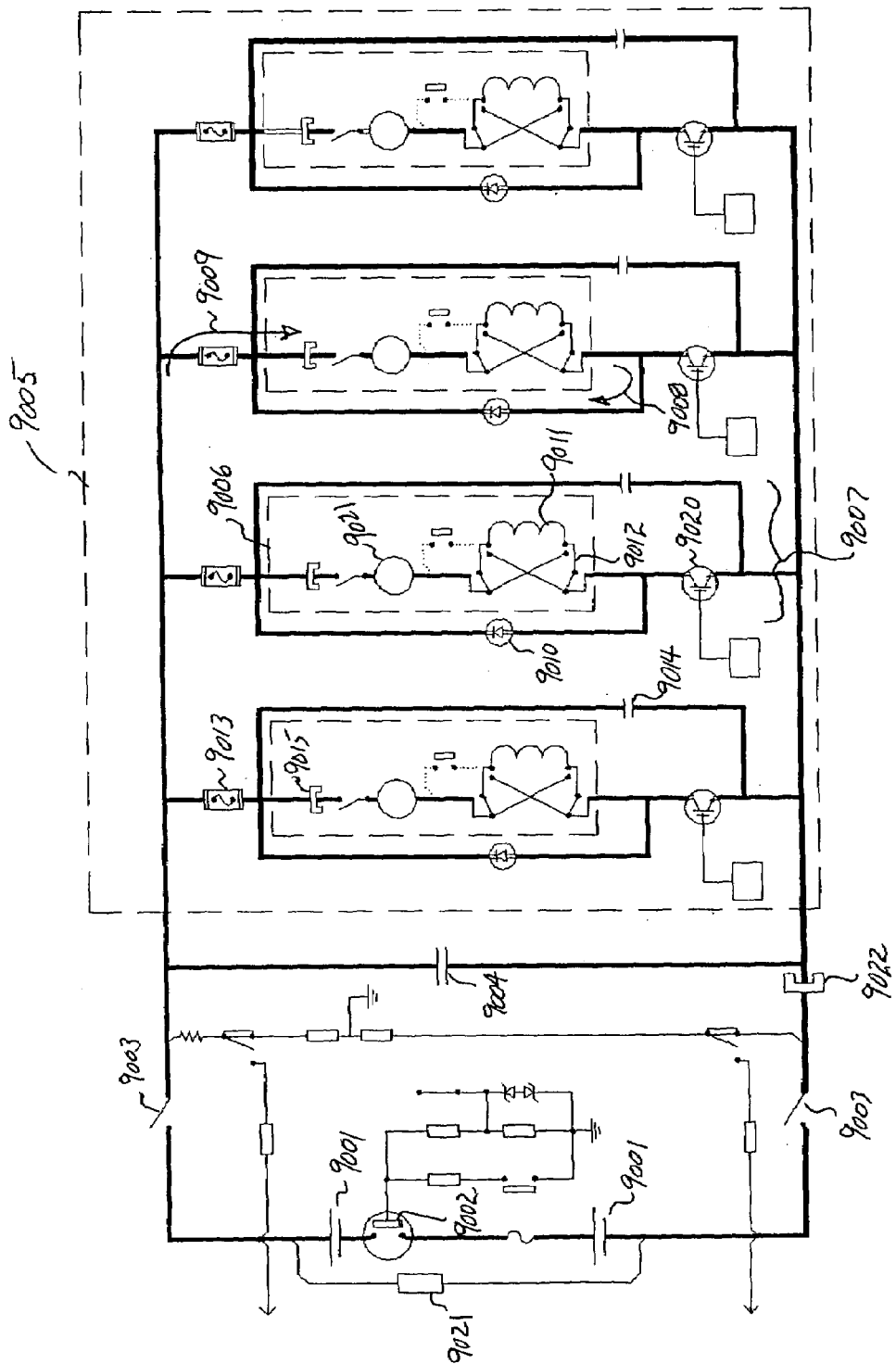
FIG. 9 shows an electrical schematic of a battery energy storage system powering four DC traction motors.

A new method of setting the upper and lower set points that define the operational range of the energy storage unit is disclosed. Typically, the upper and lower voltage set points of the energy storage unit are selected by picking an upper voltage and a lower voltage based on experience. In the new method, the quantity of charge in the energy storage unit is accounted for by continuously (by analogue or digital sampling) measuring the current flow to and from the energy storage unit and integrating the current time history to determine the state of charge in the energy storage unit. The location of the current sensor used to apply this method is shown in FIG. 9. Using this technique, if the total charge in the energy storage device falls below the upper set point of the selected range, then the charging generator is turned on. If the total charge rises above the upper set point of the selected range, then the charging generator is turned off. In the accounting of charge in the energy storage unit, a small amount of charge (typically 1 or 2% of the total charge) is lost to the system through various inefficiencies and this loss is estimated and added to the charge total to maintain an accurate accounting. Either of the above methods may be used separately or in combination to obtain better control over the charging process for the energy storage device to maintain it within its optimum operating range. The same techniques may be used if the energy storage device is a battery pack or a capacitor bank.

As part of its air-braking system, the locomotive may also include a system 1009 for releasing wheels that become locked during air braking. This wheel release system is discussed more fully in FIG. 18.

Figure 2:
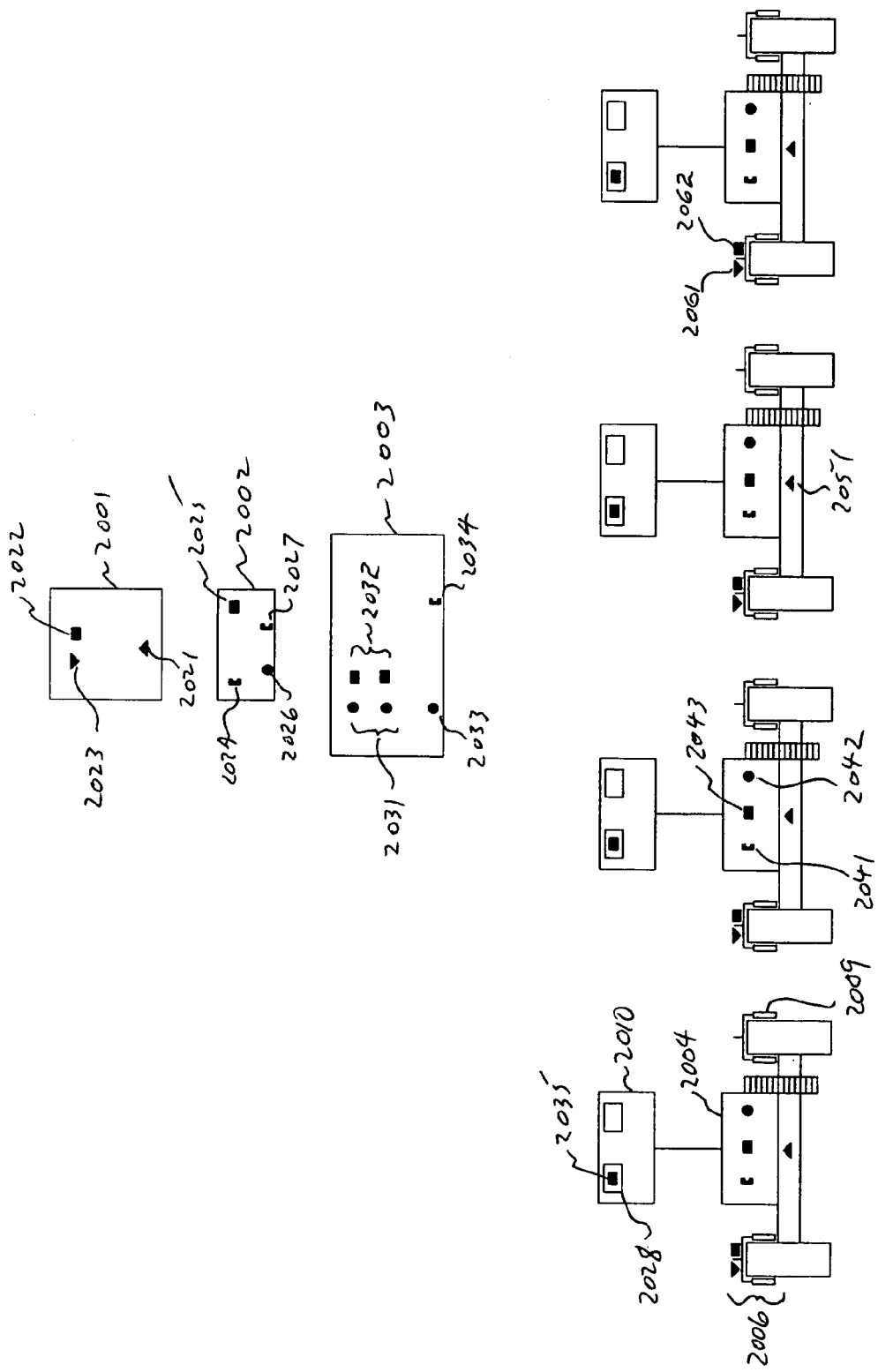
FIG. 2 shows a schematic representation of sensor locations for monitoring the power, charging and braking systems of a battery-powered locomotive.
Figure 28:
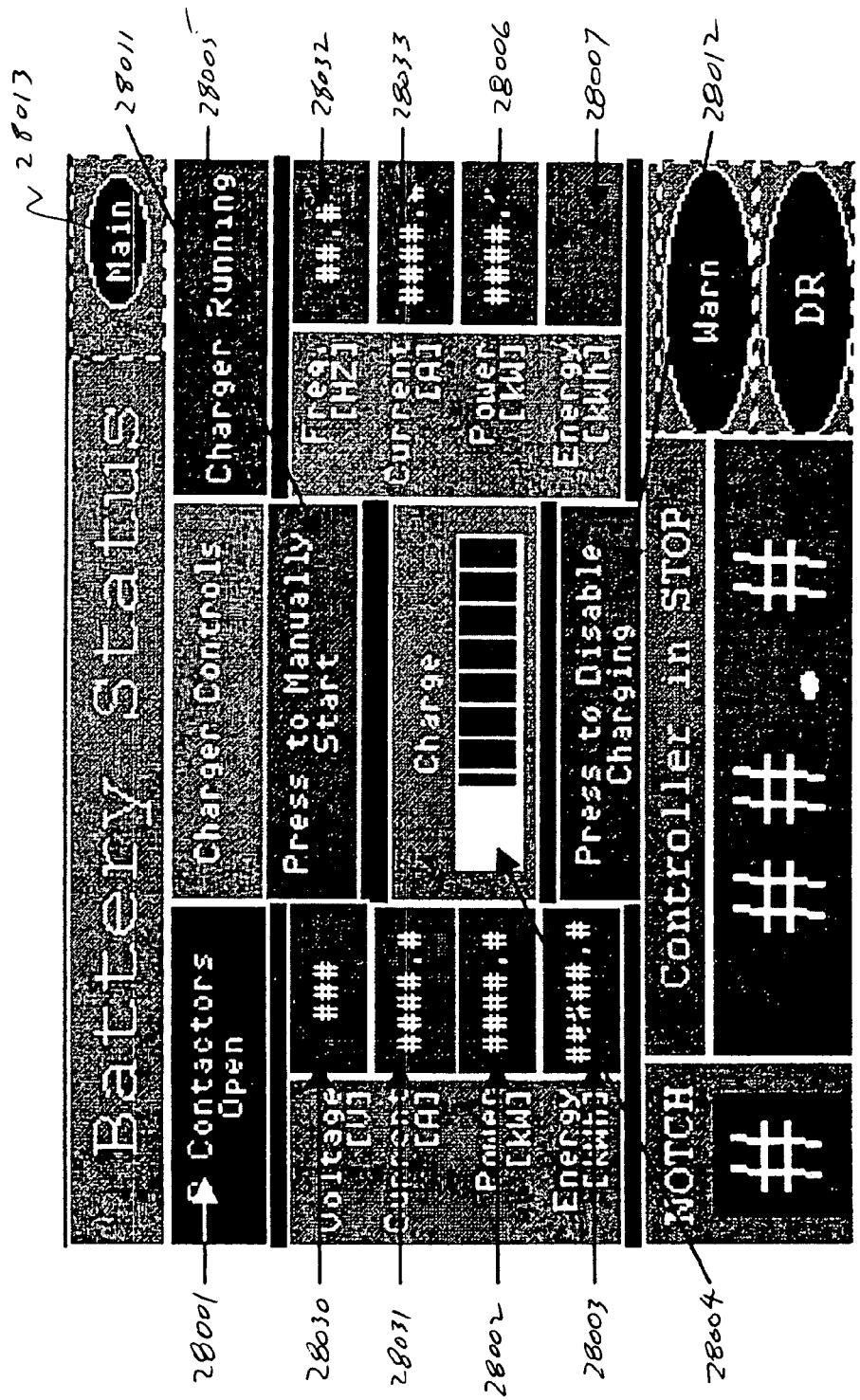
FIG. 28 shows an example of a battery status screen.

To provide the information necessary to synchronize the operation of the various components of the locomotive drive train, including, if necessary, the operation of individual axles, an appropriate placement of sensors monitors and measures a plurality of parameters as illustrated by FIG. 2. Here, voltage sensors are represented by solid circles; current sensors by a solid square "C" symbol; temperature sensors by a solid rectangle; rotary speed sensors by a solid triangle with vertex pointing up; and pressure sensors by a solid triangle with vertex pointing down. Voltage sensors include voltmeters, other common voltage transducers or voltage sensing devices; current sensors include current-sensing resistors, Hall current sensors, current-sensing transformers, current transducers, Rogowski coils or other common current measuring devices; rotary speed sensors include tachometers, axle alternators and the like; temperature sensors include thermocouples, thermistors, semi-conductors or other common temperature measuring devices and; pressure sensors include pressure transducers, pressure gages or other common pressure measuring devices. With reference to FIG. 2, the operating characteristics of the prime energy source 2001 such as, for example, the revolutions per minute (RPMs) of an internal combustion engine are measured by a first rotary speed sensor 2012; engine temperature by a first temperature sensor 2022 and engine oil pressure by first pressure sensor 2023. The RPMs of the prime energy source 2001 can also be determined from monitoring the power frequency of the conversion device 2002 (as indicated in FIG. 28). The field excitation current for the conversion device 2002 is sensed by a first current sensor 2024 and the temperature of the conversion device 2002 is measured by a second temperature sensor 2025. The DC output voltage and current are measured for the conversion device 2002, by a first voltage sensor 2026 and second current sensor 2027. The voltage at several locations of the energy storage unit 2003 may be measured using additional voltage sensors 2031 and the temperature at several locations of the energy storage unit 2003 may be measured using additional temperature sensors 2032. In addition, the output voltage and current are measured for the energy storage unit 2003 by a second voltage sensor 2033 and third current sensor 2034. The current to each IGBT 2028 on the individual chopper circuits 2007 are measured by additional current sensors 2035. The current to each traction motor 2004 is measured by additional current sensors 2041; the voltage across all or a portion of each traction motor 2004 may be measured by additional voltage sensors 2042; and the temperature the voltage representative of each traction motor 2004 may be measured by additional temperature sensors 2043. The rotational speed of a plurality of, and typically each, drive axle 2005 of the locomotive is measured by additional rotary speed sensors 2051. The air pressure in various locations of the locomotive braking system 2006, including locations where wheel release devices may be used, are monitored by additional pressure sensors 2061 and the temperature representative of the brake shoes 2009 may be measured by additional temperature sensors 2062. The locomotive will typically also have a doppler radar detector (not shown) that can independently determine locomotive speed. This system provides an indication of locomotive speed independent of the axle rotary speed sensors 2051 which cannot properly indicate locomotive speed when there is a synchronous wheel slip or synchronous wheel locking condition.

Figure 3:
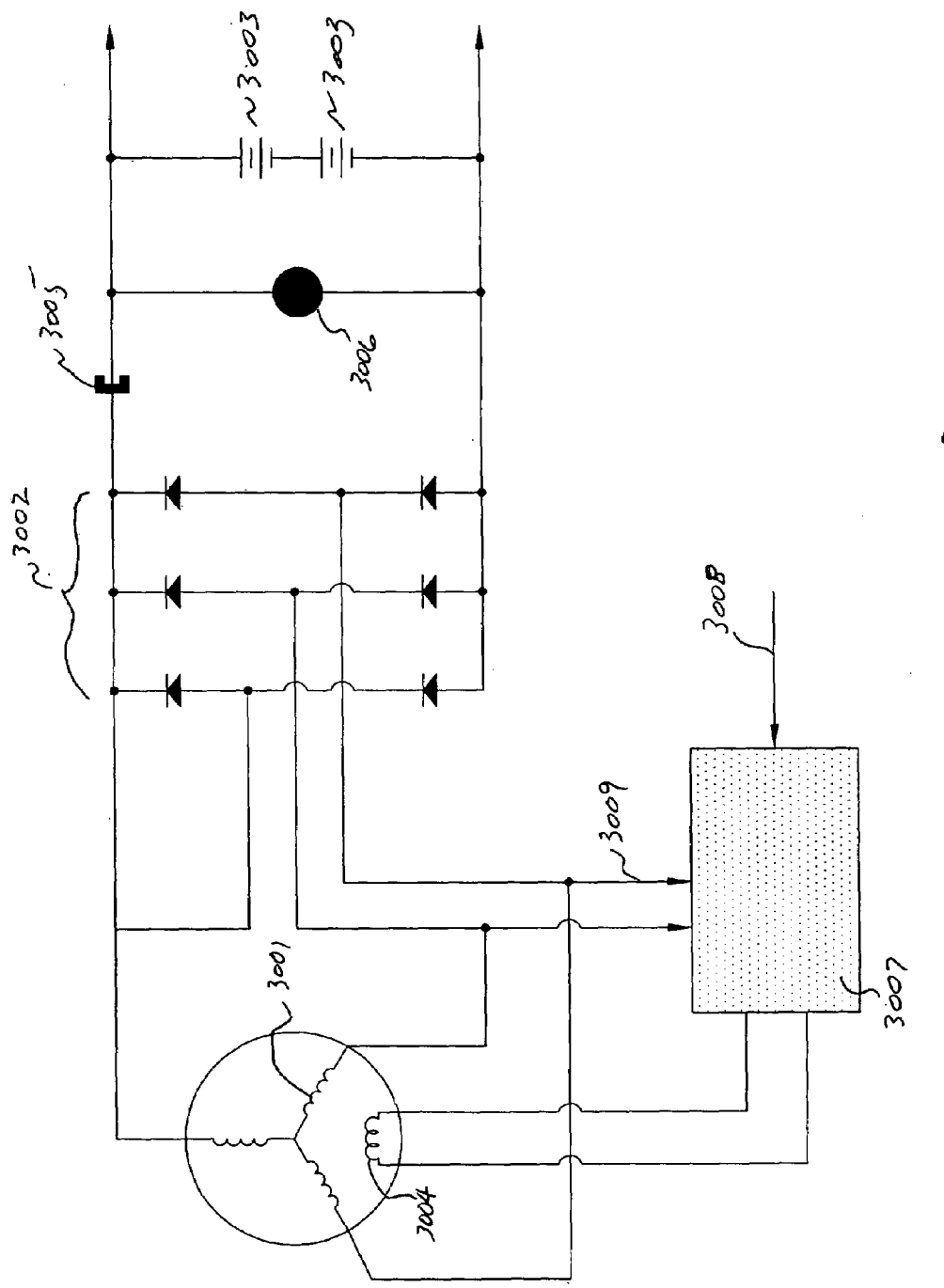
FIG. 3 shows an electrical schematic of a motor generator with exciter field control.

An example of a charging generator circuit is shown in FIG. 3 which shows an exciter coil that can be independently controlled. A stator 3001 generates an alternating current which is rectified by power diodes 3002. The rectified power is then fed to the prime energy storage source 3003 shown here as a storage battery. The rectified power is also provided to various auxiliary systems (not shown) such as for example blower and fan motors, lighting and compressors and the like. The output of the stator 3001 is controlled by an independently controlled exciter coil 3004. The output power to the energy storage source 3003 is monitored by a current transducer 3005 and a voltage sensor 3006. The generator excitation board 3007 receives its inputs from a computer control system via path 3008 or, in an emergency (such as from detection of an anomalously high voltage output from the generator, for example), from path 3009 originating from the voltage sensed across the stator 3001. In the case of such an emergency, the excitation board 3007 has the ability to override the control of the main logic controller and directly reduce the current to the excitation field coil 3004.

Figure 4:
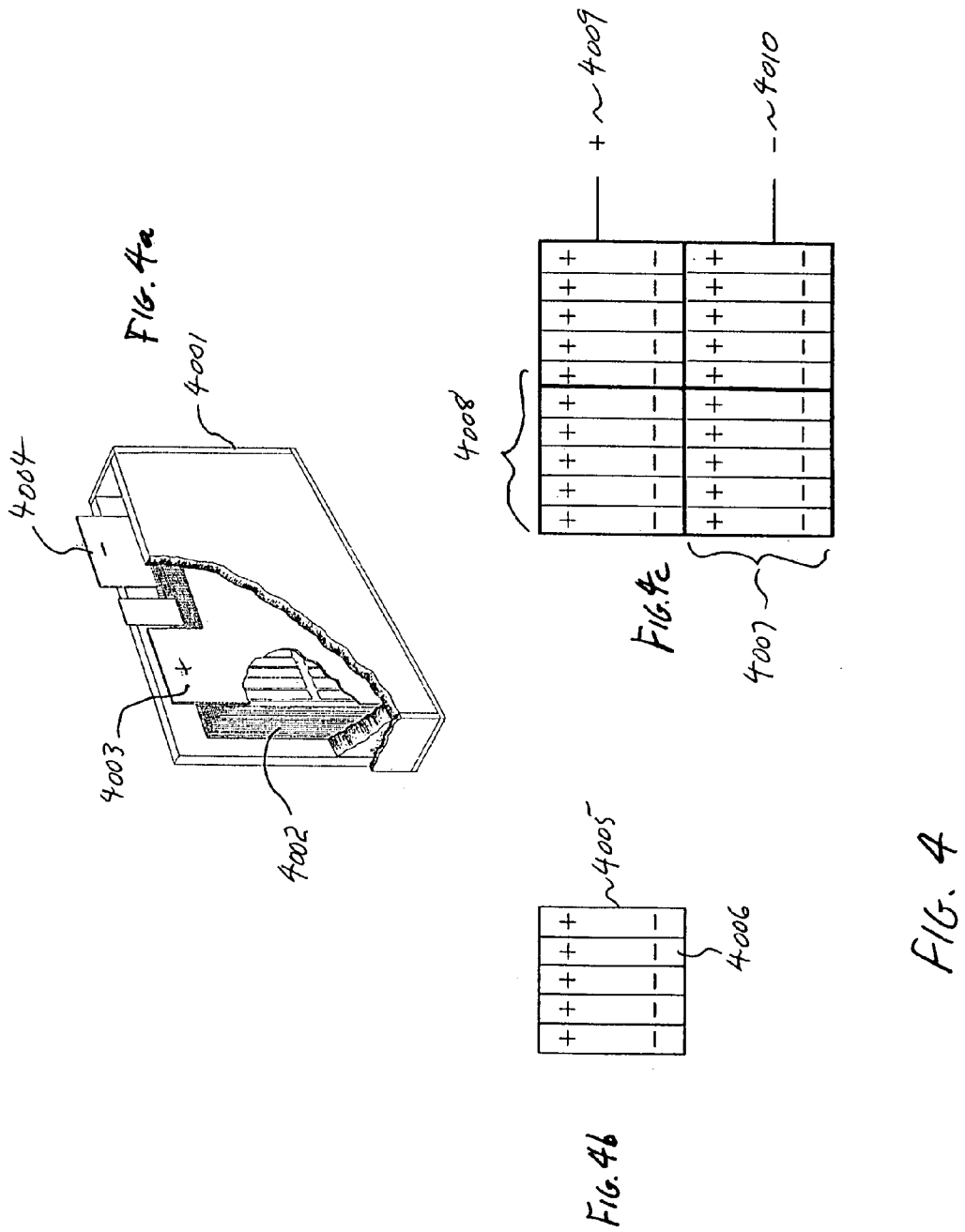
FIG. 4 is a schematic representation of the elements of an energy storage battery pack.

Referring to FIG. 1, the preferred energy storage unit 1003 is a battery pack. The battery pack may be divided into a plurality of racks. The racks mechanically and removably house the individual battery units to facilitate maintenance and replacement. The racks contain a plurality of individual battery units or other types of energy storage subunits, such as capacitors. The battery units are each comprised of a set number of cells. The preferred cells are those of a lead-acid type which has an electrochemical potential of about 2.13 volts, the highest currently available in rechargeable battery chemistry. The definition of these divisions are illustrated in FIGS. 4a, b and c which are a schematic representation of the elements of an energy storage battery pack. In FIG. 4a, a battery unit 4001 is comprised of individual cells 4002, a positive terminal 4003 and a negative terminal 4004. The number of cells 4002 is preferably in the range of 1 to 10 and most preferably in the range of 1 to 6. The fewer cells 4002, the easier it may be to replace battery units that become degraded or fail. As shown in FIG. 4b, battery units 4006 may be assembled together in a battery rack 4005. The battery rack 4005 is typically an assemblage of a convenient number of battery units 4006 that allow for easy maintenance or assembly into groups that are connected in series or in parallel. The number of battery units 4006 in a battery rack 4005 is preferably in the range of 2 to 50 and more preferably in the range of 4 to 16. Referring to FIG. 4c, battery racks 4008 may be assembled to form a battery pack 4007 which is largest division considered in the present invention. The number of battery racks 4008 in a battery pack 4007 is preferably in the range of 4 to 100 and more preferably in the range of 10 to 60. The entire battery pack 4007 has a positive terminal 4009 and a negative terminal 4010. If a high energy capacitor bank is used as the energy storage method, the same definitions may be used with battery units replaced by capacitors, the battery rack by a capacitor rack and the battery pack by a capacitor bank.

Figure 5:
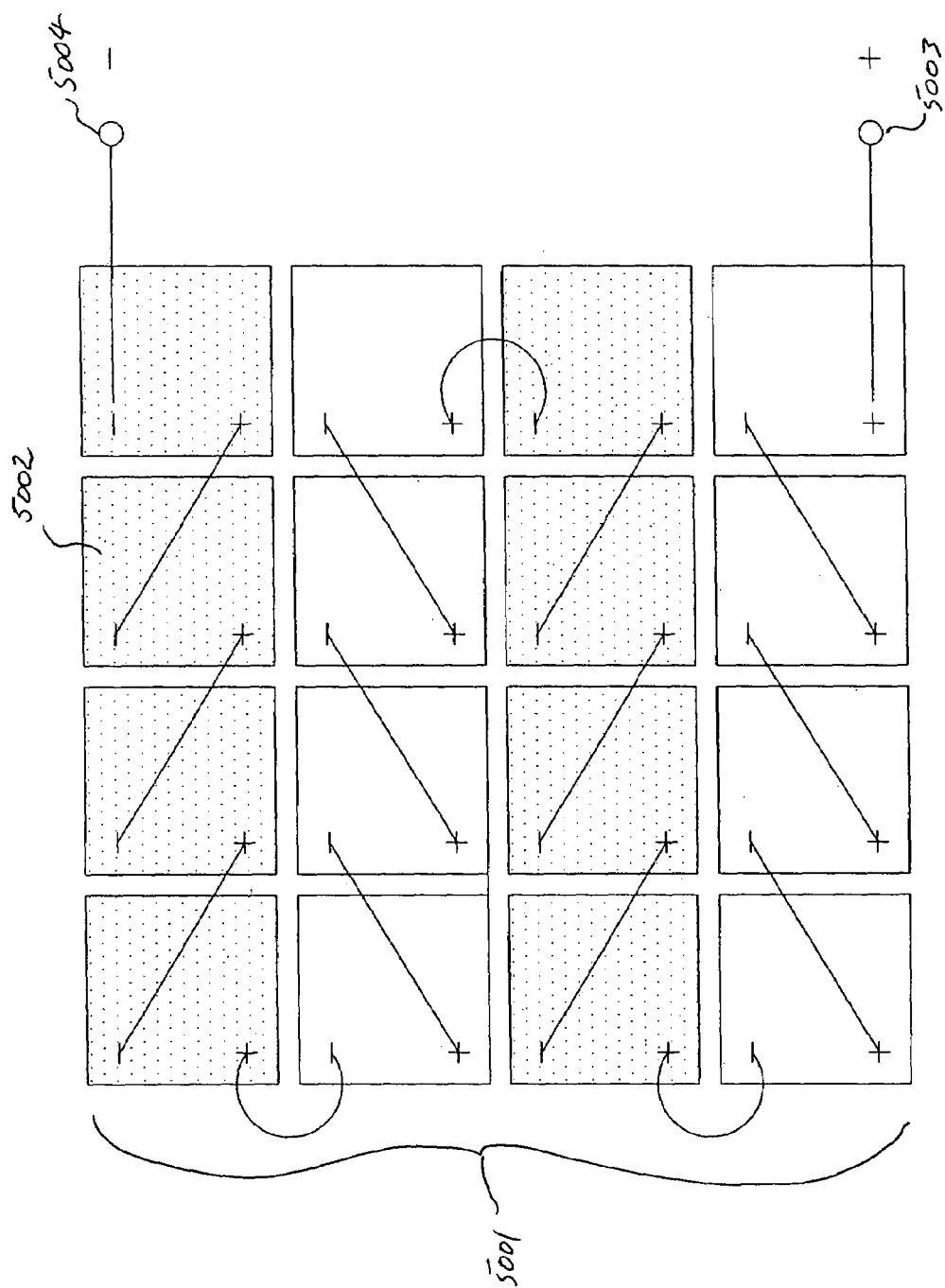
FIG. 5 shows a schematic of a battery pack with all racks connected in a series configuration.

In a preferred embodiment, all of the battery units are connected electrically in series so that the capacity rating of the battery pack, expressed in ampere-hours, is the same as the rating of each battery unit. In this embodiment, the voltage output of the battery pack is the sum of the terminal voltages of all the battery units. This embodiment, shown in FIG. 5, illustrates a schematic of a battery pack in series configuration. A battery pack 5001 is shown with sixteen battery racks 5002 where all the battery units (not shown) in each rack 5002 are connected in series and all the battery racks are connected in series. In this configuration, all the battery units are in series and the battery pack 5001 has a positive output terminal 5003 and a negative output terminal 5004. The same configuration may be used with battery units replaced by capacitors.

Figure 6:
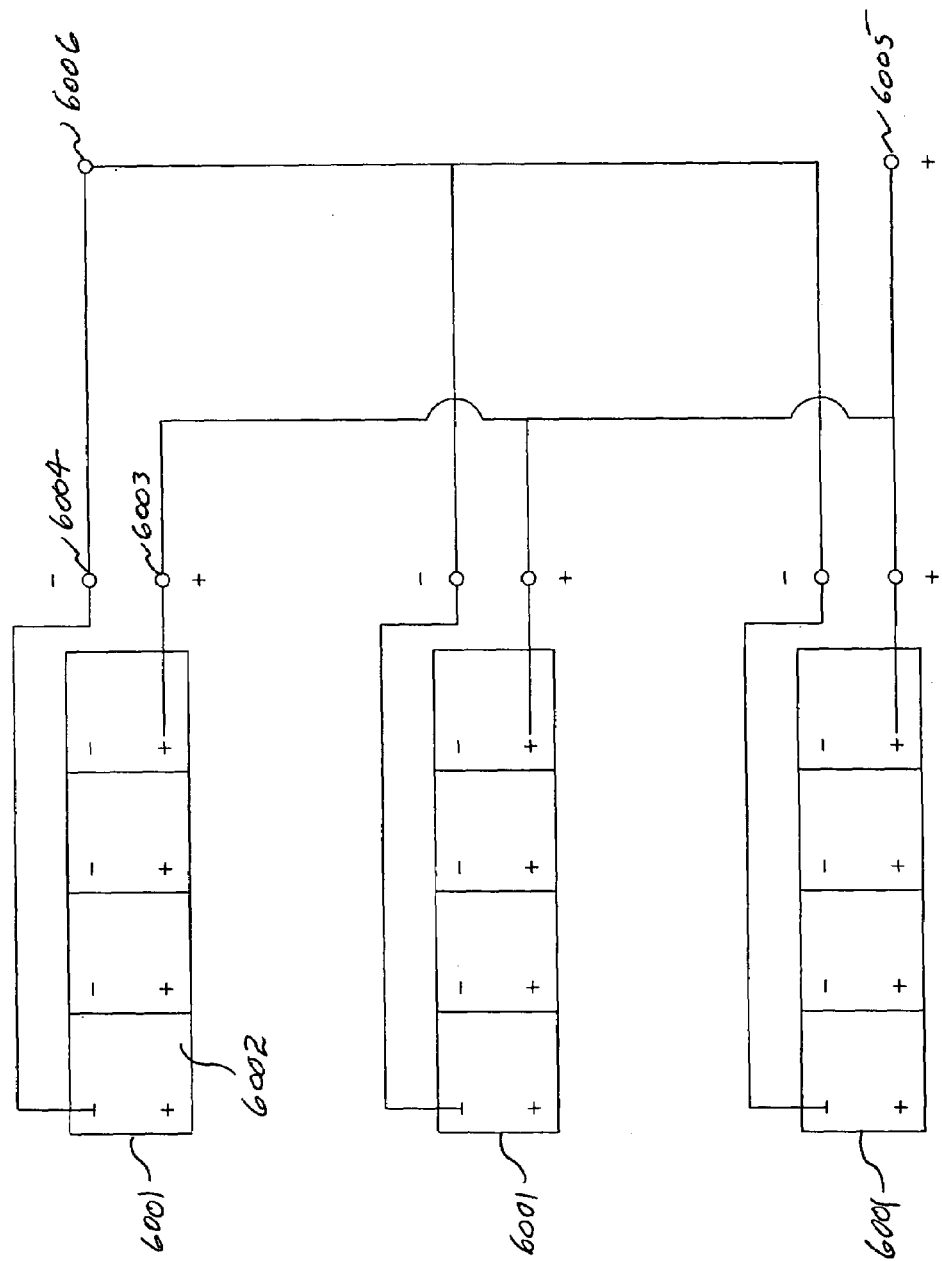
FIG. 6 shows a schematic of a battery pack with some of the racks connected in a parallel and some in series.

In another embodiment, a number of rack groupings may be connected in parallel. A rack assembly may contain one or more racks. Preferably, the rack groupings contain the same number of total battery units electrically connected in series, so that the voltage output of each rack assembly is the same. The preferred number of rack groupings in parallel is in the range of 2 to 6. This configuration increases the capacity rating of the battery pack to be equal to the rating of each battery unit times the number of rack groupings electrically connected in parallel. In this embodiment, the voltage output of the battery pack is the sum of the terminal voltages of all the battery units in any of the rack groupings. In this embodiment, the power of the locomotive may be derived from one or several or all of the rack groupings connected into the drive system. It is also possible, in this embodiment, to use individual rack groupings to control individual or groups of drive axles. In other words, each individual or subgrouping of drive axles may have one or more dedicated individual rack groupings, whereby electrical energy is provided to each individual or subgrouping of drive axles only by a corresponding subset of one or more rack groupings. This embodiment is shown in FIG. 6. The charging system can be configured to charge some or all of the parallel racks. FIG. 6 shows a schematic of a battery pack with some of the racks connected in a parallel and some in series. Each rack assembly 6001 is comprised of 4 battery racks 6002 and each rack assembly has a positive output terminal 6003 and a negative output terminal 6004. Each rack assembly 6001 can be used to drive one or more traction motors (not shown). Alternately, the rack groupings 6001 can be connected in parallel to drive all the traction motors. In this case the output terminals of the battery pack are a positive output terminal 6005 and a negative terminal 6006. When all the racks groupings 6001 have approximately the same open circuit output voltage at terminals 6004 and 6005 and that voltage is sufficient to power the traction motors, an advantage of parallel racks is to provide greater ampere-hour capacity for the locomotive. Another advantage is to provide backup power by only operating from one rack of the battery pack. The same configurations may be used with battery units replaced by capacitors.

In yet another embodiment, a number of rack groupings may be connected in parallel with the additional capability of providing for some or all of the rack groupings to be electrically switched to be in series with other rack groupings. The purpose of dividing the battery pack in this way is to provide the ability to rapidly increase the power available to drive the locomotive by, for example, switching automatically or manually some or all of the rack groupings from parallel to series so as to increase the output voltage of the battery pack. FIGS. 7a and b shows a schematic of a reconfigurable battery pack for adding more output power. FIG. 7a shows 3 battery rack groupings 7001, 7002 and 7003 connected in parallel with positive output terminal 7004 and negative output terminal 7005. The voltage output of this battery pack configuration is approximately the voltage output of each of the rack groupings. The ampere-hour capacity of this battery pack configuration is the sum of the ampere-hour capacity of each of the rack groupings in parallel. FIG. 7b shows 2 battery rack groupings 7011 and 7012 connected in parallel with positive output terminal 7014 and negative output terminal 7015. The third rack grouping 7003 of FIG. 7a has been divided in two. One half has been switched in series to rack grouping 7001 to make rack grouping 7011 and the other half has been switched in series to rack grouping 7002 to make rack grouping 7012. The voltage output of this battery pack configuration is approximately the voltage output of each of the racks and is 33% higher than the output voltage of the battery pack of FIG. 7a. The ampere-hour capacity of this battery pack configuration is the sum of the ampere-hour capacity of the two new rack groupings in parallel. The battery pack configuration of FIG. 7b can provide 50% more voltage and therefore 50% more power than the battery pack configuration of FIG. 7a. However, the battery pack configuration of FIG. 7b has 50% less ampere-hour capacity than the battery pack configuration of FIG. 7a. Switching from the configuration of FIG. 7a to the configuration of FIG. 7b has the advantage of providing a power boost such as may be required, for example, in an emergency or starting up a hill. The voltage of the battery pack is the voltage of 2 rack groupings and the capacity rating of the battery pack is the capacity rating of 3 times the rating of individual battery units.

When an additional surge of power is required, one rack module can be switched automatically or manually from parallel to having half its racks in series with each of the other two rack modules as shown in FIG. 7a and 7b. The switching can be done under manual or automatic control and heavy duty, high current switches known to those in the art, such as, for example, a solenoid- or relay-operated contact switch or switches which can be operated manually or by logic control. The measured parameter for switching from series mode to parallel mode and from parallel mode to series mode can be the power output from the battery pack. When the measured power output is lower than a selected threshold, the mode is switched from parallel to series and, when the power output is less than the selected threshold, the mode is switched from series to parallel.

The strategy of switching racks of energy storage units from parallel to series configurations, as described above, can also be readily carried out when the energy storage unit is a bank of energy storage capacitors.

This invention most preferably utilizes individual chopper circuits to control direct current to each DC traction motors. DC motors have performed as the motive force in a variety of applications including locomotives where, typically, multiple direct current motors are used. For example, locomotives may employ 2 to 8 driving axles, each driving axle having one DC traction motor.

It is known in the art to control the speed of a direct current series motor by using a chopper circuit which includes a main switch device in series with the motor and a bypass current path. This is a more efficient form of power control for locomotives than using resistance control systems. With a chopper circuit, the control of the speed of the traction motor is achieved by varying the power pulses supplied to the motor so that average power supplied is what is required and power is not wasted by dissipation in resistance control systems. A thyristor is one type of main switch device used in early chopper circuits. It has since been replaced by the more versatile Insulated Gate Bipolar Transistors ("IGBTs").

Figure 8:
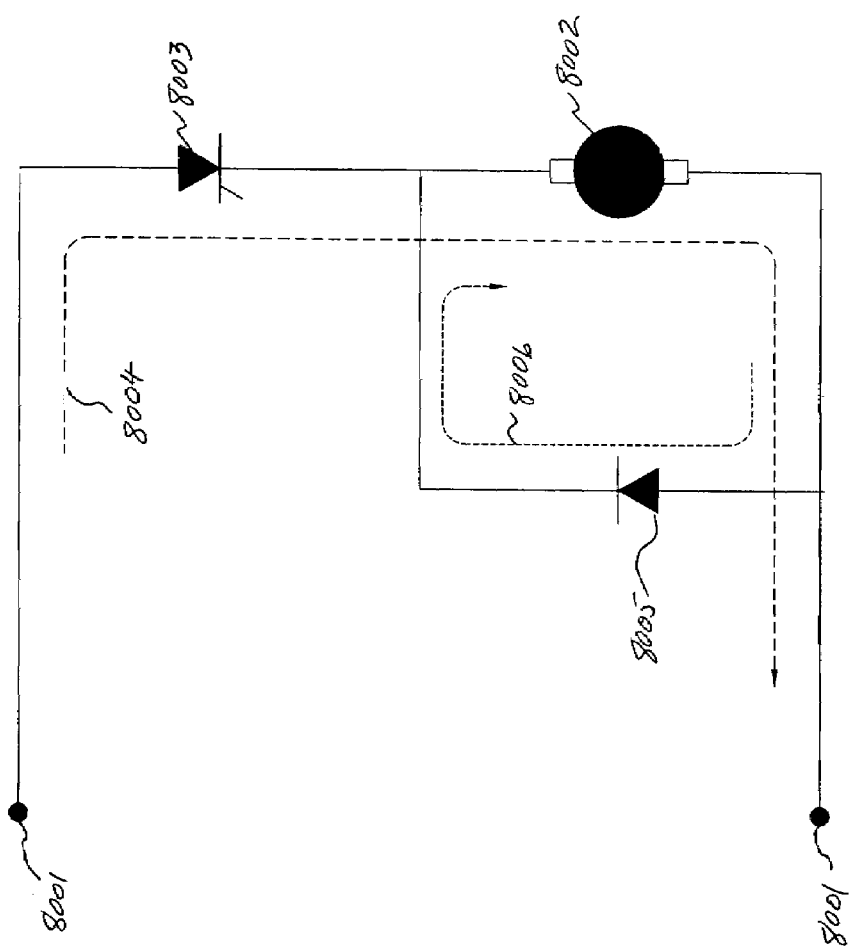
FIG. 8 shows a schematic of a typical chopper circuit illustrating the free-wheeling current path.

The main elements of a typical chopper circuit, as used in the present invention, are shown in FIG. 8. The chopper circuit has input terminals 8001 through which current flows into the circuit. The main current flow is along path 8004 which passes through an IGBT switch 8003 and a traction motor 8002. The main current path 8004 is active when the input power source (not shown) is powering the traction motor 8002. When the IGBT 8003 is switched to its off position, current is forced to flow through the free-wheeling path 8006 by the free-wheeling gate 8005, which is shown as being a diode. The chopper circuit thus controls the speed of the motor by switching the input voltage on and off depending on what average output power is required; the longer the chopper is switched on, the higher the average output power. The time interval during which the chopper is switched on is known as the on-time; the interval during which the chopper is switched off is known as the off-time. The ratio of the on-time of the power pulse to the off-time of the power pulse is often referred to as the-mark-to-space ratio or chopper ratio. The elements comprising a typical chopper circuit are discussed above as part of the detailed description of FIG. 1.

In the present invention, there is preferably a chopper circuit, including its free-wheeling gate, associated with each traction motor. In other words, each motor typically has, in addition to a corresponding main current path and main drive (or chopper) switch, a corresponding free-wheeling path and free-wheeling gate. This is illustrated in FIG. 9 which shows four traction motors, each having an individual chopper circuit. The main drive switches are shown here as Insulated Gate Bipolar Transistors ("IGBTs") that are switching devices that do not require commutating and are capable of sequentially pulsing the power source to the different motors at a very fast rate. FIG. 9 shows an example of an electrical schematic for a battery energy storage system providing power for four DC traction motors. The battery pack 9001 is shown in two sections separated by an emergency manual disconnect 9002. The battery pack is connected to the traction motor system 9005 by disconnect switches 9003 which are controlled by the locomotive computer system. A large bank of surge capacitors 9004 are connected across the battery pack. The battery pack voltage is monitored by voltage sensor 9021 and the battery pack output current is measured by current sensor 9022. The current sensor 9022 is used in the determination of the state of charge of the battery pack as discussed above with reference to FIG. 1 which discusses this method of setting the upper and lower set points that define the operational range of the energy storage unit.

The four traction motor systems 9005 are shown here connected in parallel with the battery pack 9001. Four DC traction motors 9006 are shown, each associated with its own individual chopper circuit 9007. Each of the traction motors 9006 are comprised of a field coil 9011 which is connected to a reverser switch 9012 and an armature 9021; a main circuit path 9009 controlled by an IGBT 9020; a free wheeling circuit path 9008 and free-wheeling gate 9010. The IGBT 9020 is controlled by the locomotive computer system. Each chopper circuit 9007 is protected by a fuse 9013 and a scrubber filter capacitor 9014. Together, the fuse 9013 and filter 9014 act to control the voltage transients as the chopper circuit 9007 switches from pulse or driven mode to free-wheeling mode or visa versa, thus reducing the risk of overheating and extending the lifetime of the IGBT 9020. The filter 9014 also acts to smooth any rapid current fluctuations through the traction motors 9005 as the chopper circuit 9007 switches from pulse or driven mode to free-wheeling mode or visa versa. The main current through each traction motor 9006 is monitored by a current transducer 9015.

As will be appreciated, in the driven mode, the chopper switch is activated such that the at least most of the current passes along the main current path and through the traction motor while in the free wheeling mode the chopper switch is deactivated such that at least most of the current passes along the free-wheeling or bypass path and through the traction motor. FIG. 9 also shows a configuration to effect the switching necessary to reverse the motor direction by reversing the current flow through the field coils.

In prior applications, a single chopper circuit has been used to control the speed of all of the DC traction motors. This has a number of disadvantages. For example, if one of the wheels is slipping (non-synchronous wheel slip), the chopper reduces power to all of the motors which risks further exacerbation of the problem.

Typically, pulses are applied to different motors during discrete (nonoverlapping) time periods. In other words, during a selected first time period (which is a subset of a time interval) a first electrical pulse is applied to a first traction motor but not to a second (different) traction motor, and, during a selected second time period, a second electrical pulse is applied to a second traction motor and not to the first traction motor. Thus, during the selected first time period the first traction motor is in the driven mode while the second traction motor is in the free-wheeling mode and during the selected second time period the first traction motor is in the free-wheeling mode while the second traction motor is in the driven mode.

The advantages of individual chopper circuits with each traction motor are illustrated in FIGS. 10 through 14 which show an example of sequencing power pulses to four individual motors and the resultant net draw on the energy storage battery, for a number of cases.

FIGS. 10*a*, *b*, *c*, *d* and *e* show a time sequence of short pulses 10001 to each motor typical of locomotive start up at a low throttle condition. The pulses 10001 in each sequence are shown along a time axis 10002 which is a common time axis for each sequence. Since the voltage amplitude of the pulses 10001 is approximately constant for a large energy storage battery pack, the pulse amplitudes 10003 may be considered current or power pulses. Each motor receives a power pulse 10001 at a different time. FIG. 10*a* represents the pulses provided to a first traction motor; FIG. 10*b* to a second traction motor; FIG. 10*c* to a third traction motor; and FIG. 10*d* to a fourth traction motor. FIG. 10*e* shows the sum of the individual motor sequences 10004 which is also the net power draw from the battery pack. In this case, the battery discharge is intermittent and the battery current draw is equal to the current through each individual motor. In the prior art where all motors are pulsed at the same time, the battery current draw is equal to the sum of the currents through each individual motor. Since battery internal heating is proportional to $I^2R$ where I is the battery current and R is the battery internal resistance, an advantage of the present invention is to minimize battery heating by time spacing the power pulses to each motor. Also, each motor receives a power pulse which is the same amplitude as the output power of the battery pack. As an example, each traction motor has peak power pulses of 1,120 kW and an average power of 140 kW (pulse width is ⅛ of the time between pulses). The battery pack likewise would have peak power pulses of 1,120 kW and an average power output of 560 kW (four motors averaging 140 kW).

Figure 10:
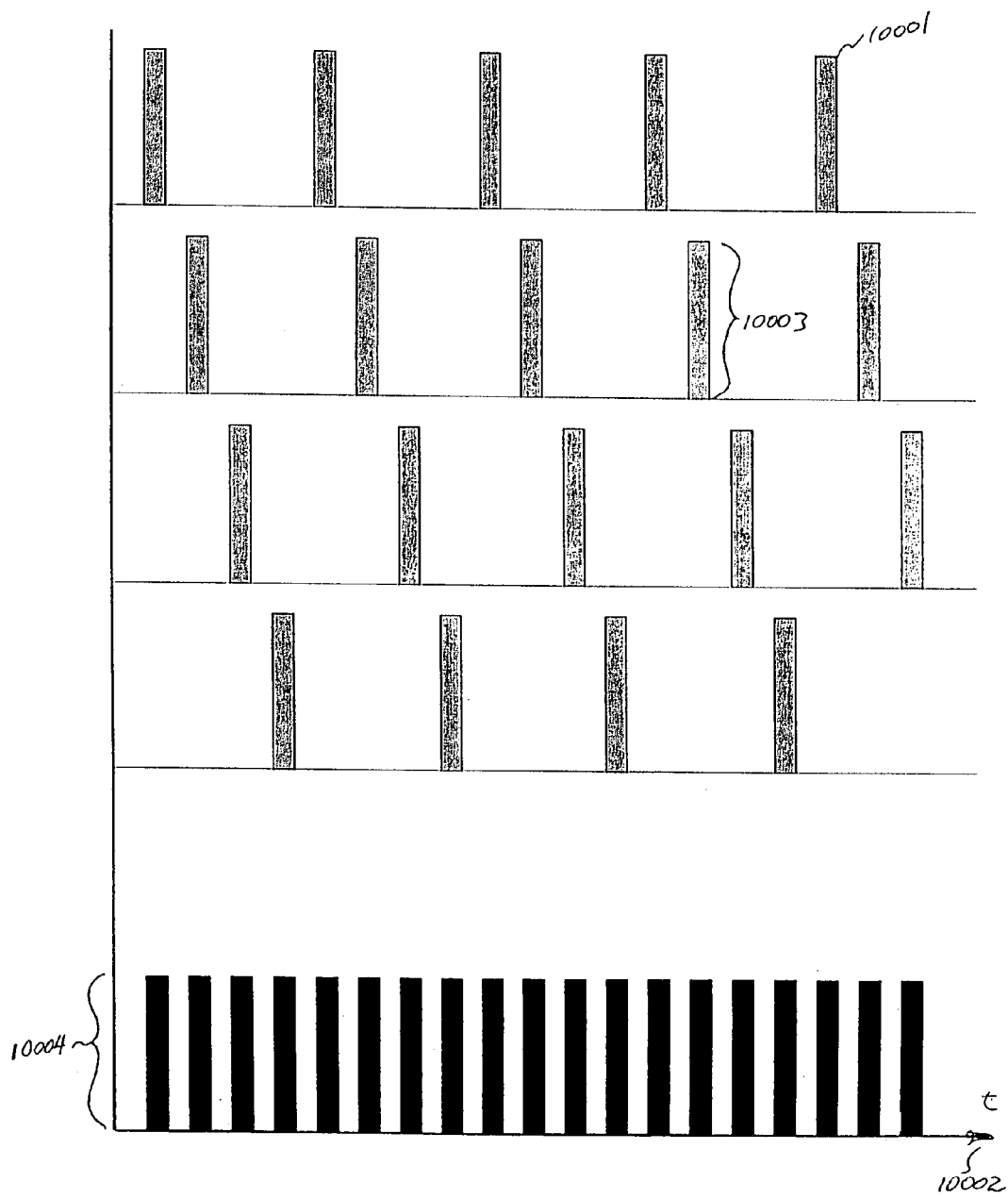
FIG. 10 shows a sequence of non-overlapping short power pulses as might be provided by the circuit of FIG. 9.
Figure 11:
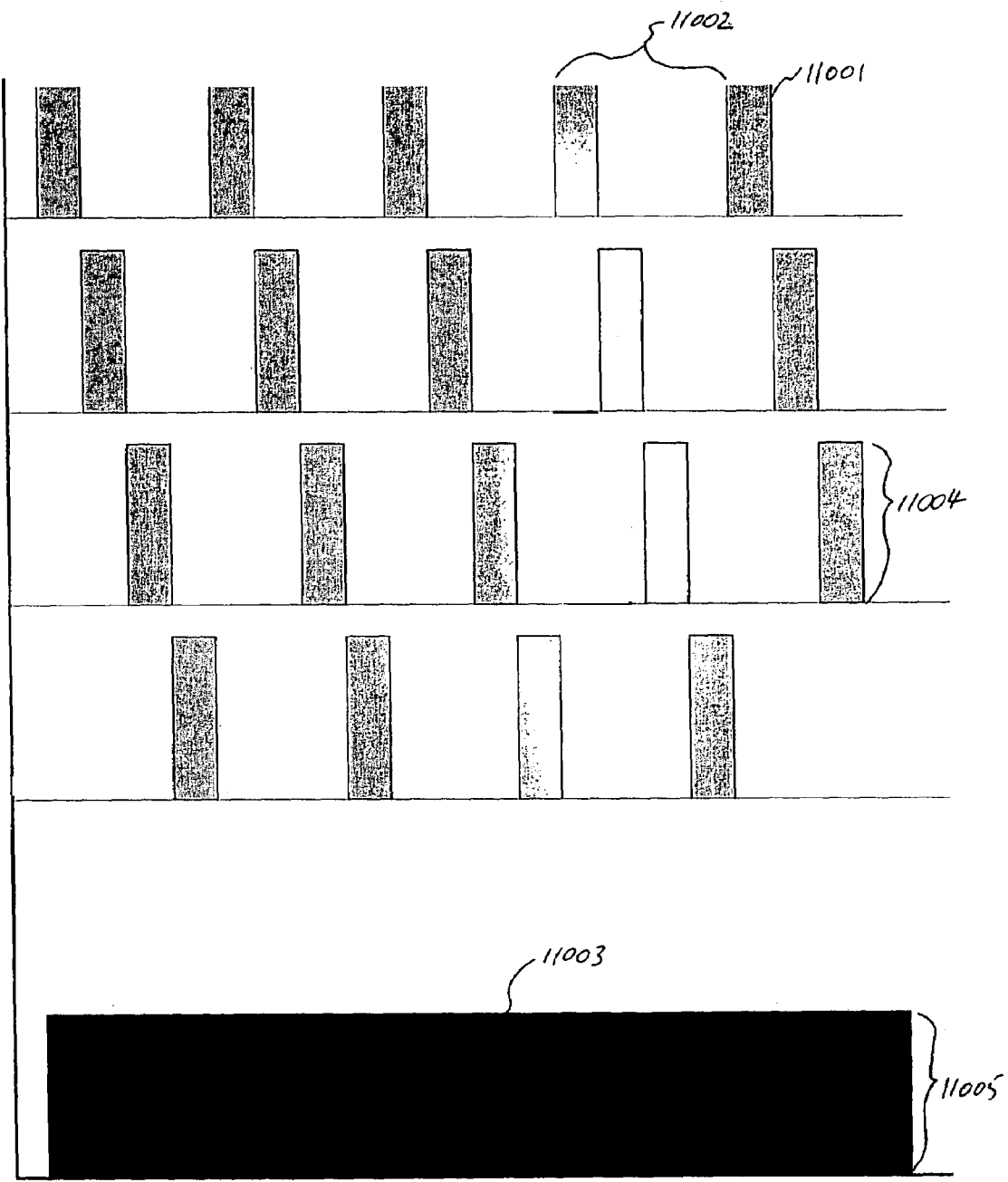
FIG. 11 shows a sequence of power pulses that do not overlap but also do not have any intervening space as might be provided by the circuit of FIG. 9.

FIGS. 11 a, b, c, d and e show a time sequence of pulses to each motor where the pulses 11001 are spaced 11002 such that there is zero time between any two pulses form the four sequences. FIG. 11a represents the pulses provided to a first traction motor; FIG. 11b to a second traction motor; FIG. 11c to a third traction motor; and FIG. 11d to a fourth traction motor. FIG. 11e shows the sum 11003 of the individual motor sequences which is again is the net power draw from the battery pack. For a four motor locomotive such as shown in FIG. 9, this corresponds to pulse widths that are 25% of the time between pulses in an individual sequence. In this case, the battery is operating continuously as shown by its power output 11003. Also for this case, each motor receives a power pulse which is the same amplitude 11004 as the output power 11005 of the battery pack. Assuming the same battery pack and traction motors as used in FIG. 10, in the example of FIG. 11, each traction motor has peak power pulses of 1,120 kW and an average power of 280 kW (pulse width is ¼ of the time between pulses). The battery pack now has peak power pulses of 1,120 kW which is the same as its average power output of 1,120 kW.

In the cases illustrated by FIGS. 10 and 11, only one of the traction motors is in driven mode while the others are all in free-wheeling mode.

Figure 12:
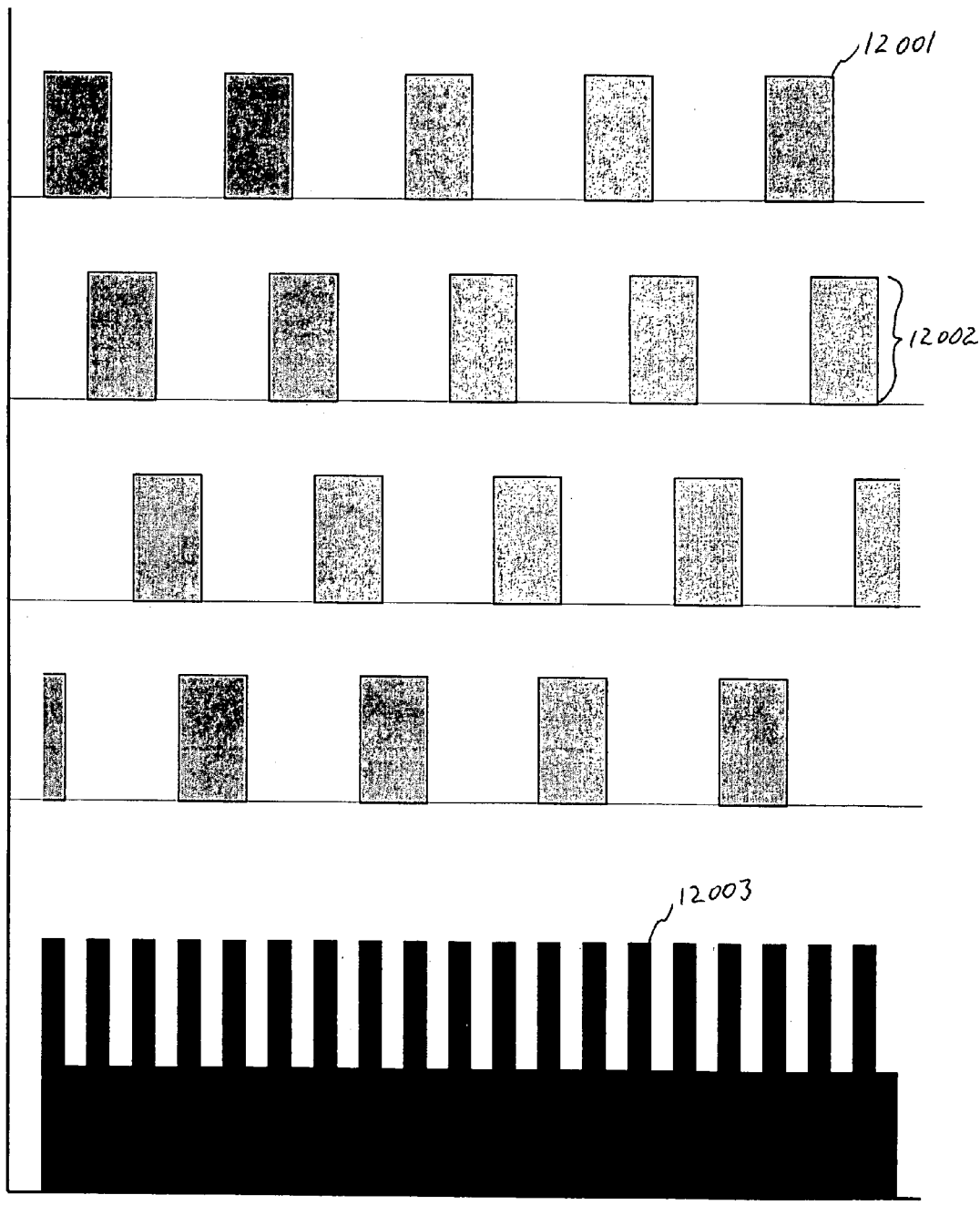
FIG. 12 shows a sequence of power pulses that have some overlap as might be provided by the circuit of FIG. 9.

FIGS. 12a, b, c, d and e show a time sequence of power pulses 12001 that have some overlap in time as might be the case for higher locomotive speed or throttle power setting. FIG. 12a represents the pulses provided to a first traction motor; FIG. 12b to a second traction motor; FIG. 12c to a third traction motor; and FIG. 12d to a fourth traction motor. FIG. 12e shows the sum of the individual motor sequences 12003 which is again is the net power draw from the battery pack. In this case, the battery is operating continuously. Each motor receives a power pulse 12001 which has a constant amplitude 12002. The power draw 12003 on the battery pack is variable, reflecting the overlap in individual motor power pulses. In actual practice, the battery filtering capacitor tends to smooth out the power pulse from that shown. Assuming the same battery pack and traction motors as used in FIG. 10, in the example of FIG. 12, each traction motor has peak power pulses of 840 kW and an average power of 315 kW (pulse width is ⅜ of the time between pulses). The battery pack now would have peak power pulses of 1,680 kW and an average power output of 1,260 kW.

Figure 13:
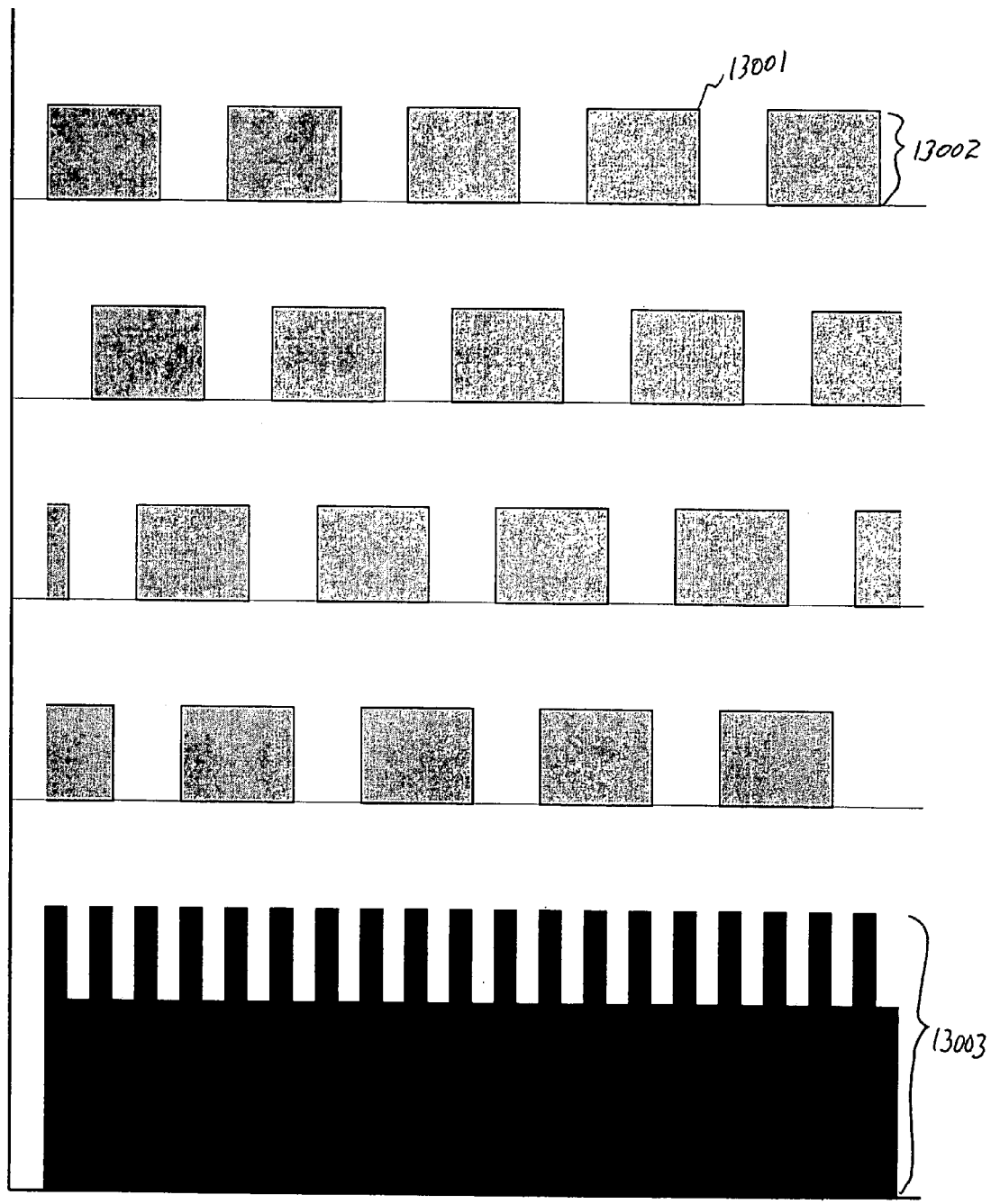
FIG. 13 shows a sequence of power pulses that have substantial overlap as might be provided by the circuit of FIG. 9.

FIGS. 13a, b, c, d and e show a time sequence of power pulses 13001 that have substantial overlap in time. In this case, the battery is operating continuously. FIG. 13a represents the pulses provided to a first traction motor; FIG. 13b to a second traction motor; FIG. 13c to a third traction motor; and FIG. 13d to a fourth traction motor. FIG. 13e shows the sum 13003 of the individual motor sequences which is again is the net power draw from the battery pack. Each motor receives a power pulse 13001 which has a constant amplitude 1300. The power draw 13003 on the battery pack is has increased and remains variable, reflecting even greater overlap in individual motor power pulses. In actual practice, the battery filtering capacitor tends to smooth out the power pulse from that shown. Assuming the same battery pack and traction motors as used in FIG. 10, in the example of FIG. 13, each traction motor has peak power pulses of 630 kW and an average power of 394 kW (pulse width is ⅝ of the time between pulses). The battery pack now would have peak power pulses of 1,890 kW and an average power output of 1,575 kW.

Figure 14:
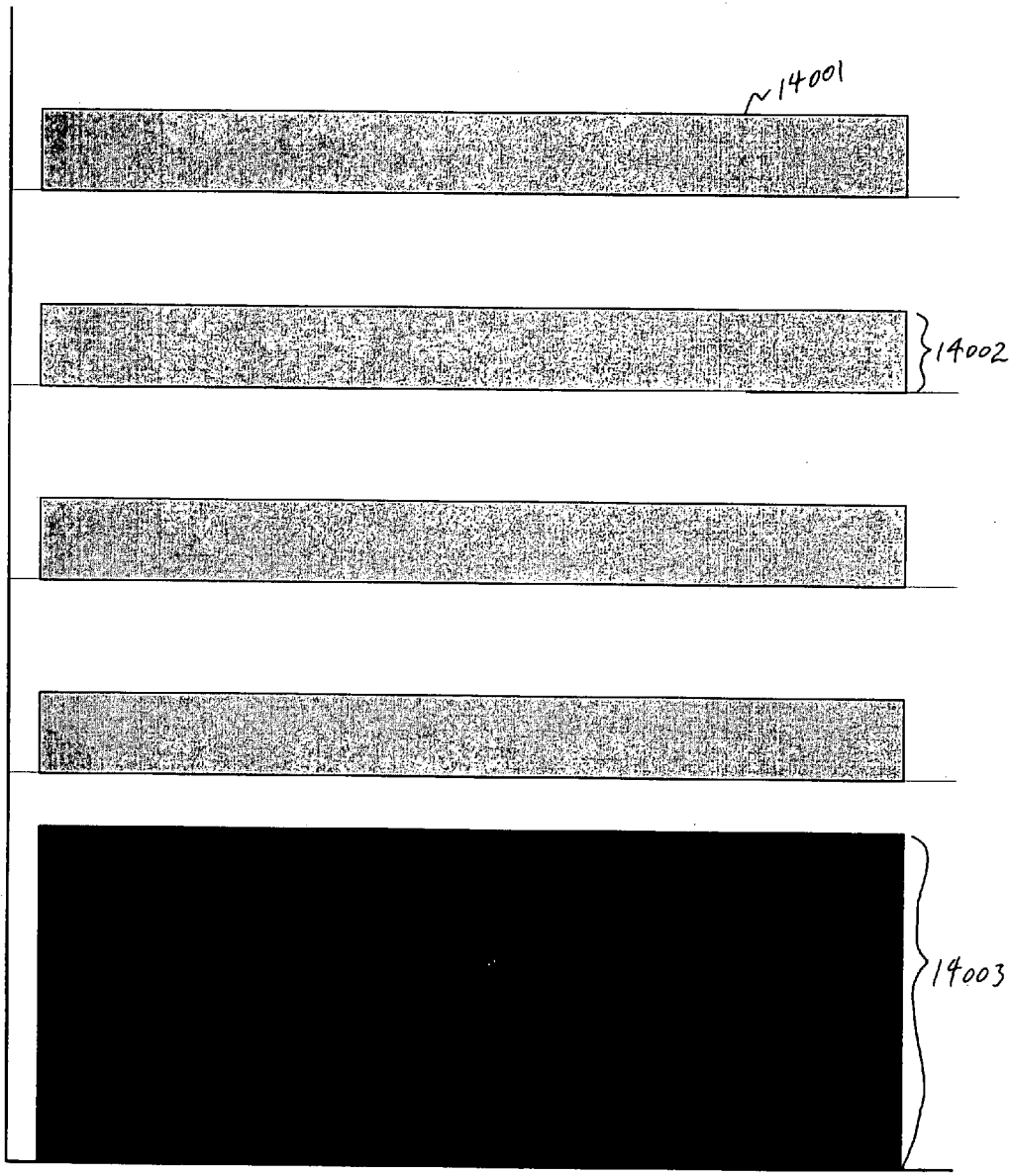
FIG. 14 shows a sequence of power pulses that have continuous overlap as might be provided by the circuit of FIG. 9.

FIGS. 14a, b, c, d and e show a time sequence of power pulses 14001 that are continuous and the battery is also operating continuously. FIG. 14a represents adjoining pulses provided to a first traction motor; FIG. 14b to a second traction motor; FIG. 14c to a third traction motor; and FIG. 14d to a fourth traction motor. FIG. 14e shows the sum 14003 of the individual motor sequences which is again is the net power draw from the battery pack. In this final case, the battery is operating continuously and each motor receives a power pulse 14002 which is approximately one quarter the amplitude of the output power 14003 of the battery pack. Assuming the same battery pack and traction motors as used in FIG. 10, in the example of FIG. 14, each traction motor has continuous power of 560 kW and the battery pack has a continuous power draw of 2,240 kW which is four times that of each motor.

In most locomotive operations, the engineer applies power by selecting a throttle setting (usually a notch setting from 1 to 8). The throttle setting causes the logic controller to apply the required power to the traction motors using a preset logic. In some cases, the engineer may want to set a particular locomotive speed, usually a low speed such as, for example, might be required by a switching locomotive. A particular speed setting may be accomplished by the engineer using a rheostat to control power to the traction motors, rather than by selecting one of the throttle notch settings. A more preferred method is for the engineer to set the desired speed by the use of a touch screen or other type of computer input. In the latter case, the speed setting may be accomplished by the logic controller which would prescribe a preset power pulse width setting for the chopper circuits. The power pulse widths would be set, typically to a very short pulse widths, to provide a low average power to the traction motors that is known to result in the desired locomotive speed. More preferably, the logic controller would utilize the tachometers on the drive axles to control the speed of the locomotive to the desired value. This latter approach would result in the desired locomotive speed being more accurately achieved.

Figure 15:
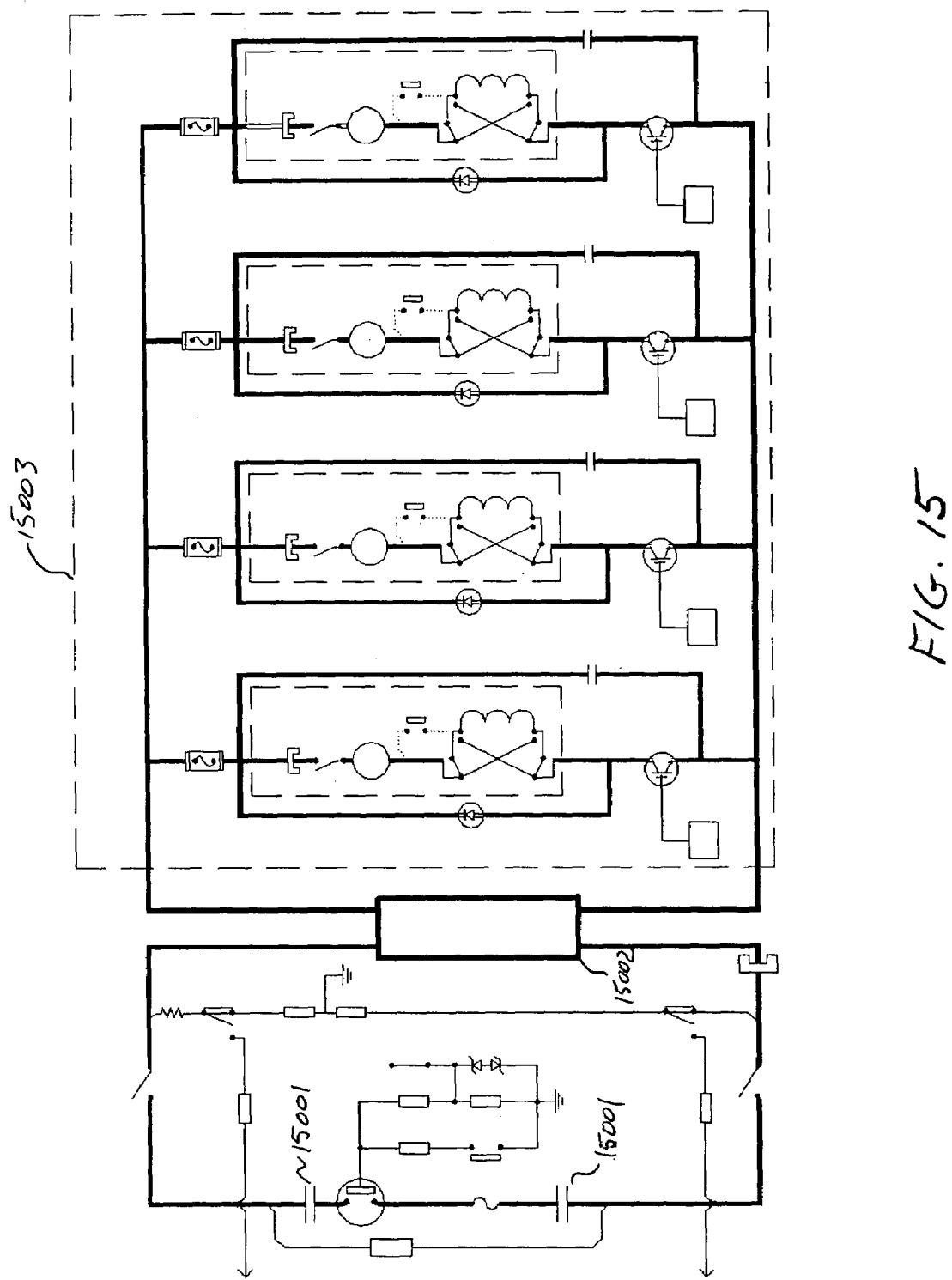
FIG. 15 shows an electrical schematic of a capacitor energy storage system powering four DC traction motors.

If an energy storage capacitor bank is used in place of a battery pack, then the output of the capacitor bank may require additional conditioning to match the voltage-current requirements of DC traction motors. This is because a battery pack provides an approximately constant voltage output over most of its discharge range, whereas a capacitor bank discharges as a decaying voltage waveform. The additional conditioning may be accomplished with yet another chopper circuit, such as for example a buck-boost chopper circuit, or any of a number of well-known pulse forming networks utilized in the high energy capacitor bank industry. FIG. 15 shows a general electrical schematic of a capacitor based propulsion circuit which includes the positioning of additional power conditioning and pulse shaping elements. The capacitor bank 15001 is shown in two sections and is connected to a power conditioning/pulse shaping unit 15002 which includes inductors and other reactive elements, as will be known to one of ordinary skill in the art, to maintain the output power pulses of the capacitor bank

15001 at least substantially constant in amplitude. In other words, the waveform representing the amplitude of the output as a function of time is at least substantially linear. The output of the power conditioning section 15002 drives a series of four traction motors 15003 which may be configured identically to those shown in FIG. 9.

A truck assembly in the railroad industry is a frame to which one or more axle and wheel assemblies are mounted. The truck assembly also includes suspension and brake system elements. In addition, there are provisions for mounting AC or DC traction motors. The present invention generally utilizes truck assemblies with only DC traction motors.

The primary specifications for DC traction motors used in the present invention are typically: (a) a power in the range of about 300 to 1,200 horsepower;

(b) a tractive force in the range of up to about 25,000 lbs;

(c) a maximum voltage rating of about 1,300 volts; and (d) a maximum current rating of about 1,800 amperes for short periods, typically less than 3 minutes, depending on the level of air cooling available.

Figure 16:
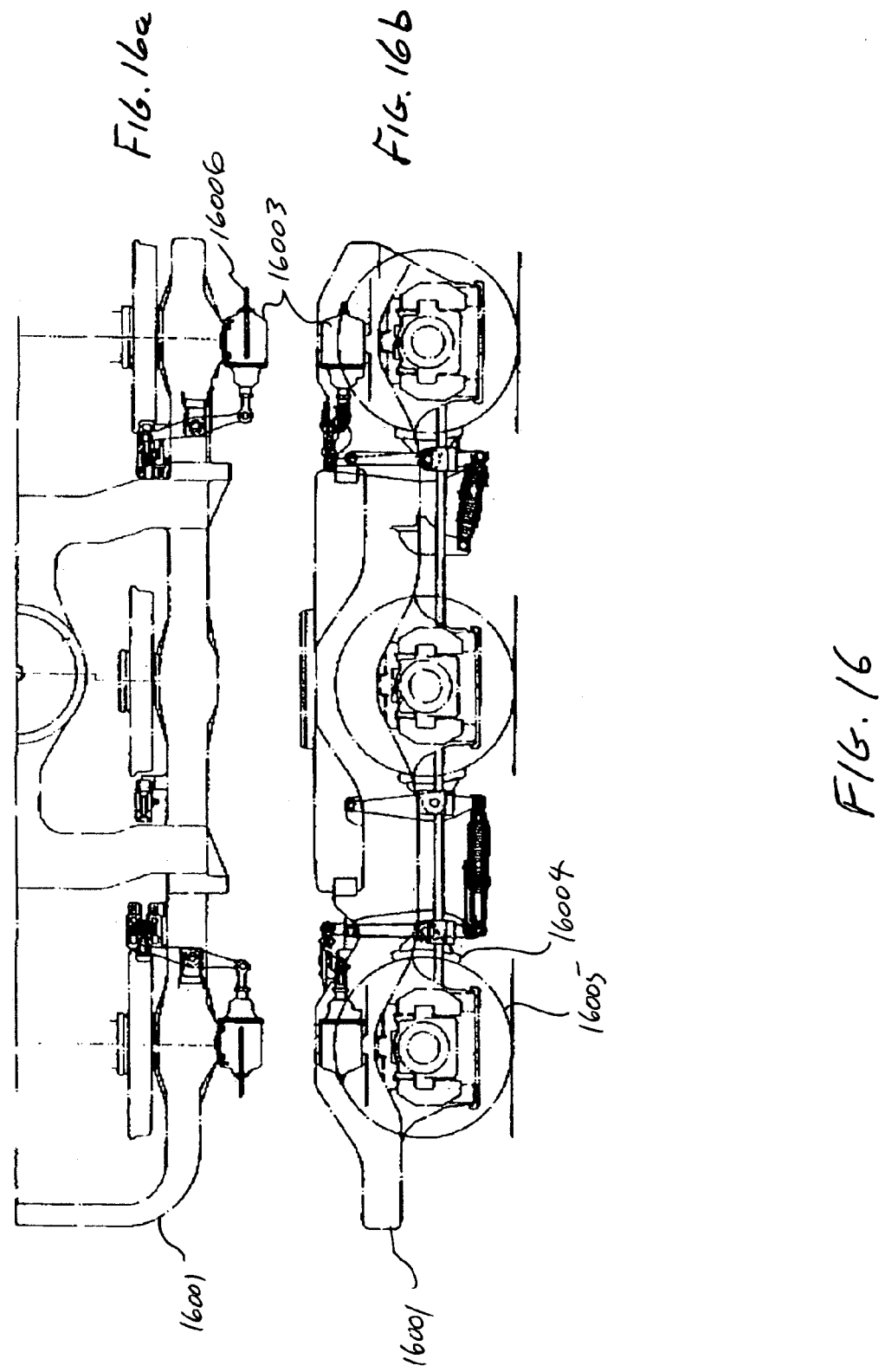
FIG. 16 shows a schematic of a rail truck assembly illustrating the location of air brake cylinders.
Figure 17:
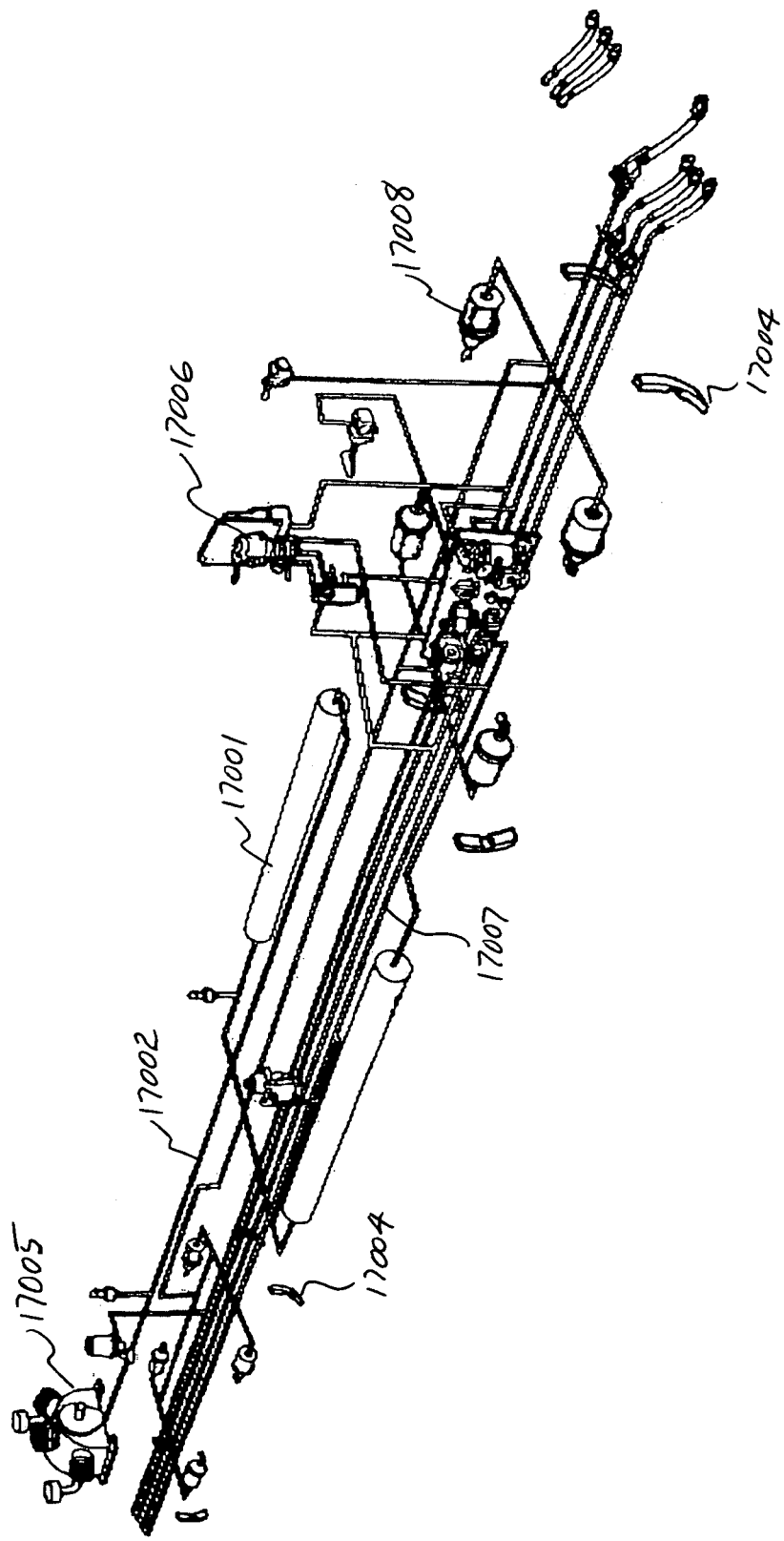
FIG. 17 shows an isometric view of a typical rail air brake system.

The braking system on a locomotive is typically an air brake system in which the charging generator or energy storage unit are utilized to operate an auxiliary compressor to pressurize an air reservoir. The air reservoir provides air pressure to the brake cylinders such as shown in FIGS. 16 and 17. FIGS. 16*a* and *b* shows a top view FIG. 16*a* and side view FIG. 16*b* of a 3 axle truck assembly 16001 with a tread brake configuration. When activated, air brake cylinders 16003 engage brake shoes 16004 against the wheel treads 16005. The air brake cylinders 16003 are pressurized by compressed air by a system of air brake lines 16006.

FIG. 17 shows an isometric schematic of a typical rail air-brake system. Compressed air is maintained in the main air reservoirs 17001 which are replenished by the main air-compressor 17005 through air-line 17002. A system of control valves 17006 direct compressed air via air-brake lines 17007 to the various brake cylinders 17008 which in turn operate the brake shoes 17004. In a long train, the air pressure at various locations in the system will not be exactly equal during application or release of the brakes because of the time required for air to flow long distances through the air lines.

As a result of the time delay for air-pressure to be released after the command for brake release is given by the engineer, one or more of the air brakes on a locomotive wheel can become locked, causing flat spots to be developed on the affected wheel treads. If these flat spots are severe, the wheels must be removed, and turned down by machining or replaced. It is therefore a part of the present invention to include the option of an air-actuated brake release system that can rapidly unlock the brakes on a wheel.

Figure 18:
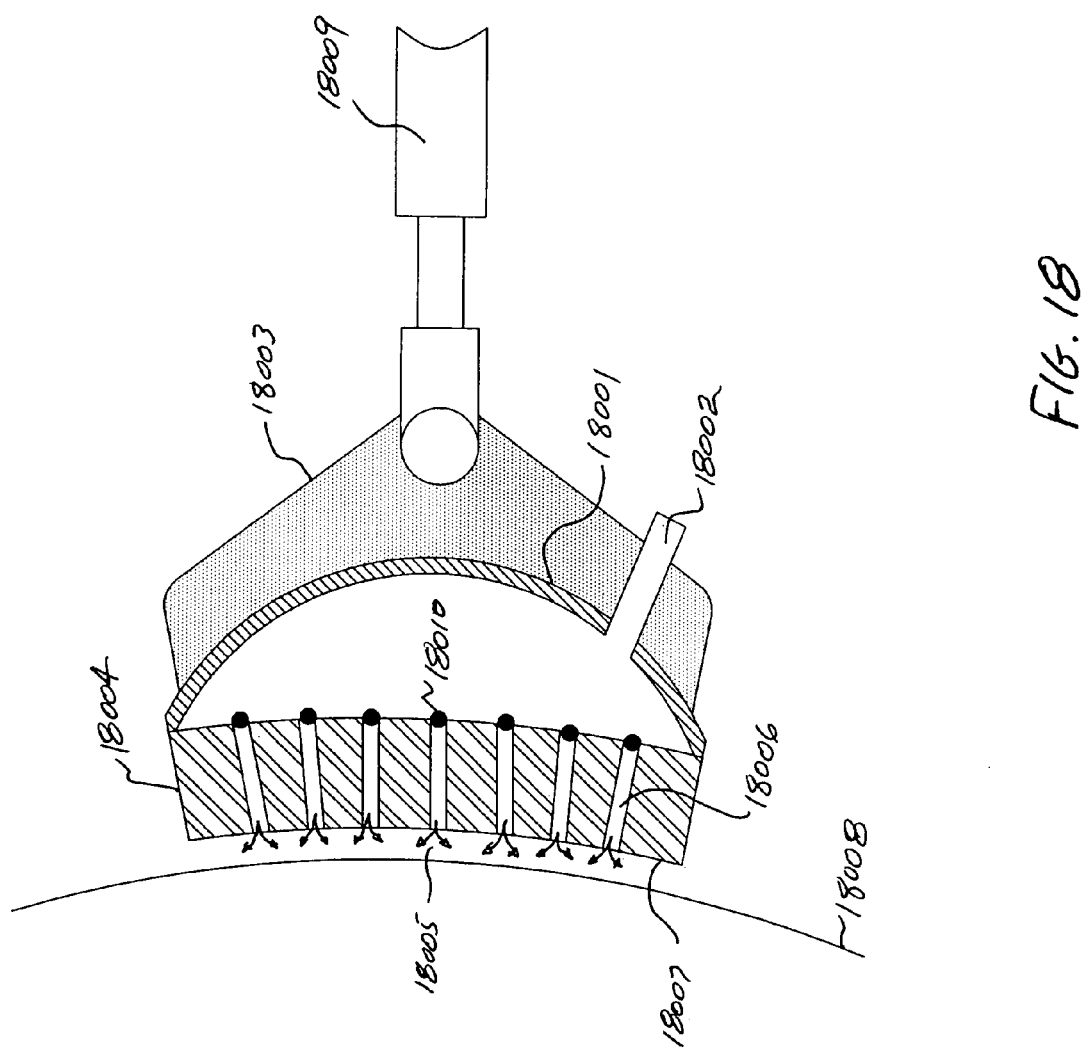
FIG. 18 shows a schematic drawing of a brake shoe with provisions for an air-actuated release mechanism.

In the present invention, the brake shoes are designed as shown in FIG. 18 so that air pressure may be applied to the brake shoe to force it to unlock. FIG. 18 shows a schematic view of a possible brake release configuration. Compressed air is fed via an air line 18002 a plenum 18001. The plenum 18001 is formed inside the brake shoe housing 18003 and on the rear side of the brake show 18004. When activated, the brake release system operates by forcing high pressure air through holes 18006 installed in and passing through the brake shoe 18004. This high pressure air is forced between the brake shoe friction surface 18007 and the braking surface of the wheel 18008, as indicated by arrows 18005, to effect immediate release of the brake shoe 18004 from the wheel 18008. The diameter and location of the holes 18006 are designed so that the air pressure applied between the brake shoe 18004 and the wheel braking surface 18008 exerts a substantially greater force to disengage the brake shoe 18004 than the force exerted by the air-brake cylinder 18009 which is engaging the brake shoe 18004. The release force is preferably between about 10% and 30% greater than the applied braking force. The pressurized air in the brake release plenum 18001 is applied on command by control valves 18010 which may be positioned as shown in FIG. 18. The pressure in the air-actuated brake release system may be the same or higher than the air pressure in the brake system. Developing a higher pressure locally can be accomplished by any number of well-known means such as, for example, a cylinder with a variable area piston. The above air-brake release system may be installed using either a tread brake or disc brake configuration.

Figure 19:
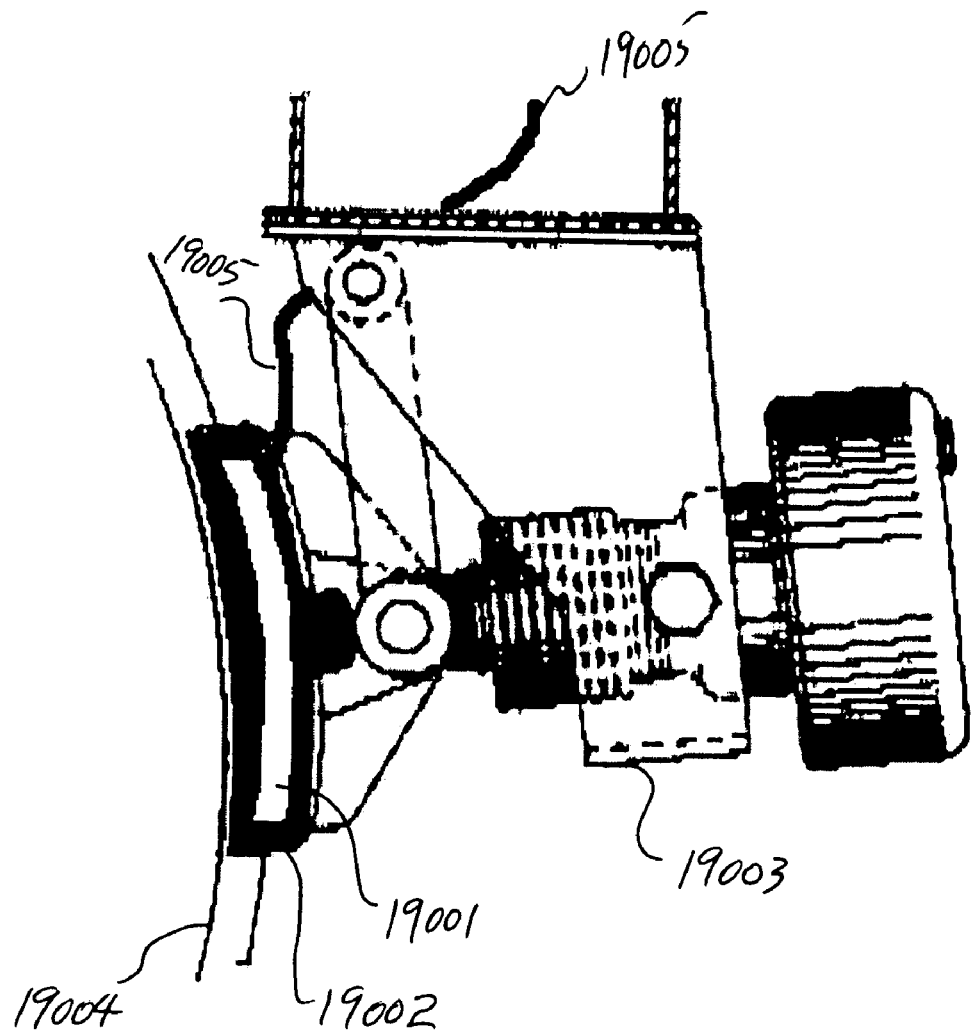
FIG. 19 shows a schematic of how an air brake release system might operate with a wheel tread brake.

FIG. 19 shows an air release plenum 19001 installed in a typical tread brake shoe 19002. The air-brake mechanism 19003 operates in the normal manner to engage the shoe 19002 with the tread of the wheel 19004 to effect braking. The air-brake release system is shown operating off a pressurized air-line 19005 which may be connected to the air brake system directly or by a variable area piston (not shown).

Figure 20:
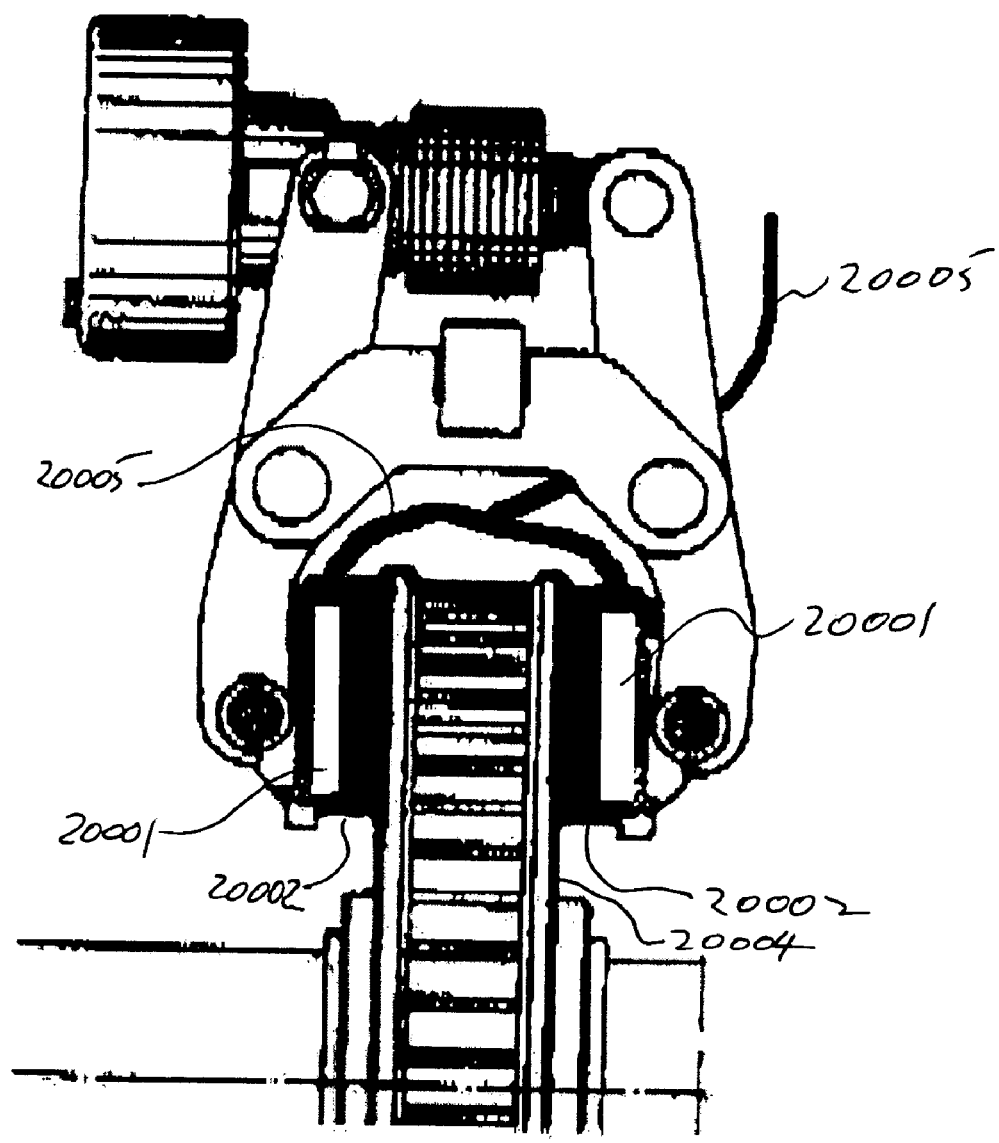
FIG. 20 shows a schematic of how an air brake release system might operate with a disc brake.

FIG. 20 shows an air release plenum 20001 installed in typical disc brake pads 20002. The air-brake mechanism 20003 operates in the normal manner to engage the pads 20002 with the sides of the wheels 20004 to effect braking. The air-brake release system is shown operating off a pressurized air-line 20005 which may be connected to the air brake system directly or by a variable area piston (not shown).

Although not incorporated in the current embodiment, regenerative braking can be incorporated into the locomotive system, especially for locomotives operating at speeds greater than approximately 50 km/hr. If incorporated, regenerative braking systems would be installed using individual circuits associated with each axle such as is being done by applying individual chopper circuits to each axle in the current preferred embodiment.

When each drive axle on the locomotive has its own chopper circuit, the power to the axle whose wheels are detected to be non-synchronously slipping, can be reduced in until the slipping is eliminated. This individual power control to each drive axle is a primary feature of the present invention. As will be discussed in more detail below, the traction motor electrical current and temperature and the axle rotational speed and temperature can be individually monitored and controlled by a computer monitoring system.

The logic controller is divided into three elements. These are:

(a) control of the power to the traction motors;

(b) control of the charging unit that charges the main energy storage apparatus; and (c) control of the wheel braking function.

Figure 21:
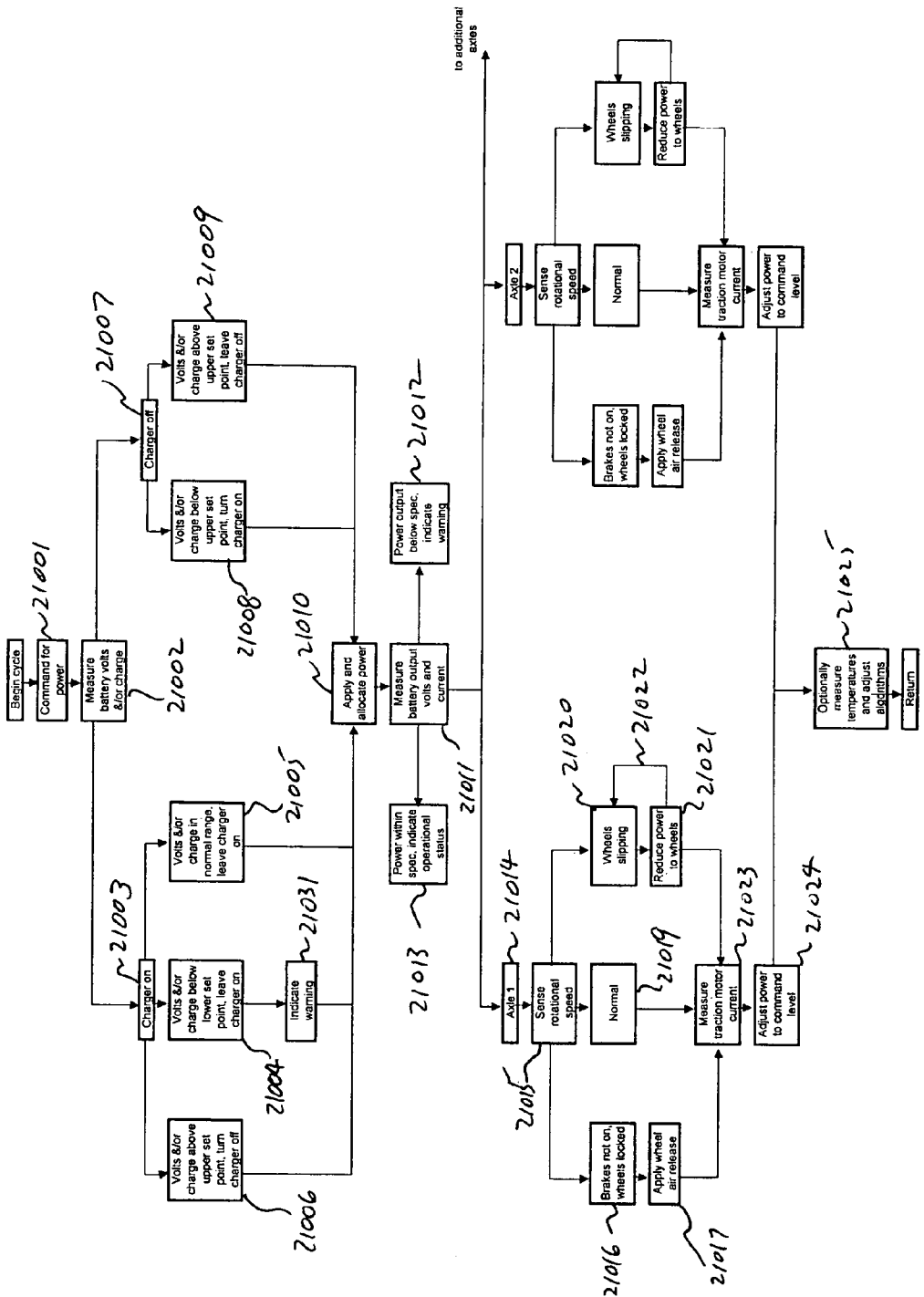
FIG. 21 shows a flow diagram for the logic for main power control of a battery-powered locomotive.

The main power control logic is discussed below with reference to flow diagram of FIG. 21.

1. To begin the cycle, the engineer gives total tractive power command 21001 (specifies total power requested)

2. Measure battery volts or the state of charge of the battery or both 21002 to determine if charging generator needs to be on or off a. when the charging generator is on 21003 i. indicate a warning 21031 when the battery voltage or state of charge or both are below the lower set point and leave the charger on 21004 ii. take no action when the battery voltage or state of charge or both are in the normal range between the upper and lower set points 21005 iii. shut the charging generator off when the battery voltage or state of charge or both are above upper set point 21006 b. when the charging generator is off 21007 i. turn on the generator when the battery voltage or state of charge or both are below upper set point 21008.

ii. leave the generator off when the battery voltage or state of charge or both are above the upper set point 21009

3. Apply required amount of power to all DC traction motors by phasing power output to each DC traction motor according to predetermined algorithm 21010

4. Measure average battery output volts and current to determine battery output power and state of charge 21011. When the battery output power or state of charge is below its lower set point, indicate a warning on the warning screen 21012. Otherwise indicate the operational battery condition on the battery monitor and battery status screens 21013.

5. Loop through all axles with DC traction motors. Do this preferably simultaneously or less preferably in sequence. For each DC traction motor (such as 21014 for example):

a. sense rotational speed (locked, normal or slip) 21015 i. when the brakes are not applied and any wheels are locked 21016, apply air release to the locked wheels 21017

(1) take no further action when brake release is confirmed (2) when brake release is not confirmed, reapply air release and indicate a warning ii. take no action when no wheel slippage and no wheels locked 21019 iii. when a wheel is indicated to be slipping 21020, reduce the power to the axle by a specified amount 21021

(1) if the wheel continues to slip, reduce power again, and continue to do so in prescribe increments until slipping stops 21022

(2) take no action when slipping is not occurring b. measure axle traction motor current 21023 c. adjust power as required by modifying power algorithm 21024

6. To end the cycle, optionally measure all motor, wheel and brake temperatures and adjust algorithms 21025. As will be appreciated, the various set points for controlling the prime energy source, the conversion apparatus, the energy storage units, the chopper circuits and the brake release systems may be somewhat temperature sensitive and this sensitivity can be accounted for by algorithms that reflect known change in set points as a function of temperature.

The charging unit control logic is discussed below in further detail with reference to flow diagram of FIG. 22*a* and 22*b*. This logic applies when the charging generator is on. There are at least two methods for controlling the charging power so that the alternator presents a constant load to the prime energy source.

One method is to control the charging unit by monitoring engine rotary speed (RPMs). With reference to FIG. 22*a*:

1. Begin the cycle by monitoring the engine (prime energy source) revolutions per minute (RPMs) 22001 a. take no action when the RPMs are within the range set for maximum fuel efficiency 22002 b. when the RPMs are below the lower set point for RPMs, reduce the excitation current to the alternator until the RPMs increase to within their set range for maximum fuel efficiency 22003 c. when the RPMs are above the upper point of RPMs, increase the excitation current to the alternator until the RPMs decrease to within their set range for maximum fuel efficiency 22004

2. End the cycle by repeating the monitoring process

The second method is to control the charging unit by monitoring DC charging power. With reference to FIG. 22*b*:

1. Begin the cycle by monitoring the engine (prime energy source) revolutions per minute (RPMs) 22011

2. Monitor the DC output volts and current of the charging system 22012. This determines output charging power (volts×amperes=watts).

a. take no action when the output power is within the range set for maximum fuel efficiency 22013 b. when the output power is below the lower set point of output power, increase the excitation current to the alternator until the output power increases to within its set range for constant load presented to the prime energy source so that the fuel efficiency can be maintained at or close to its maximum 22014 c. when the output power is above the upper set point of output power, reduce the excitation current to the alternator until the output power decreases to within its set range for constant load presented to the prime energy source 22015

3. Monitor the engine rpms to ensure that they are within the set operating range 22016 a. when the RPMs are within the range set for maximum fuel efficiency, take no action 22017 b. when the RPMs are below the lower set range of RPMs, reduce the excitation current to the alternator until the RPMs increase to within their set range for maximum fuel efficiency 22018 c. when the RPMs are above the upper set range of RPMs, increase the excitation current to the alternator until the RPMs decrease to within their set range for maximum fuel efficiency 22019

4. End the cycle by repeating the monitoring process (steps 22011, et seq.)

Yet another method for monitoring engine RPMs is to measure the power frequency of the generator conversion apparatus. The logic flow using this method is identical to that of FIG. 22*b* with "generator power output" replaced by "generator power frequency".

Figure 23:
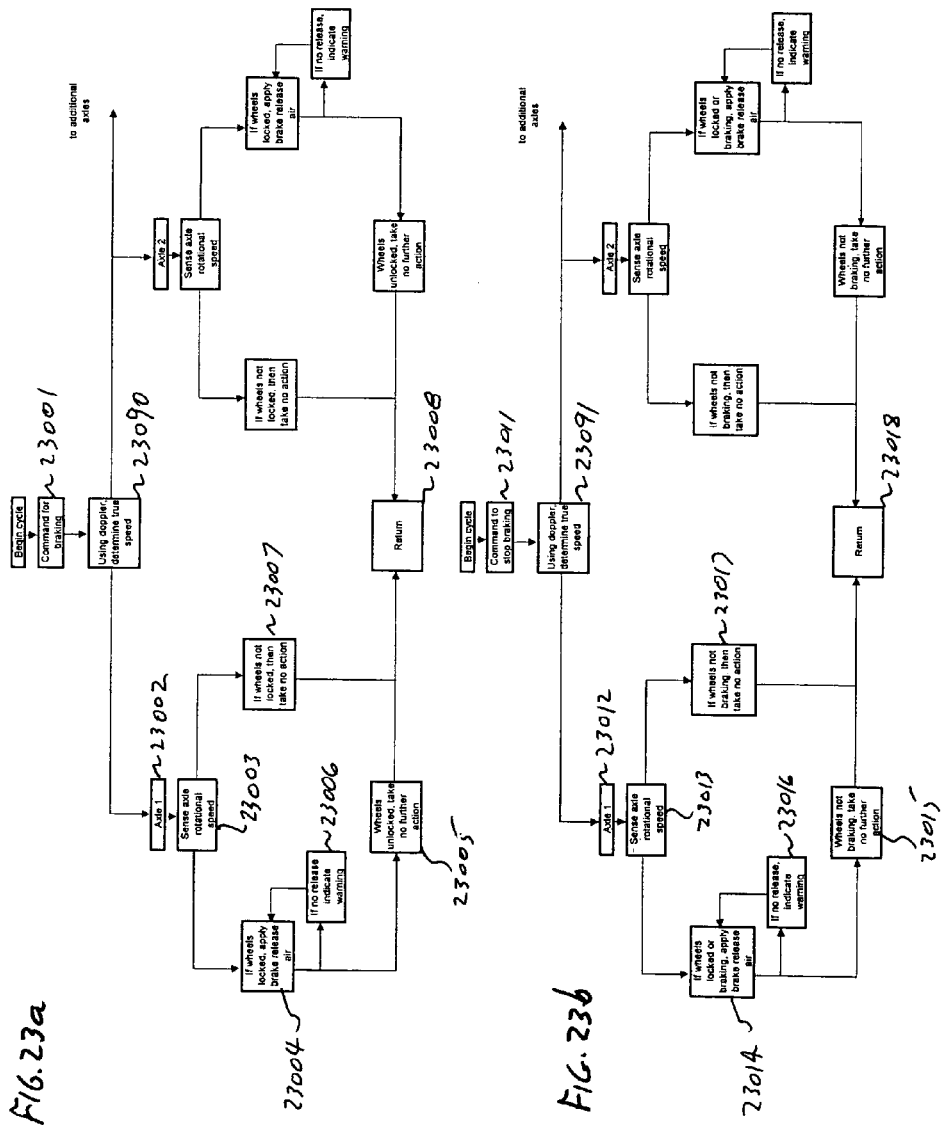
FIG. 23 shows a flow diagram for the logic for an air-braking and wheel lock release system for use on rail cars and locomotives.

The control logic for the braking system is discussed below in further detail with reference to flow diagram of FIGS. 23*a* and 23*b*. FIG. 23*a* applies when the brakes are applied or activated while FIG. 23*b* applies when the brakes are released or deactivated.

With reference to FIG. 23*a* for brakes on:

1. To begin the cycle, the engineer gives the command to apply the brakes 23001:

2. The true ground speed of the locomotive is determined 23090 by a doppler radar system or other independent motion detector in the locomotive. This is necessary if there is synchronous wheel slip or synchronous wheel locking. In either case, the axle rotary speed sensors would not correctly indicate locomotive ground speed:

3. Loop through all axles with air brake systems. Do this preferably simultaneously or less preferably in sequence. For each axle (such as 23002 for example):

a. sense rotational speed (locked, normal braking, no braking) 23003 i. when the brakes are on and the wheels are indicated to be locked, apply air release 23004

(1) when wheel release is confirmed, take no further action 23005
(2) when wheel release is not confirmed, reapply air release and indicate a warning 23006
  ii. when braking is indicated to be normal, take no further action 23007
  iii when no braking is sensed, indicate a warning 23020
4. End the cycle by optionally measuring all temperatures 23008. With reference to FIG. 23b for brakes off:
  1. To begin the cycle, the engineer gives the command to release the brakes 23011:
  2. The true ground speed of the locomotive is determined 23091 by a doppler radar system or other independent motion detector in the locomotive:
  3. Loop through all axles with air brake systems. Do this preferably simultaneously or less preferably in sequence. For each axle (such as 23012 for example):
    a. sense axle rotational speed (locked, normal braking, brakes released) 23013
      i. apply air release when brakes are on or the wheels are locked 23014
        (1) continue when wheel release is confirmed 23015
        (2) when release is not confirmed, reapply air release and indicate a warning 23016
      ii. take no further action when braking is indicated to be off 23017
  4. To end the cycle, optionally measure brake temperatures 23018

In operation, the PLC determines the power requirement for each motor at each time interval based on inputs from the input device, ramping, derate evaluation logic and detection scaling. Based on such inputs the PLC calculates the necessary pulse width for each motor. The selected pulse widths are then provided to the switch drives which sequentially provide the desired pulse widths of power to the DC motors. When the locomotive is starting for example, a high voltage difference exists between the battery and the motor so a high current can be applied to the motor, which only requires a short pulse duration to meet the power requirement specified. This makes available the full supply voltage for starting in either direction. As the motor speed increases, a back voltage is created which reduces the effective voltage or voltage difference between tho battery and the motor, thus necessitating a longer pulse to achieve the same power. If wheel slippage is detected, power can be shut off or reduced appropriately to the relevant motor.

As will be appreciated, the control system for the various components of the locomotive requires a Graphical User Interface display ("GUI") to provide a user interface for viewing the various monitored parameters and the operational states of the various components and providing operational commands to the various components. This GUI is preferably implemented using a series of related display screens which are configured to receive touch screen commands. This system of screens allows the operator and maintenance crew to monitor and control, for example, the state of the charging generator, the battery pack, the individual drive axles and other functions.

Figure 24:
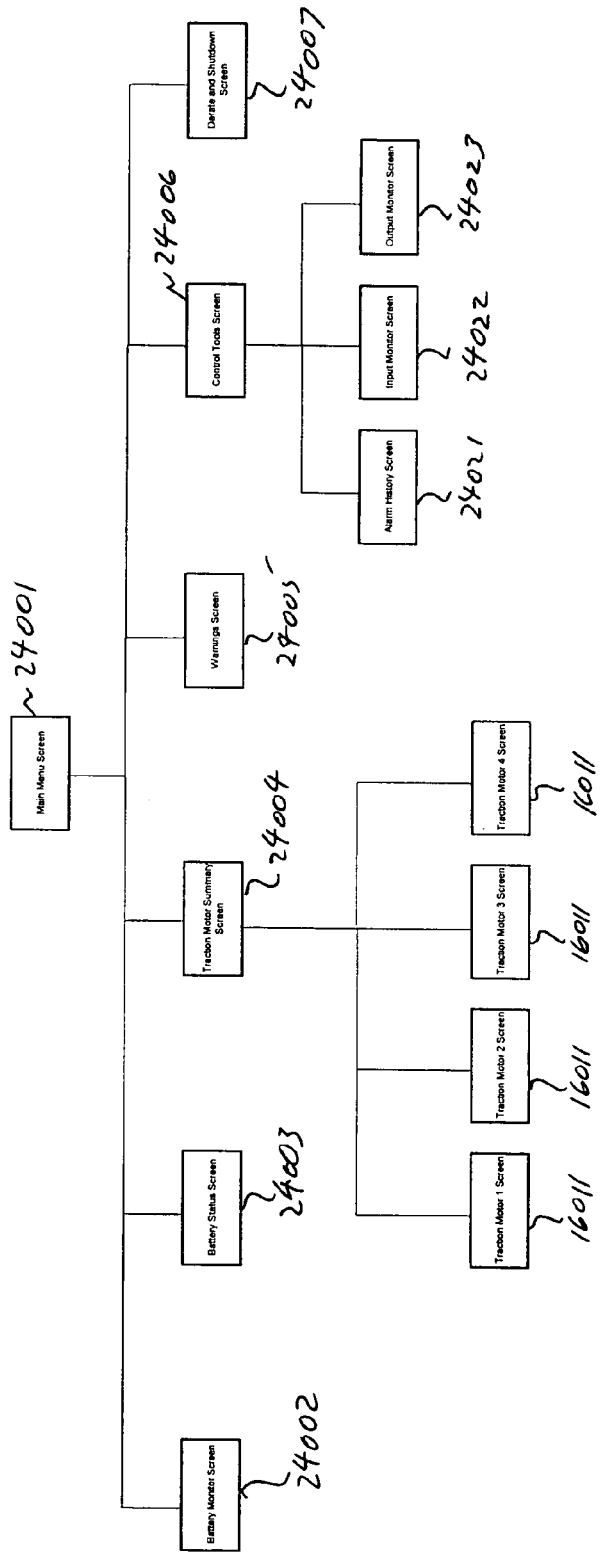
FIG. 24 shows a flow diagram for the touch screen information and control system.

The flow chart shown in FIG. 24 shows an example of a touch screen system. Not shown are examples of an air brake system monitor screen and individual axle brake status screens which can be included in the screen system of the present invention. The individual screens shown in flow chart of FIG. 24 are a Main Menu Screen 24001 which controls a number of secondary screens. The secondary (or child) screens include: a Battery Monitor Screen 24002; a Battery Status Screen 24003; a Traction Motor Summary Screen 24004; a Warnings Screen 24005; a Control Tools Screen 24006; and a Derate and Shutdown Screen 24007. The Traction Motor Summary Screen 24004 controls individual Traction Motor Screens 24011, the number of Traction Motor Screens 24011 being equal to the number of drive axles on the locomotive. The individual Traction Motor Screens 24011 are therefore grandchildren of the Main Menu Screen 24001 and children of the Traction Motor Summary Screen 24004. The Control Tools Screen 24006 controls three informational screens which include: an Alarm History Screen 24021; a Digital Input Monitor Screen 24022; and an Output Monitor Screen 24023. The informational screens 24021, 24022 and 24023 are therefore grandchildren of the Main Menu Screen 24001 and children of the Control Tools Screen 24006.

Figure 25:
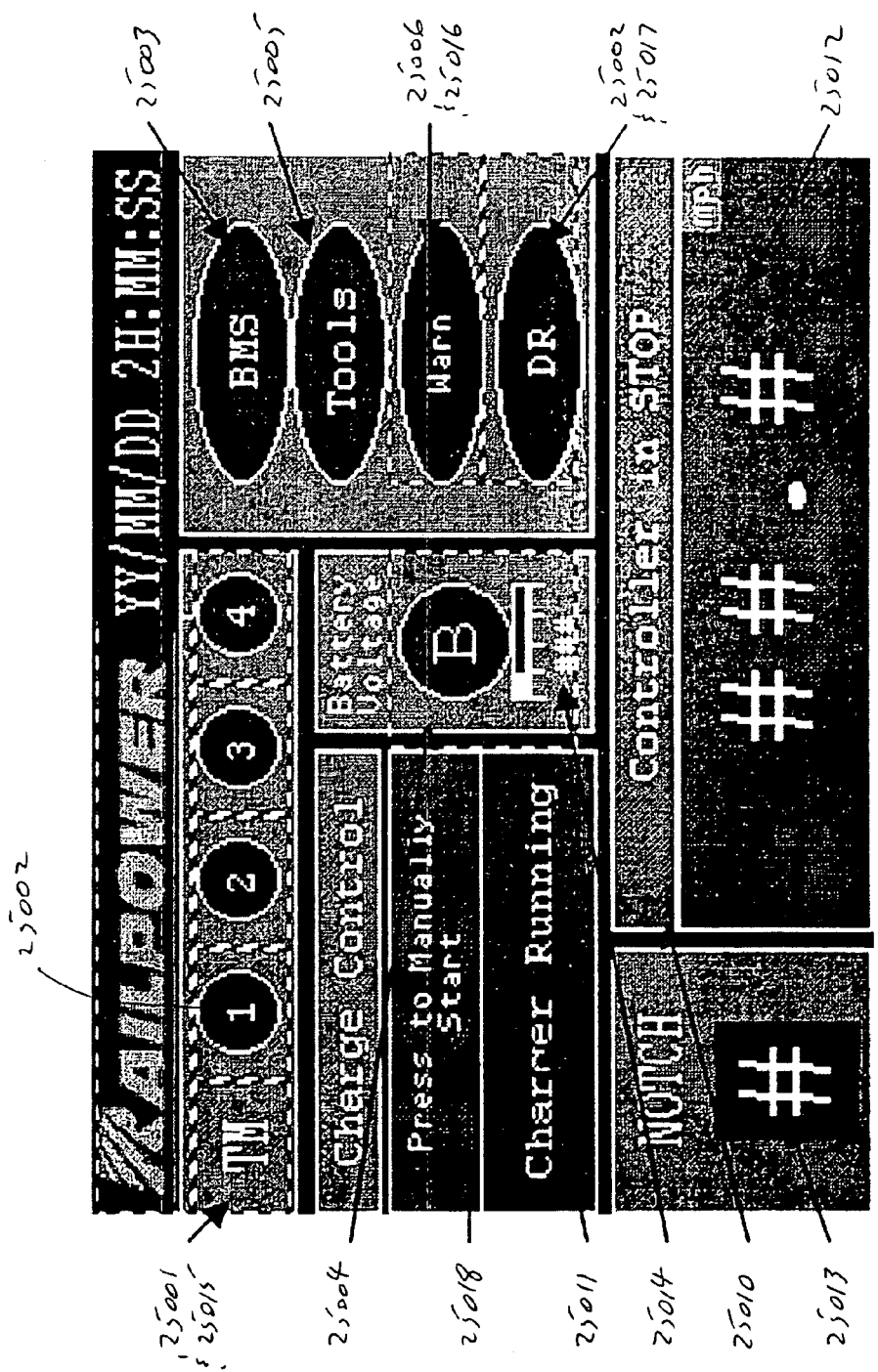
FIG. 25 shows an example of a main menu screen.

As shown in FIG. 25, the Main Menu Screen accesses the following secondary screens:
(a) the Traction Motor Summary Screen 25001 (shown in FIG. 26);
(b) the individual Traction Motor Screens 25002 (shown in FIG. 27);
(c) the Battery Monitor Screen 25003 (shown in FIG. 29);
(d) the Battery Status Screen 25004 (shown in FIG. 28);
(e) the Control Tools Screen 25005 (shown in FIG. 30);
(f) the Warnings Screen 25006 (shown in FIG. 34); and
(g) the Derate and Shutdown Screen 25007 (shown in FIG. 35).

In addition, several functions are monitored and controlled from the Main Menu Screen. The functions monitored include:
(a) the locomotive status 25010, which reports on the state of the locomotive, including for example: throttle positions; battery and other electrical conditions; forward, neutral or reverse status; wheel slip;
(b) the charger status 25011, which reports on the state of the charger including for example: charger electrical conditions; temperatures; and status such as running or shutting down;
(c) the locomotive speed 25012, which displays the speed in miles per hour (mph) or other units such, as for example, kilometers per hour (kph);
(d) the throttle notch position 25013, which displays the throttle notch position (from 1 to 8) set manually by the locomotive engineer;
(e) the battery pack voltage 25014, which displays the voltage at the output terminals of the battery pack;
(f) a traction motor status field 25015, with a change in field color indicating that there is a change in status of one or more of the DC traction motors;
(g) a warning field 25016, with change in field color indicating that there is a change in status of one or more of the system warnings; and
(h) a derate or shutdown field 25017, with a change in field color indicating that there is a change in status of derate (going to or remaining in idle) or shutdown (emergency locomotive shutdown).

The functions controlled include a charger manual control 25018, with this button being used to manually start and stop the battery charging generator.

Figure 26:
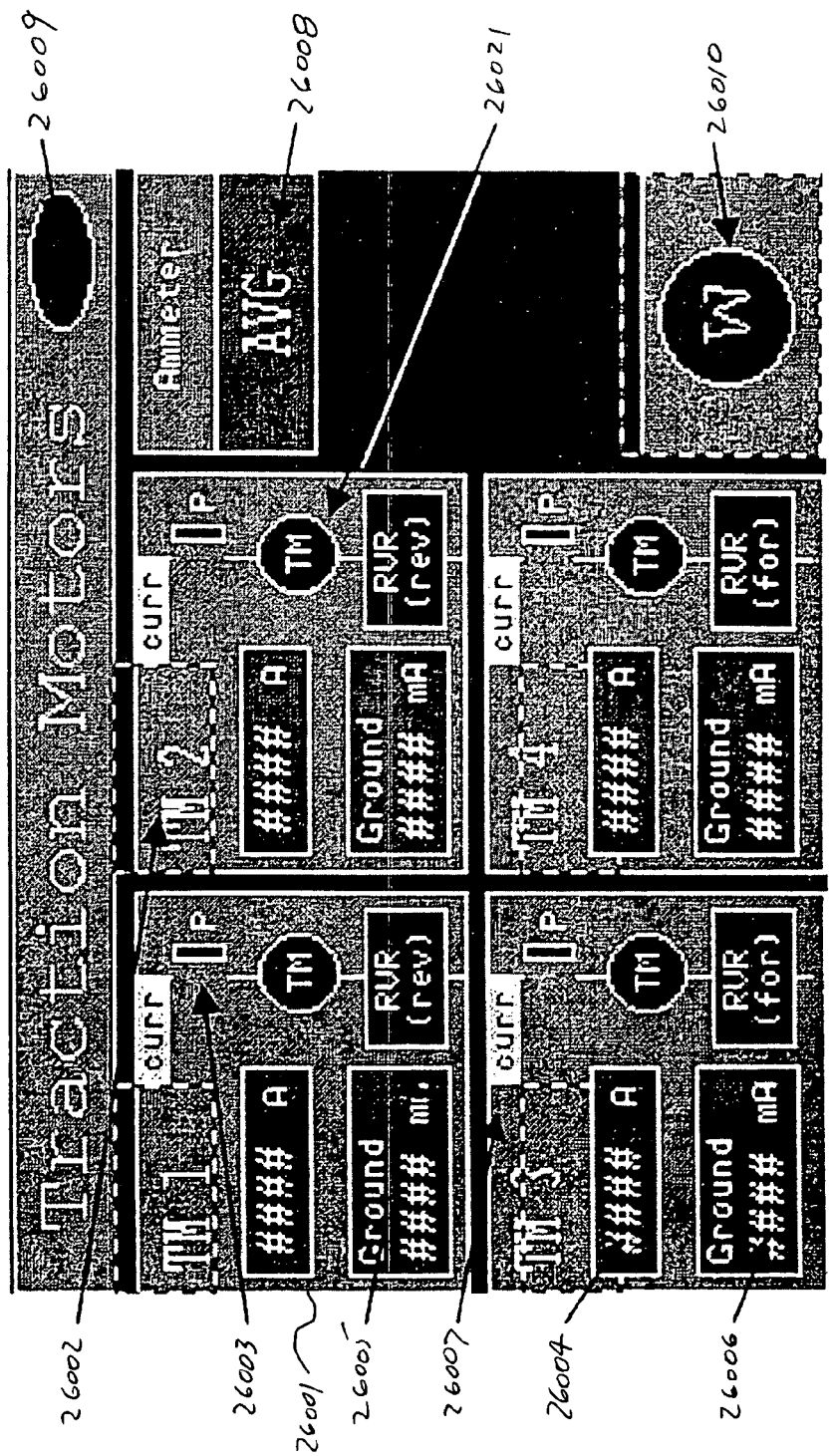
FIG. 26 shows an example of a traction motor summary screen.

A child screen off of the Main Menu Screen is the Traction Motor Summary Screen depicted in FIG. 26 which accesses the individual Traction Motor Screens 26001. The Traction Motor Summary Screen shows, for each traction motor 26002, the position of the various contactors 26003, the current going through each traction motor 26004, the reverser status 26005, the ground fault conditions 26006 and the wheel slip indicator 21007.

The Traction Motor Summary Screen also allows the operator to read and select instantaneous or average current reading 26008 from any of the traction motors. The Traction Motor Summary Screen allows the operator to go back to the Main Menu Screen 26009 or to the Warnings Screen 26010 or to any of the Traction Motor Screens 26002.

Figure 27:
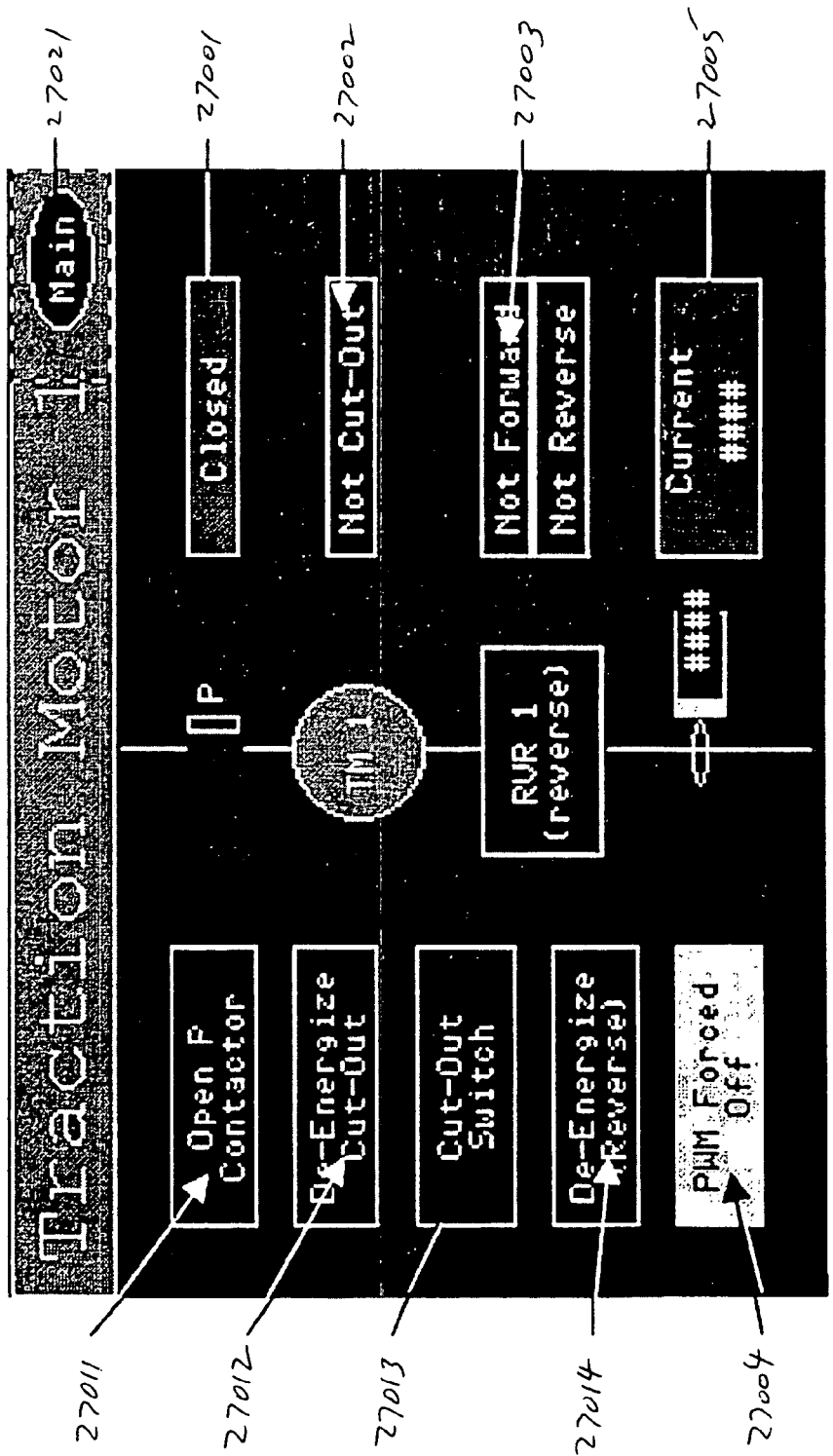
FIG. 27 shows an example of an individual traction motor screen.

A typical Traction Motor Screen, shown in FIG. 27, provides more detail about the status of each traction motor including contactor status 27001, motor status 27002, reverser status 27003, wheel slip status 27004 and motor current 27005. This screen also allows the operator to open contactors 27011, monitor the motor cutout status 27012, cut out the traction motor 27013 and de-energize the reverser 27014. Field 27021 of each of the Traction Motor Screens allows the operator to go back to the main menu screen.

The Battery Status Screen, shown in FIG. 28, displays details about the electrical state of the energy storage unit (e.g., battery) and the status of the mechanical-to-electrical conversion device (e.g., charging generator). The displayed fields include:

(a) B-Contactor Status 28001, which reports whether the Battery contactors are open or closed;

(b) Battery Power 28002, which displays the current power being delivered by the energy storage unit to the drive system;

(c) Battery voltage 28030

(d) Battery current 28031

(e) Battery Energy Delivered to Date 28003, which provides the total amount of kWh the energy storage unit has delivered to the drive system;

(f) Battery State of Charge 28004, which depicts, in a bar graph format, the state of charge of the energy storage unit by measuring the amp-hours in and the amp-hours out;

(g) Charger Status 28005, which reports what the mechanical-to-electrical conversion device (e.g., charging generator) is currently doing such as, for example, mode of operation (warming up etc); current charge, load charge, cooling status;

(h) Charger Power 28006, which reports the power being produced by the mechanical-to-electrical conversion device (e.g., charging generator) for charging the energy storage unit. When the conversion apparatus is not running, this field will provide a negative value to reflect the power draw out of the storage unit by the auxiliary systems; and (i) Charger Energy Produced to Date 28006, which reports the power that the conversion device has produced for replacing the energy drawn from the energy storage unit by the drive system but does not include the draw of the auxiliaries.

(j) Charger frequency 28032

(k) Charger current 28033

In addition, the Battery Status Screen allows control of the mechanical-to-electrical conversion device (e.g., charging generator) through:

(a) the Charger Manual Control Button 28011, which can be used to manually start and stop the conversion device; and (b) the Charger Disabler Button 28012, which allows the operator to disable the charge scheme for the conversion device, preventing it from starting automatically or through the manual charger control button 28011.

The Battery Status Screen is a child of the Main Menu Screen, is accessed from the Main Menu Screen and, using field 28013, allows the operator to return to the Main Menu Screen.

Figure 29:
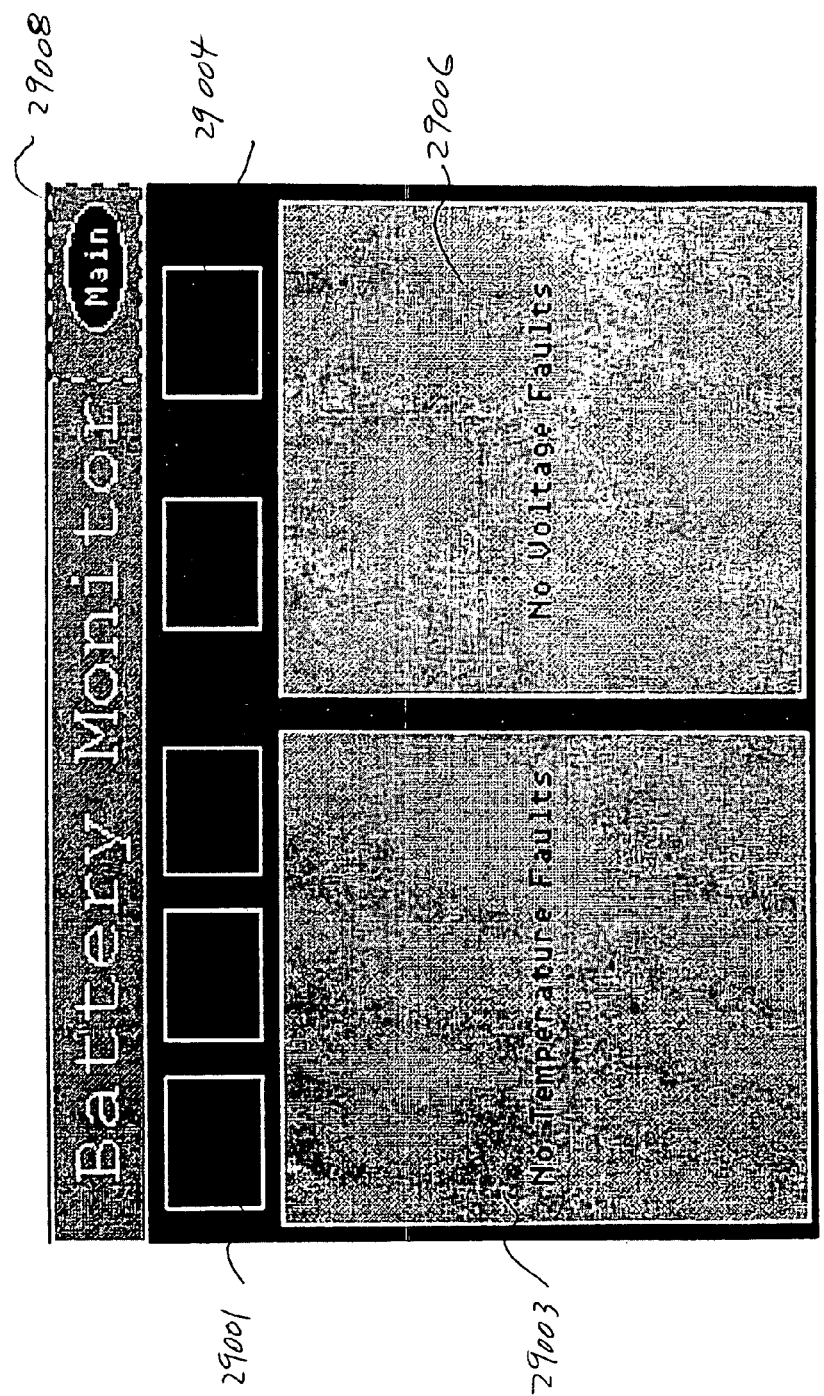
FIG. 29 shows an example of a battery monitoring system screen.

The Battery Monitor Screen, shown in FIG. 29, relays the signals from the battery monitoring system to the operator. The three squares 29001 on the left correspond to the three left-most LEDs in the battery monitoring system box, which correspond to temperature faults in the energy storage unit. The field 29003 directly below the three squares 29001 provide more detail about the fault detected. The two squares 29004 on the right correspond to the right most LEDs in the battery monitoring system box, which correspond to voltage faults. The field 29006 below the two squares 29004 give more detail about the fault condition detected. This screen is a child of the Main Menu Screen, is accessed from the Main Menu Screen and, using field 29008, allows the operator to return to the Main Menu Screen.

Figure 30:
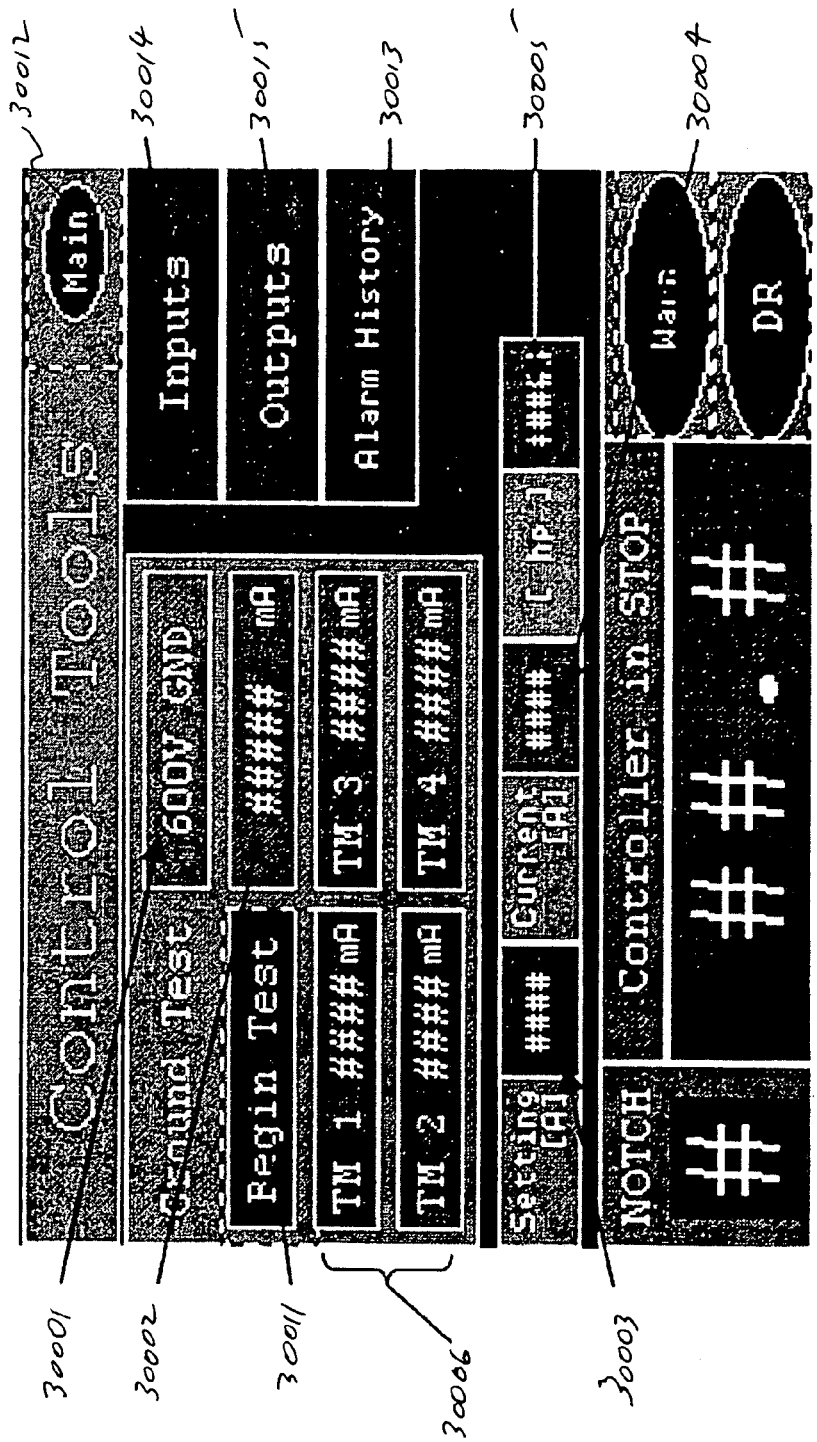
FIG. 30 shows an example of a control tools screen.
Figure 31:
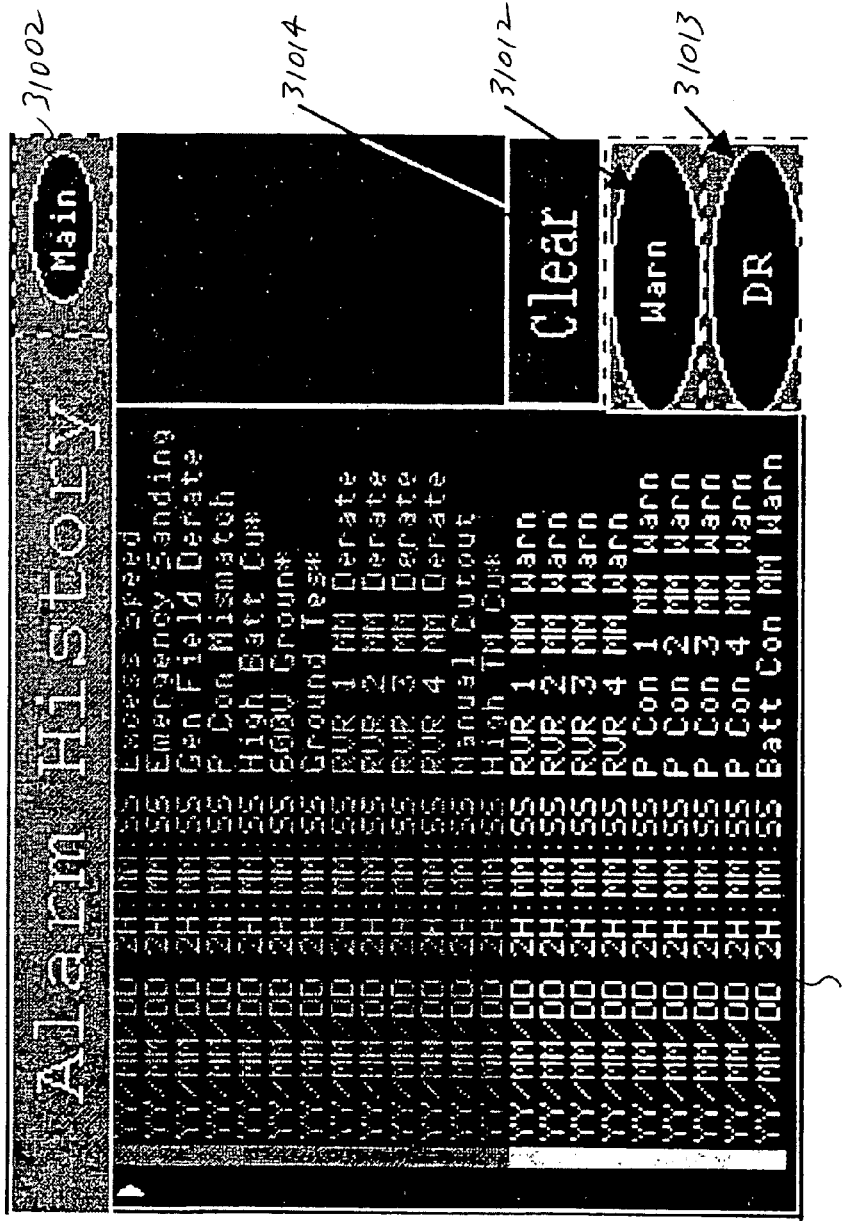
FIG. 31 shows an example of an alarm history screen.

The Control Tools Screen, shown in FIG. 30, is a child of the Main Menu Screen and, in turn, accesses the various informational screens, such as the Alarm History Screen of FIG. 31, the Digital Input Monitor Screen of FIG. 32 and the Output Monitor Screen of FIG. 33.

The Control Tools Screen shows the following fields:

(a) a 600 V ground fault indicator 30001;

(b) ground leakages 30002 detected on each traction motor;

(c) battery power set point 30003;

(d) battery current 30004;

(e) horsepower being developed 30005; and (f) traction motor leakage detected during last test 30006.

The Control Tools Screen also has a ground fault detection control button 30011, which turns color when a ground fault has been detected. Pushing the ground fault detection control button 30011 starts a ground fault detection process. This screen is a child of the Main Menu Screen, is accessed from the Main Menu Screen and, using field 30012, allows the operator to return to the Main Menu Screen. This screen allows the operator to access the Alarm History Screen via field 30013, the Digital Input Monitor Screen via field 30014 and the Output Monitor Screen via field 30015.

The Alarms History Screen, shown in FIG. 31, keeps a record of all of the alarms and warnings 31001 reported on the touch-screen. The Alarm History Screen is a child of the Control Tools Screen and allows the operator to go back to the Main Menu Screen via field 31002, to the Warnings Screen via field 31012 or to the Derate and Shutdown Screen via field 31013. The Alarm History Screen also has a button 31014 that allows the operator to clear the list 31001 of past alarms and warnings.

A Digital Input Monitor Screen, shown in FIG. 32, indicates the various inputs to the control computer monitors and shows the status of that input. If there is no signal seen by the control computer, the square 32001 will be black, and if a signal is present, square 31001 will be green. The various input boards are given an address 32002, such, as for example, "I" means input board. The first number 32003 designates which board (3, 4, or 5), and the second number 32004 designates which tab on the board (0 to 15). This screen also has a button 32011 to reset the pulse width board signal. The Digital Input Monitor Screen allows the operator to go back to the Main Menu Screen via field 32012, the Control Tools Screen via field 32013, or to the Output Monitor Screen via field 32014.

An Output Monitor Screen, shown in FIG. 33, shows the various output the control computer uses, and the status of the outputs. If there is no signal, the square 33001 will be blue, if there is a signal going out, then the square 33001 is red. The Output Monitor Screen also has an output control button 33011, which allows the operator to override the logic of the control computer and to enable any of the outputs manually. The Output Monitor Screen is a child of the Control Tools Screen and allows the operator to go back to the Control Tools Screen via field 33012 or to the Digital Input Monitor Screen via field 33013.

Figure 34:
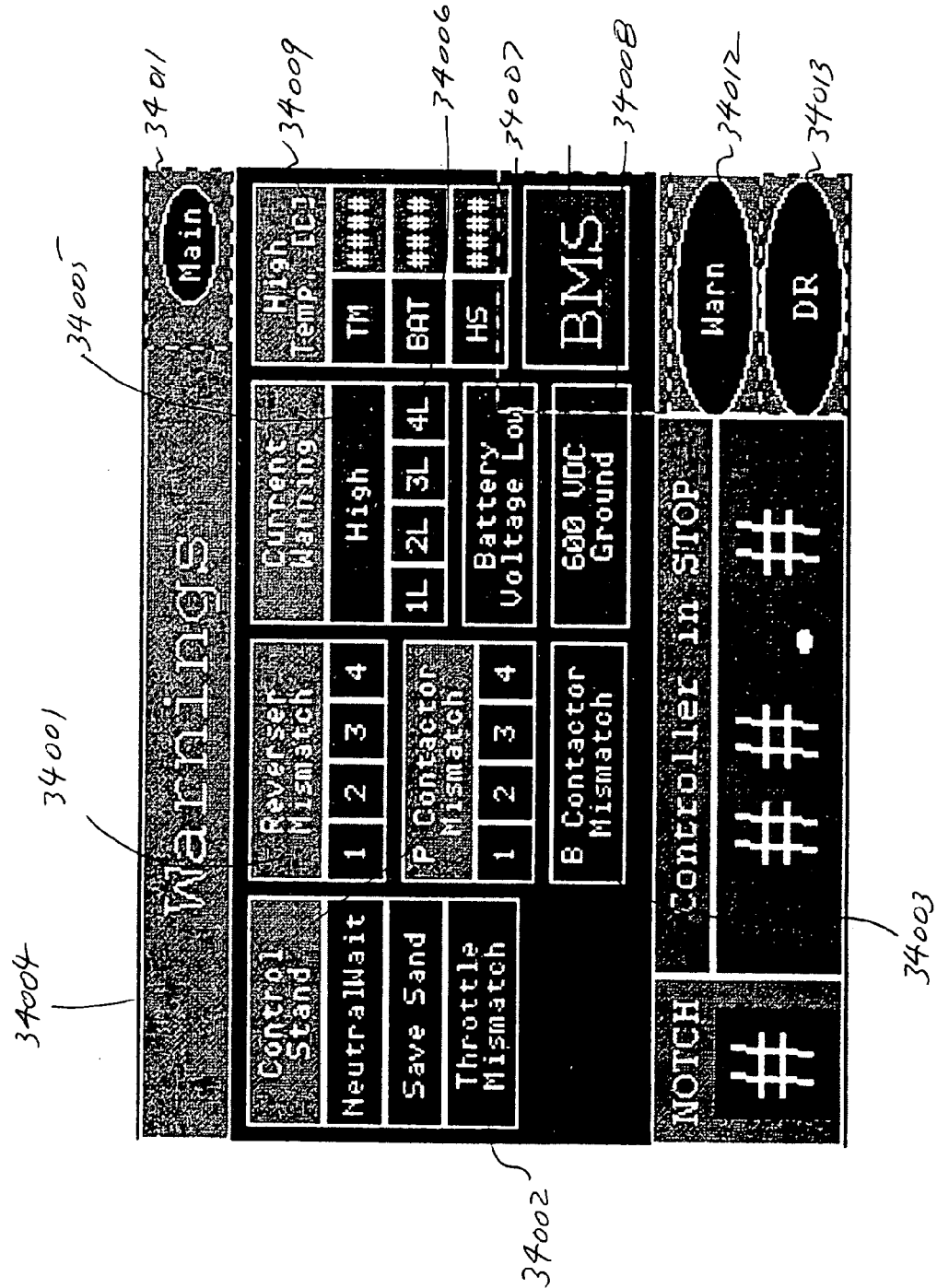
FIG. 34 shows an example of a warnings screen.

A Warnings Screen, shown in FIG. 34, displays minor alarms that have been detected.

The warnings contains information on:

(a) an improper reverser condition or mismatch field 34001;

(b) a throttle mismatch field 34002;

(c) a B-contactor mismatches field 34003 and P-contactor mismatches field 34004;

(d) a high or low current warnings field 34005 indicating an unacceptably high or low current on any of the traction motors 34006;

(e) a low voltage warning field 34007 indicating a low voltage on the energy storage unit;

(f) a ground leakage field 34008; and (g) a high temperature warning field 34009 indicating an unacceptably high temperature on the any of the traction motors, in the energy storage unit, or on the chopper board heat sinks.

The Warnings Screen is a child of the Main Menu Screen and allows the operator to go back to the Main Menu Screen via field 34011, the Battery Warning Screen via field 34012 or the Derate and Shutdown Screen via field 34013.

Figure 35:
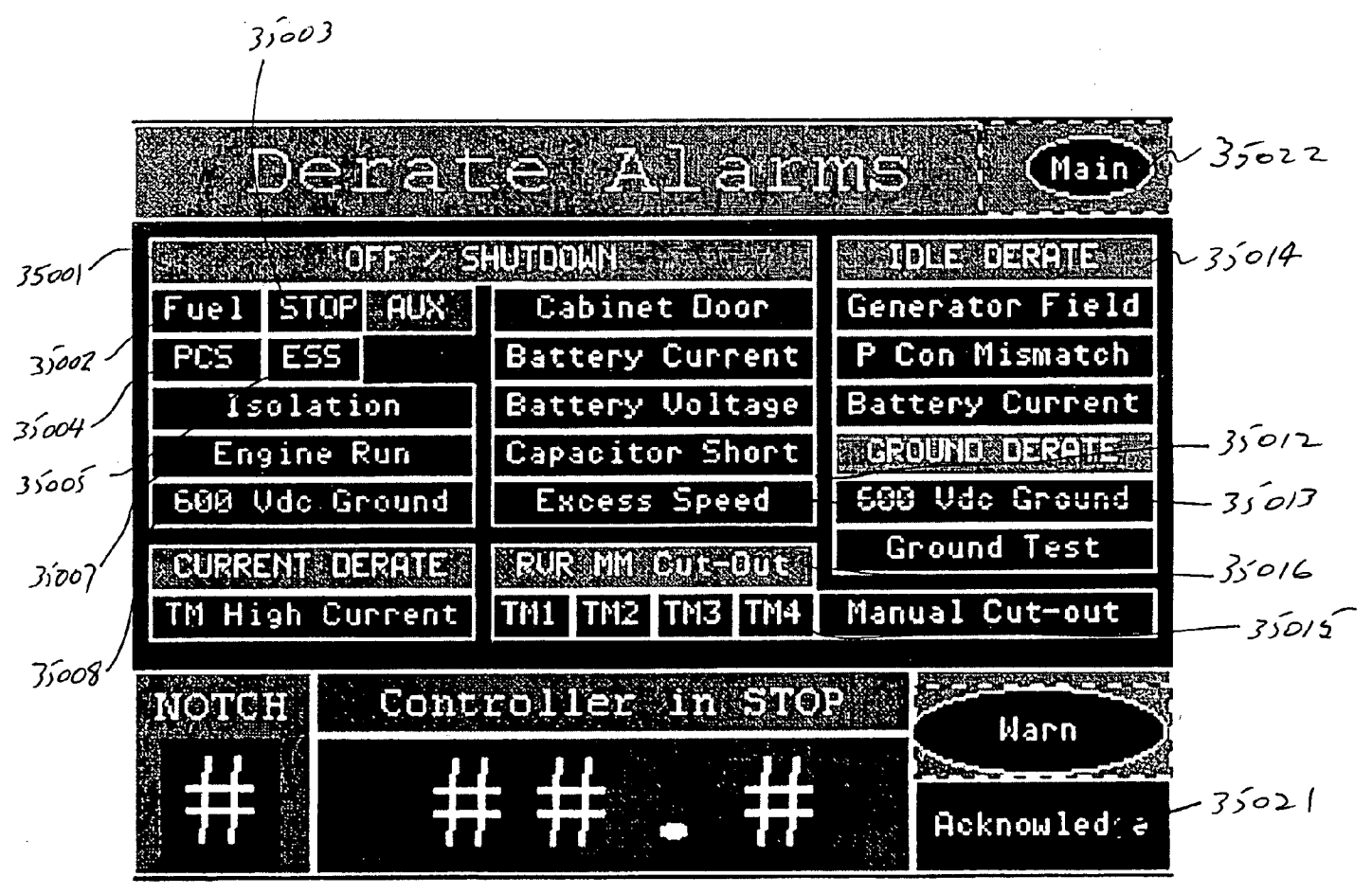

A Derate and Shutdown Screen, shown in FIG. 35, displays alarms that caused the locomotive to unload and/or prevent it from loading to full power. Some functions flagged on this screen may be controlled manually and some are controlled automatically. An example of the latter is an automatic reduction in power to a motor whose IGBT has exceeded its preset temperature limit. This screen includes information on:

(a) an off/shutdown alarms field 35001 indicating an alarm that caused the locomotive to do an emergency shutdown where the B-Contactors opened up;

(b) an emergency fuel shutoff indicator button 35002, a stop command button 35003, a pneumatic control switch button 35004, an emergency sanding switch button 35005, an isolation switch condition button 35006, an engine run switch indicator 35007, a 600 VDC ground fault detection button 35008, at least one of the electrical cabinet doors has been opened indicator 35009, excessive battery current detected 35010, low battery voltage indicator 35011, thermal fuse on the filter board short indicator 35012, and excessive locomotive speed indicator 35013;

(c) an idle derate alarm field 35014 indicating an alarm that have caused the locomotive to go to or remain in idle, but the B-Contactors have remained closed. This includes conditions where the generator field switch is off, one or more P-Contactor has not aligned correctly, or the battery current is being detected when it should not be;

(d) a traction motor high current derate field 35015 indicating that the locomotive is not developing full power because of high current in the traction motors;

(e) an RVR MM Cut-Out field 35016 indicating that the locomotive is not developing full power because a reverser will not align in the given direction, or full power is not being developed because a traction motor was manually cut out; and (f) a ground derate field 35016 indicating that the locomotive will not load because there is a 600 V ground fault condition, or the locomotive will not load because it is in the process of a ground fault detection test.

The Derate and Shutdown Screen also has a button 35021 that can be pushed to acknowledge an alarm and clear it from the system. The Derate and Shutdown Screen is a child of the Main Menu Screen and allows the operator to go back to the Main Menu Screen via field 35022.

A number of variations and modifications of the invention can be used. As will be appreciated, it would be possible to provide for some features of the invention without providing others. For example in one alternative embodiment, the various inventive features are applied to vehicles other than locomotives, such as cars, railroad cars, and trucks. The control logic set forth above may be implemented as a logic circuit, software, or as a combination of the two.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A locomotive, comprising:
a plurality of traction motors corresponding to a plurality of axles and a plurality of drive switches, each traction motor operating in a driven mode and a free-wheeling mode, wherein in the driven mode a power pulse from an energy storage device passes through the traction motor and the corresponding drive switch and in the free-wheeling mode the power pulse from the energy storage device passes through the traction motor and bypasses the corresponding drive switch;
at least one filter, the at least one filter corresponding to at least one of the plurality of traction motors, to absorb electrical voltage transients and smooth current ripples from the at least one traction motor resulting from changes between the driven and free-wheeling modes; and a controller operable to determine a respective power requirement for each traction motor during a selected time interval and the necessary amplitude and pulse width of a power pulse to produce the determined power requirement for each traction motor, wherein during the selected time interval the respective power requirements of at least two traction motors are different.

2. The locomotive of claim 1 further comprising:

a plurality of free-wheeling bypass circuits, each bypass circuit bypassing a corresponding one of the plurality of drive switches; and a switch drive operable to pulse sequentially power to each of the traction motors to produce the respective power requirement during the selected time interval, wherein, when the revolutions per minute (RPM) of each of the traction motors is below an intermediate RPM threshold, the pulses provided to the direct current traction motors are temporally non-overlapping and, when the RPM of each of the traction motors is above the intermediate RPM threshold, the pulses provided to the traction motors are temporally at least partially overlapping.

3. The locomotive of claim 2, further comprising:

a plurality of chopper circuits corresponding to the plurality of direct current traction motors, each chopper circuit comprising the free-wheeling bypass circuit, the drive switch being in electrical communication with a respective traction motor, and at least one of the filters, wherein a temporal spacing between adjacent pulses to each traction motor is maximized.

4. The locomotive of claim 3, wherein, during a selected time interval, a first chopper circuit corresponding to a first traction motor is in the first mode and a second chopper circuit corresponding to a second traction motor is in the second mode, wherein over-current protection for each individually controlled traction motor is provided and wherein the traction motors are direct current traction motors.

5. A locomotive, comprising:

a plurality of traction motors in communication with a plurality of axles;

a prime energy source;

an energy conversion device, in communication with the prime energy source, to convert the energy output by the prime energy source into electricity;

an energy storage device, in communication with the energy conversion device and the plurality of traction motors, to receive and store the electricity;

a plurality of electrical storage subunits to receive, store, and supply the electricity, wherein in a first mode the electrical storage subunits are connected electrically in series and in a second mode the electrical storage subunits are connected electrically in parallel; and at least one switch to switch the electrical storage subunits between the first and second modes.

6. The locomotive of claim 5 further comprising:

a controller of the at least one switch, wherein, when a measured voltage output of the electrical storage subunits is lower than a selected threshold, the at least one switch switches to the first mode and, when the measured voltage output of the electrical storage subunits is greater than the selected threshold, the at least one switch switches to the second mode, wherein the electricity is direct current and the traction motors are direct current traction motors.

7. The locomotive of claim 5 wherein simultaneously some of the electrical storage subunits are electrically connected in series and others of the electrical storage subunits are electrically connected in parallel.

8. A locomotive, comprising:

a plurality of traction motors in communication with a plurality of axles;

a prime energy source;

an energy conversion device, in communication with the prime energy source, to convert the energy output by the prime energy source into electricity;

an energy storage device, in communication with the energy conversion device and the plurality of traction motors, to receive and store the electricity, wherein the energy storage device comprises a plurality of capacitors operable to store the stored energy; and a pulse forming network to maintain the output power pulses of the energy storage device at least substantially constant in magnitude.

9. The locomotive of claim 8 wherein at least most of the stored electricity is stored in the plurality of capacitors and wherein the pulse forming network includes a buck-boost chopper circuit.

10. The locomotive of claim 9 wherein the waveform representing the amplitude of the output of the energy storage device as a function of time is at least substantially linear, wherein the electricity is direct current and the traction motors are direct current traction motors.

11. A locomotive, comprising:

a plurality of traction motors in communication with a plurality of axles;

a prime energy source for providing power to the plurality of traction motors; and a plurality of air brake systems operatively engaging a respective one of the plurality of axles, each air brake system comprising at least one movable braking surface element and corresponding air-brake cylinder and a fluid-activated brake release, wherein, when a moveable braking surface element is locked in position against a braking surface, fluid pressure is applied against the braking surface by the fluid-activated brake release to disengage the locked moveable braking surface from the braking surface.

12. The locomotive of claim 11, further comprising:

an energy conversion device, in communication with the prime energy source, to convert the energy output by the prime energy source into direct current electricity;

an energy storage device, in communication with the energy conversion device and the plurality of traction motors, to receive and store the direct current electricity, wherein the moveable braking surface element is a perforated brake shoe and wherein the air brake systems each comprise a brake shoe housing including the perforated brake shoe and wherein, when the fluid-activated brake release is activated, the high pressure fluid is passed through the brake shoe perforations and against the interface between the engaged brake shoe and the braking surface of the wheel to effect physical separation of the brake shoe and the wheel braking surface.

13. The locomotive of claim 11 wherein each moveable braking surface element comprises a plurality of holes passing therethrough and the fluid-activated brake release forces fluid through the holes in the moveable braking surface element and against the braking surface to form a brake release force.

14. The locomotive of claim 13 wherein the force required to unlock a locked braking surface element is the braking force and the release force is at least about 10% greater than the braking force.

15. A locomotive, comprising:
a plurality of traction motors in communication with a plurality of axles;
a prime energy source;
an energy conversion device, in communication with the prime energy source, to convert the energy output by the prime energy source into electricity;
an energy storage device, in communication with the energy conversion device and the plurality of traction motors, to receive and store the electricity and to provide the electricity to the plurality of traction motors;
a controller operable to control an excitation current to the energy conversion device, wherein at least one of the following statements is true:
(i) when a first predetermined set point is exceeded by a first monitored parameter, the excitation current is increased and, when a second predetermined set point is exceeded by the first monitored parameter, the excitation current is decreased and wherein the first monitored parameter is revolutions per minute of a mechanical component of the prime energy source;
(ii) when the first predetermined set point is exceeded by a second monitored parameter, the excitation current is decreased and, when the second predetermined set point is exceeded by the second monitored parameter, the excitation current is increased and wherein the second monitored parameter is the output power of the energy conversion device; and
(iii) when the first predetermined set point is exceeded by a third monitored parameter, the excitation current is decreased and, when the second predetermined set point is exceeded by the third monitored parameter, the excitation current is increased and wherein the third monitored parameter is the output voltage of the energy conversion device.

16. The locomotive of claim 15 wherein the first and second predetermined set points are selected to produce at least a desired degree of fuel efficiency for the prime energy source.

17. The locomotive of claim 15 wherein (i) is true.

18. The locomotive of claim 15 wherein (ii) is true.

19. A method for providing electrical energy to an energy storage device in a locomotive, comprising:
(a) providing a locomotive comprising:
(i) a plurality of traction motors in communication with a plurality of axles;
(ii) a prime energy source;
(iii) an energy conversion device, in communication with the prime energy source, to convert the energy output by the prime energy source into electricity; and
(iv) an energy storage device, in communication with the energy conversion device and the plurality of traction motors, to receive and store the electricity and to provide the electricity to the plurality of traction motors; and (b) controlling an excitation current to the energy conversion device by performing at least one of the following steps:
(i) when a first predetermined set point is exceeded by a first monitored parameter, the excitation current is increased and, when a second predetermined set point is exceeded by the first monitored parameter, the excitation current is decreased and wherein the first monitored parameter is revolutions per minute of a mechanical component of the prime energy source;
(ii) when the first predetermined set point is exceeded by a second monitored parameter, the excitation current is decreased and, when the second predetermined set point is exceeded by the second monitored parameter, the excitation current is increased and wherein the second monitored parameter is the output power of the energy conversion device; and
(iii) when the first predetermined set point is exceeded by a third monitored parameter, the excitation current is decreased and, when the second predetermined set point is exceeded by the third monitored parameter, the excitation current is increased and wherein the third monitored parameter is the output voltage of the energy conversion device.

20. The method of claim 19 wherein the first and second predetermined set points are selected to produce at least a desired degree of fuel efficiency for the prime energy source, wherein the electricity is direct current and the traction motors are direct current traction motors.

21. The locomotive of claim 19 wherein step (i) is performed.

22. The locomotive of claim 19 wherein step (ii) is performed.

23. A locomotive, comprising:
a plurality of traction motors in communication with a plurality of axles;
a prime energy source;
an energy conversion device, in communication with the prime energy source, to convert the energy output by the prime energy source into electricity;
an energy storage device, in communication with the energy conversion device and the plurality of traction motors, to receive and store the electricity and to provide the electricity to the plurality of traction motors;
a controller operable to (i) monitor an operational parameter of each of the plurality of axles and/or traction motors, wherein the monitored operational parameter includes (a) an electrical current and/or voltage output by the energy storage device and (b) a state of charge and/or voltage of the energy storage device, and (ii) in response to the monitored operational parameter, control operation of the prime energy source.

24. The locomotive of claim 23 wherein the controller is operable to:
when the prime energy source is activated,
deactivate the prime energy source when the energy storage device voltage and/or state of charge is above a second set point; and
when the prime energy source is deactivated,
activate the prime energy source when the energy storage device voltage and/or state of charge is below a first set point.

25. The locomotive of claim 24 wherein the controller is operable to control each of the plurality of traction motors independently of the other traction motors, wherein the controller is operable to decrease power supplied to a first traction motor engaging a first axle without decreasing the power supplied to other traction motors when the revolutions per minute exceed a selected threshold, and wherein the controller is operable, when the prime energy source is activated, to generate a warning when the energy storage device voltage and/or state of charge is below a first set point.

26. The locomotive of claim 23 wherein the controller is operable to:
  determine, based on the measured current and/or voltage output by the energy storage device, a state of charge of the energy storage device; and
  when the state of charge is below a selected set point, indicate a warning to an operator, wherein the electricity is direct current and the traction motors are direct current traction motors.

27. The locomotive of claim 25 further comprising:
  an air brake assembly located on each of the plurality of axles, the air brake assembly comprising one or more brake shoes, an air cylinder, and an fluid-activated brake release, wherein, when a first air brake assembly is locked in engagement with a first braking surface on a first axle but a second air brake assembly is not locked into engagement with a second braking surface on a second axle, the controller is operable to activate a first fluid-activated brake release on the first axle without activating a second fluid-activated brake release on the second axle.

28. The locomotive of claim 27, wherein a brake assembly is deemed to be locked when the locomotive is in motion, the air brake assembly is deactivated, and the revolutions per minute on the axle engaging the air brake assembly are at least substantially zero.

29. A method for controlling the operation of a locomotive, comprising:
  (a) providing a locomotive, the locomotive comprising:
    (i) a plurality of traction motors in communication with a plurality of axles;
    (ii) a prime energy source;
    (iii) an energy conversion device, in communication with the prime energy source, to convert the energy output by the prime energy source into electricity and to provide the electricity to the plurality of traction motors; and
    (iv) an energy storage device, in communication with the energy conversion device and the plurality of traction motors, to receive and store the electricity;
  (b) monitoring an operational parameter of each of the plurality of axles and or traction motors, wherein the monitored operational parameter includes (a) an electrical current and/or volts output by the energy storage device and (b) a state of charge and/or voltage of the energy storage device and
  (c) in response to the monitored operational parameter, controlling activation and deactivation of the prime energy source to control provision of electricity to the energy storage device.

30. The method of claim 29 wherein the controlling step (c) comprises the substeps of:
  when the prime energy source is activated,
    generating a warning when the energy storage device voltage and/or state of charge is below a first set point; and
    deactivating the prime energy source when the energy storage device voltage and/or state of charge is above a second set point; and
  when the prime energy source is deactivated,
    activating the generator when the energy storage device voltage and/or state of charge is below the first set point, wherein the electricity is direct current and the traction motors are direct current traction motors.

31. The method of claim 29 further comprising:
  controlling each of the plurality of traction motors independently of the other traction motors; and
  decreasing power supplied to a first traction motor engaging a first axle without decreasing the power supplied to other traction motors when the revolutions per minute of the first axle exceed a selected threshold.

32. The method of claim 29 wherein the controlling step comprises the substeps of:
  determining, based on the measured current and/or voltage output by the energy storage device, a state of charge of the energy storage device; and
  when the state of charge is below a selected set point, generating a warning to an operator.

33. The method of claim 29 wherein the locomotive comprises an air brake assembly located on each of the plurality of axles, the air brake assembly comprising one or more brake pads, an air cylinder, and an air-activated brake release and further comprising:
  when a first air brake assembly is locked in engagement with a first braking surface on a first axle but a second air brake assembly is not locked into engagement with a second braking surface on a second axle, activating a first fluid-activated brake release on the first axle without activating a second fluid-activated brake release on the second axle.

34. The locomotive of claim 33 wherein a brake assembly is deemed to be locked when the locomotive is in motion, the air brake assembly is deactivated, and the revolutions per minute on the axle engaging the air brake assembly are at least substantially zero.

35. A locomotive, comprising:
  a plurality of traction motors in communication with a plurality of axles;
  a prime energy source;
  an energy conversion device, in communication with the prime energy source, to convert the energy output by the prime energy source into electricity;
  an energy storage device, in communication with the energy conversion device and the plurality of traction motors, to receive and store the electricity and to provide the electricity to the plurality of traction motors;
  a user interface operable to receive a command from an operator to control a locomotive speed at a selected velocity; and
  a controller operable to control the velocity of the locomotive at or near the selected velocity by performing at least one of the following steps:
    (i) maintaining a substantially constant power across each of the plurality of traction motors, the power being related to the command;
    (ii) maintaining the revolutions per minute of each of the plurality of axles at a rate related to the command; and
    (iii) maintaining a substantially constant tractive effort across each of the plurality of traction motors, the tractive effort being related to the command.

36. The locomotive of claim 35 wherein step (i) is performed.

37. The locomotive of claim 35 wherein step (ii) is performed.

38. The locomotive of claim 35 wherein corresponding power applied across at least two of the traction motors are different, wherein the electricity is direct current and the traction motors are direct current traction motors.

39. The locomotive of claim 35 wherein corresponding revolutions per minute of at least two of the axles are different.

40. A method for operating a locomotive, comprising:
(a) providing a locomotive, the locomotive comprising:
 (i) a plurality of traction motors in communication with a plurality of axles;
 (ii) a prime energy source;
 (iii) an energy conversion device, in communication with the prime energy source, to convert the energy output by the prime energy source into electricity;
 (iv) an energy storage device, in communication with the energy conversion device and the plurality of traction motors, to receive and store the electricity and to provide the electricity to the plurality of traction motors; and
 (v) a user interface operable to receive a command from an operator to control a locomotive speed at a selected velocity; and
(b) controlling the velocity of the locomotive at or near the selected velocity by performing at least one of the following steps:
 (i) maintaining a substantially constant power across each of the plurality of traction motors, the power being related to the command;
 (ii) maintaining the revolutions per minute of each of the plurality of axles at a rate related to the command; and
 (iii) maintaining a substantially constant tractive effort across each of the plurality of traction motors, the tractive effort being related to the command.

41. The method of claim 40 wherein step (i) is performed.

42. The method of claim 40 wherein step (ii) is performed.

43. The method of claim 40 wherein corresponding power applied across at least two of the traction motors are different.

44. The method of claim 40 wherein corresponding revolutions per minute of at least two of the axles are different, wherein the electricity is direct current and the traction motors are direct current traction motors.

45. A power control system for a locomotive, comprising:
a plurality of traction motors in communication with a plurality of axles;
a prime energy source;
an energy conversion device, in communication with the prime energy source, to convert the energy output by the prime energy source into electricity;
an energy storage device, in communication with the energy conversion device and the plurality of traction motors, to receive, store, and supply the electricity, wherein the electricity is supplied to the plurality of traction motors;
a user interface operable to receive a command from an operator to control a locomotive speed, wherein the user interface is operable to display a current power being delivered by the energy storage device, a voltage of the energy storage device, an electrical current of the energy storage device, and a state of charge of the energy storage device to permit the operator to monitor a state of the energy storage device; and
a controller operable to determine an electrical current passing through each of a plurality of traction motors.

46. The power control system of claim 45, wherein the controller is operable to:
when the prime energy source is activated,
 generate a warning when the energy storage device voltage and/or state of charge is below a first set point; and
 deactivate the prime energy source when the energy storage device voltage and/or state of charge is above a second set point; and
when the prime energy source is deactivated,
 activate the generator when the energy storage device voltage and/or state of charge is below the first set point, wherein the electricity is direct current and the traction motors are direct current traction motors.

47. A power control method for a locomotive, comprising:
providing a locomotive comprising:
 (i) a plurality of traction motors in communication with a plurality of axles;
 (ii) a prime energy source;
 (iii) an energy conversion device, in communication with the prime energy source, to convert the energy output by the prime energy source into electricity;
 (iv) an energy storage device, in communication with the energy conversion device and the plurality of traction motors, to receive and store the electricity and to provide the electricity to the plurality of traction motors;
 (v) a user interface operable to receive a command from an operator to control a locomotive speed;
displaying at least one of a current power being delivered by the energy storage device, a voltage of the energy storage device, an electrical current from the energy storage device, and a state of charge of the energy storage device; and
receiving commands from the operator in response to the displayed information.

48. The power control method of claim 47, further comprising:
when the prime energy source is activated,
 generating a warning when the energy storage device voltage and/or state of charge is below a first set point; and
 deactivating the prime energy source when the energy storage device voltage and/or state of charge is above a second set point; and
when the prime energy source is deactivated,
 activating the generator when the energy storage device voltage and/or state of charge is below the first set point;
determining, based on the measured current and/or voltage output by the energy storage device, a state of charge of the energy storage device; and
when the state of charge is below a selected set point, generating a warning to an operator, wherein the traction motors are direct current traction motors.

49. The locomotive of claim 15, wherein a ratio of energy storage capacity to charging power of the energy storage device is between about 6 hours of storage capacity to about 40 hours of charging power, and wherein the energy storage device comprises between about 1 to about 10 energy storage cells.

50. The method of claim 19, wherein a ratio of energy storage capacity to charging power of the energy storage device is between about 6 hours of storage capacity to about 40 hours of charging power, and wherein the energy storage device comprises between about 1 to about 10 energy storage cells.

51. The locomotive of claim 23, wherein a ratio of energy storage capacity to charging power of the energy storage device is between about 6 hours of storage capacity to about 40 hours of charging power, and wherein the energy storage device comprises between about 1 to about 10 energy storage cells.

52. The method of claim 29, wherein a ratio of energy storage capacity to charging power of the energy storage device is between about 6 hours of storage capacity to about 40 hours of charging power, and wherein the energy storage device comprises between about 1 to about 10 energy storage cells.

53. The locomotive of claim 35, wherein a ratio of energy storage capacity to charging power of the energy storage device is between about 6 hours of storage capacity to about 40 hours of charging power, and wherein the energy storage device comprises between about 1 to about 10 energy storage cells.

54. The method of claim 40, wherein a ratio of energy storage capacity to charging power of the energy storage device is between about 6 hours of storage capacity to about 40 hours of charging power, and wherein the energy storage device comprises between about 1 to about 10 energy storage cells.

55. The system of claim 45, wherein a ratio of energy storage capacity to charging power of the energy storage device is between about 6 hours of storage capacity to about 40 hours of charging power, and wherein the energy storage device comprises between about 1 to about 10 energy storage cells.

56. The method of claim 47, wherein a ratio of energy storage capacity to charging power of the energy storage device is between about 6 hours of storage capacity to about 40 hours of charging power, and wherein the energy storage device comprises between about 1 to about 10 energy storage cells.

* * * * *